United States Patent [19]
Kashihara

[11] Patent Number: 5,724,491
[45] Date of Patent: Mar. 3, 1998

[54] COMMAND SHEET FOR PREPRESS, AND DEVICE AND METHOD FOR PREPARING THEREOF

[75] Inventor: Hideaki Kashihara, Kyoto, Japan

[73] Assignee: Dainippon Screen Mfg. Co., Ltd., Kyoto, Japan

[21] Appl. No.: 188,993

[22] Filed: Jan. 31, 1994

[30] Foreign Application Priority Data

| Jan. 29, 1993 | [JP] | Japan | 5-013567 |
| Jan. 29, 1993 | [JP] | Japan | 5-013590 |
| Mar. 31, 1993 | [JP] | Japan | 5-073245 |
| Mar. 31, 1993 | [JP] | Japan | 5-073266 |

[51] Int. Cl.$^6$ .................. G06F 15/00; H04N 1/387
[52] U.S. Cl. .................. 395/117; 395/779; 395/782; 358/450
[58] Field of Search .................. 395/117, 106, 395/779, 782, 786, 784; 358/450, 452; 382/116, 183, 184

[56] References Cited

U.S. PATENT DOCUMENTS

| 4,951,086 | 8/1990 | Hicks | 355/41 |
| 5,086,434 | 2/1992 | Abe et al. | 358/453 |
| 5,146,548 | 9/1992 | Bijnagte | 395/117 |
| 5,486,686 | 1/1996 | Zdybel, Jr. et al. | 235/375 |

FOREIGN PATENT DOCUMENTS

| 179373 A3 | 4/1986 | European Pat. Off. | H04M 1/387 |
| 320014 A2 | 6/1989 | European Pat. Off. | G06F 15/72 |
| 381300 A3 | 8/1990 | European Pat. Off. | G06F 15/72 |
| 0435254 | 7/1991 | European Pat. Off. | G06F 15/40 |
| 435254 A2 | 7/1991 | European Pat. Off. | H04N 1/21 |

Primary Examiner—Edward L. Coles, Sr.
Assistant Examiner—Tia M. Harris
Attorney, Agent, or Firm—Lowe, Price, LeBlanc & Becker

[57] ABSTRACT

A prepress command sheet capable of prepress efficiently without errors. Magnetic disk 54 are stored electronic data for corresponding image components, corresponding text components, and corresponding linework components. The Disk 54 are also stored electronic data for layout papers for the prepress command sheets. A CPU 42 lays out the corresponding image components, corresponding text components, and corresponding linework components on the layout paper according to instruction by an operator. CPU 42 reads identifiers for the respective image components and lays them out in the vicinity of associated corresponding image components. Printer 47 records the corresponding image components, corresponding text components, corresponding linework components, and identifiers associated with respective image components on the layout paper, and outputs the prepress command sheet.

15 Claims, 47 Drawing Sheets

F I G. 4
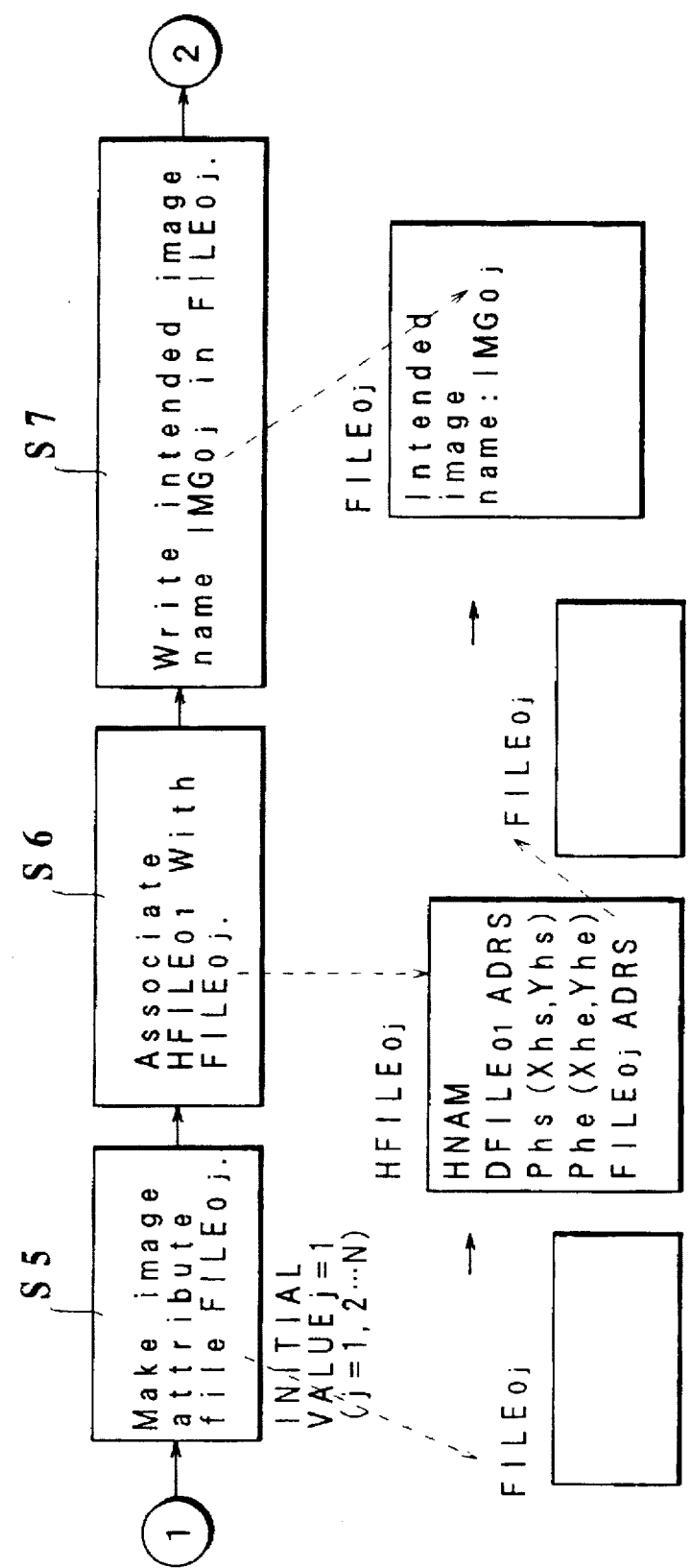

F I G. 2 0
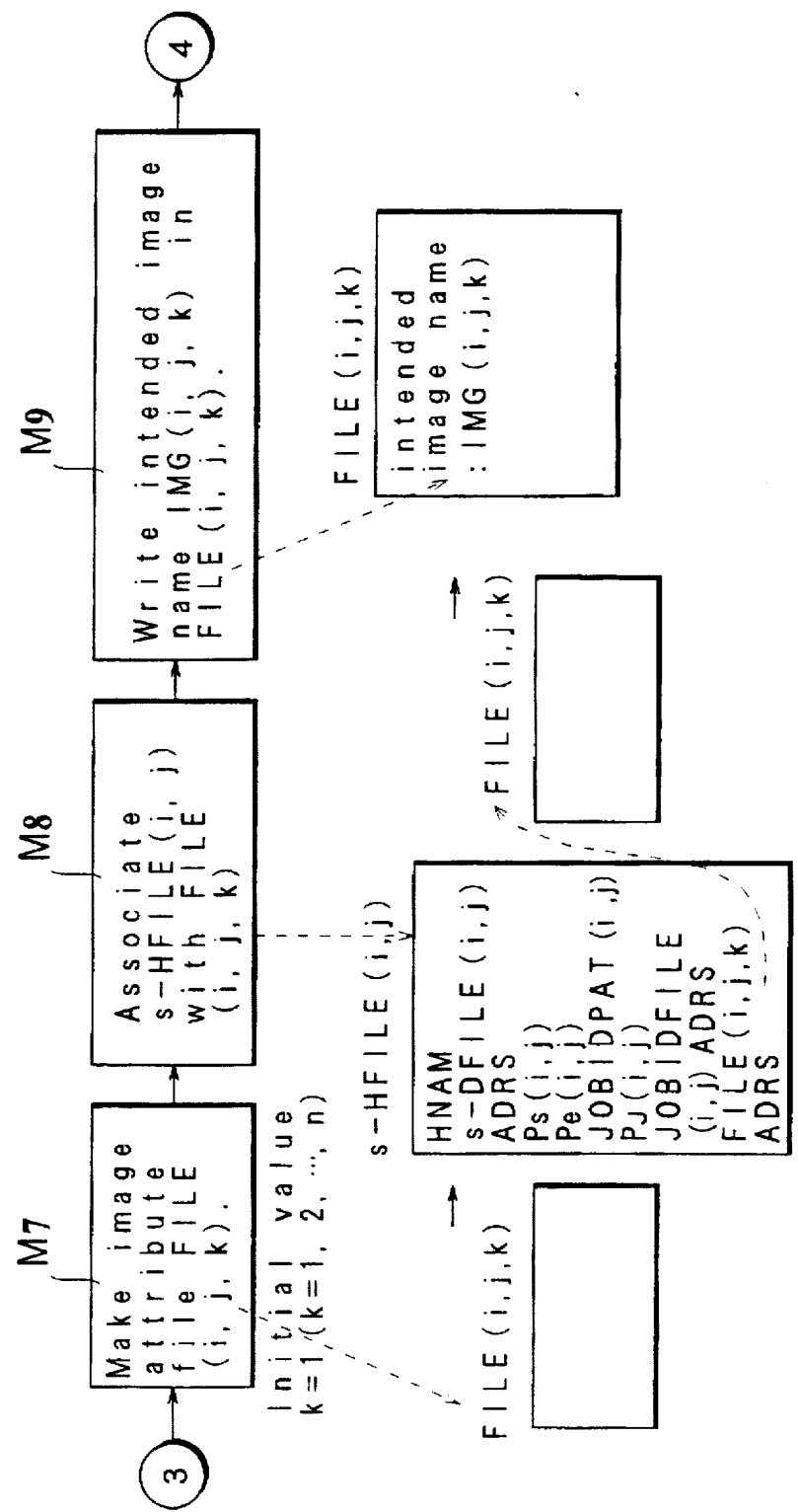

F I G. 26
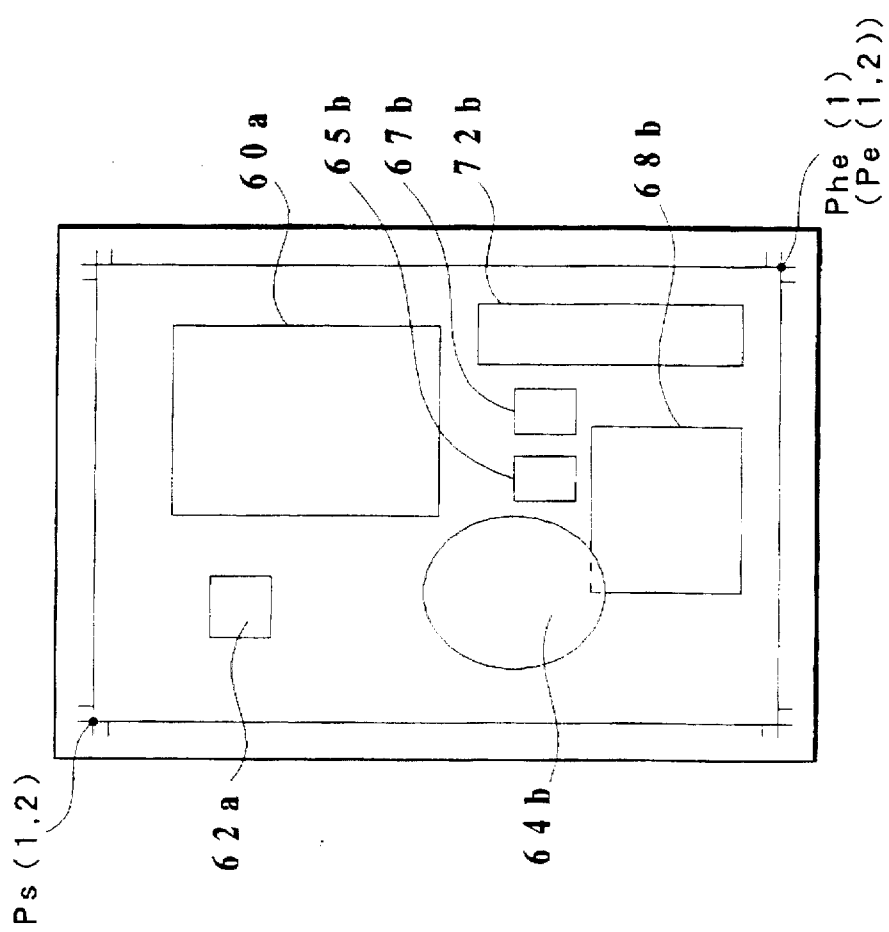

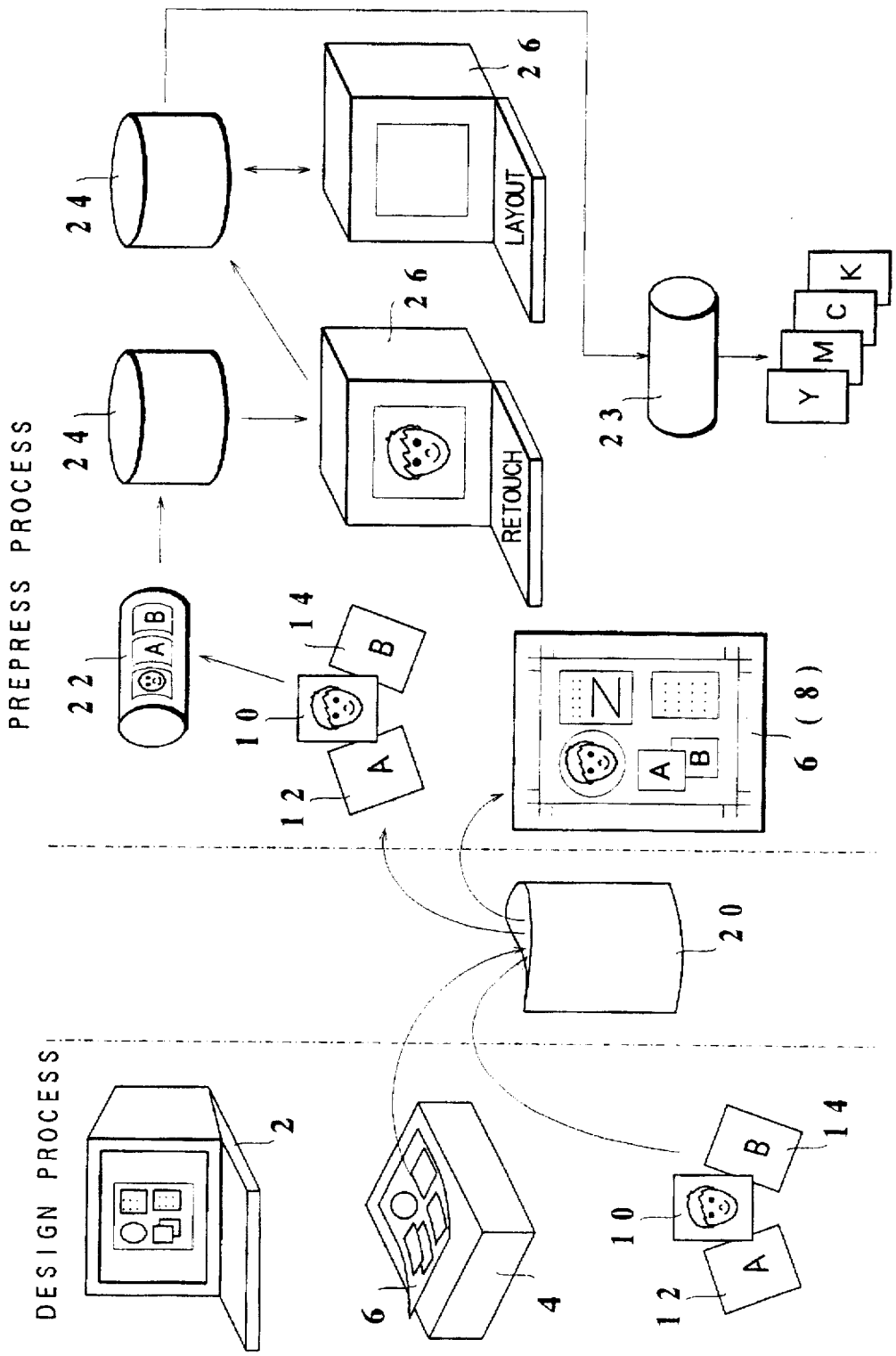

COMMAND SHEET FOR PREPRESS, AND DEVICE AND METHOD FOR PREPARING THEREOF

BACKGROUND OF INVENTION

1. Field of the Invention

This invention relates to a command sheet for prepress, and device and method for preparing the prepress command sheet.

2. Description of the Prior Art

FIG. 46 shows a conceptual diagram of the design process and prepress process in producing printed matter or printed material (hereinafter called prints). In the design process, a designer using a computer 2 determines layout of images, texts, linework, etc. to produce a design. Here, the image, text, and linework are constituent elements of the design, and are respectively called an image component, text component, and linework component. The image components 10, 12, and 14 are read by an input scanner (not shown) and given as image data to the computer 2. The linework component is processed likewise. The text component is given as text code data to the computer 2. While the image components 12 and 14 in FIG. 46 are represented respectively by letters A and B for convenience, they are actually pictorial patterns (images).

When the design is finished, a printer 4 produces a layout paper 6. The layout paper 6 produced in this way is shown in FIG. 47. The images, texts, and lineworks on the layout paper 6 shown in FIG. 47A are not necessarily identical to those on a final print. While they may be different in hue and saturation, they suffice to show the layout of components. For example, a corresponding image component 11 on the layout paper 6 is shown to determine the layout of the image component 10, a corresponding image component 13 to determine the layout of the image component 12, and a corresponding image component 15 to determine the layout of the image component 14. Corresponding text components 17 and 19 are shown to determine the layout of respectively corresponding text components.

Separately from the layout paper 6, an instruction sheet 8 is prepared on a transparent sheet shown in FIG. 47B. The instruction sheet 8 is to be superposed on the layout paper 6 for use and part of work contents to be carried out for each of the components at the time of prepress is described on it.

The layout paper 6, instruction sheet 8, image components 10, 12, 14, and a floppy disk storing the text components and linework components are put into a work bag 20 which is handed from the design process to the prepress process (Refer to FIG. 46).

In the prepress process, the image components 10, 12 and 14 are read by an input scanner 22, and the read image data are stored on a magnetic disk 24. A prepress operator then makes a computer 26 read and display the image data 10 stored on the magnetic disk 24, and retouches the image component 10 according to the layout paper 6 and the instruction sheet 8. The retouch work is done, for example, by cutting to the size indicated on the layout paper 6 and the instruction sheet 8, hue adjustment, enlargement or reduction, rotation, etc. The retouched image component 10 is again stored on the magnetic disk 24. In a similar manner, the image components 12 and 14 are also retouched.

The components are then laid out according to the layout paper 6 and the instruction sheet 8. Based on the laid out data, an output scanner 23 makes out individual single color films in yellow (Y), magenta (M), cyan (C), and black (K). After exposure and development processes using these single color films, printing plates (not shown) for respective colors are prepared.

The conventional method described above has the following disadvantages: in order to retouch or lay out the image components in the prepress process, it is necessary to read the image components to be handled from the magnetic disk according to the layout paper 6 and the instruction sheet 8. Here, the prepress operator specifies the intended image components with the file name as a clue. However, since a large number of image components are stored on the magnetic disk 24, the reading of intended image components is not easy, and the work efficiency is considerably lowered. In particular, when there are many image components which are similar to each other, errors are likely to occur.

SUMMARY OF THE INVENTION

A prepress command sheet preparing device in accordance with present invention comprises corresponding component memory means for storing electronic data for corresponding image components, corresponding text components, and corresponding linework components respectively corresponding to image components, text components, and linework components, identifier output means for outputting electronic data for identifiers, layout paper memory means for storing electronic data for layout papers for prepress command sheets, component layout means for determining locations of the corresponding image components, corresponding text components, and corresponding linework components to be laid out on the layout paper according to memory contents in the corresponding component memory means and the layout paper memory means, identifier layout means which retrieves identifiers associated with at least respective corresponding image components from the identifier output means, and lays out the identifiers in the vicinity of respective corresponding image components, and output means for outputting on the layout paper; corresponding image components, corresponding text components, corresponding linework components, and identifiers capable of being read either electrically, magnetically, or optically.

A prepress command sheet preparing method in accordance with present invention comprises the steps of:

storing in advance electronic data for corresponding image components, corresponding text components, and corresponding linework components respectively corresponding to image components, text components, and linework components, storing in advance electronic data for a layout paper for the prepress command sheet, determining the locations for the corresponding image components, corresponding text components, and corresponding linework components to be laid out on the layout paper according to the electronic data, and outputting the corresponding image components, corresponding text components, and corresponding linework components on the layout paper according to the determined layout, characterized in that identifiers capable of being read either electrically, magnetically, or optically and associated with at least respective corresponding image components are laid out in the vicinity of the corresponding image components, and outputted.

A prepress command sheet in accordance with present invention on which corresponding image components, corresponding text components, and corresponding linework components respectively corresponding to image components, text components, and linework components are laid out for instructing at least the layout of the image components, text components, and linework components for use in prepress processes, characterized in that identifiers capable of being read either electrically, magnetically, or optically and associated with at least respective corresponding image components are laid out.

BRIEF DESCRIPTION OF THE DRAWINGS

FIGS. 3 through 7 are flow charts showing the processes of preparing the prepress command sheet.

FIGS. 18 through 24 are flow charts showing the process of preparing the prepress command sheet.

FIG. 26 is a drawing showing a displayed condition of contents of a divided layout paper file.

FIG. 46 is a conceptual drawing showing conventional design and prepress processes.

DETAILED DESCRIPTION OF THE PREFERRED EMBODIMENT

Figure 1:
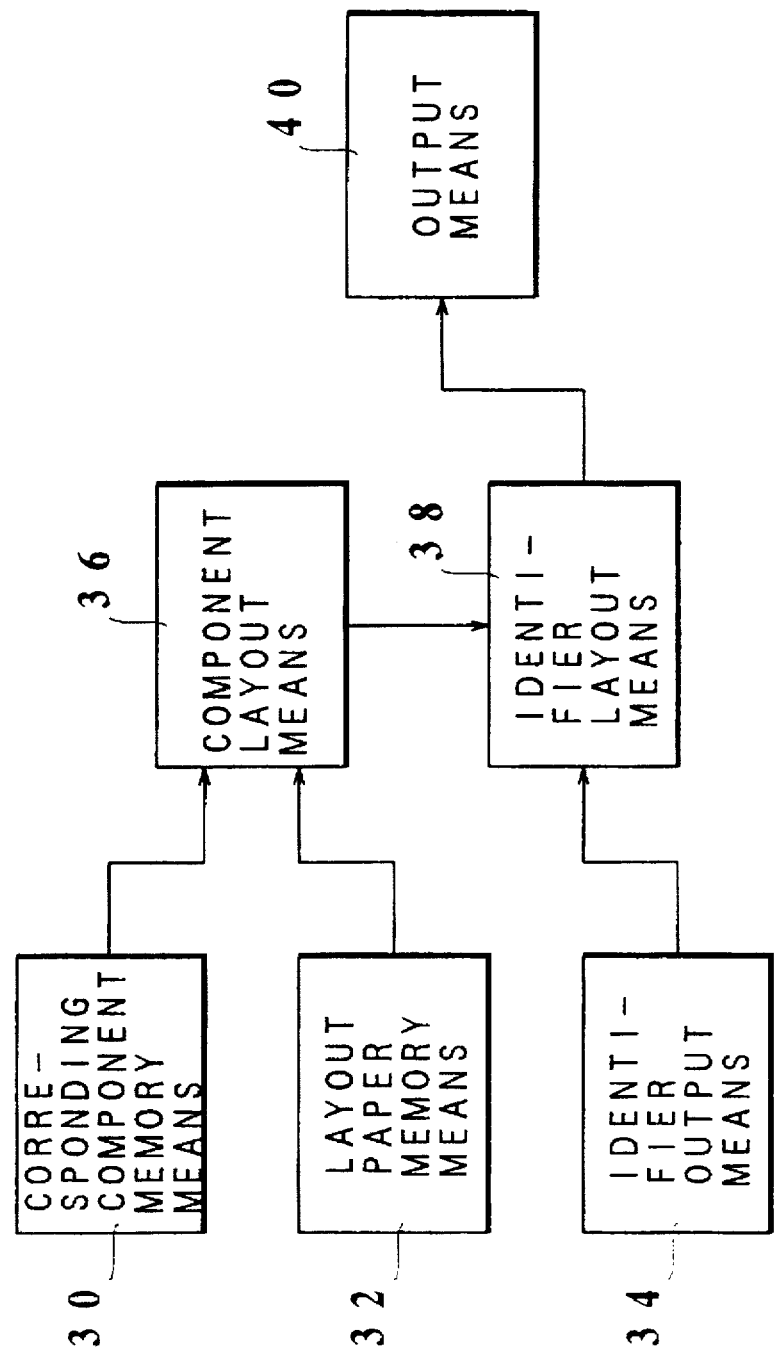
FIG. 1 is a block diagram showing the entire setup of a prepress command sheet preparing device as an embodiment according to the invention.

FIG. 1 shows the block diagram of a prepress command sheet preparing device as an embodiment according to the invention. Electronic data of corresponding image components, corresponding text components and corresponding linework components are stored in corresponding component memory means 30. Electronic data of a layout paper for a prepress command sheet are stored in layout paper memory means 32. Component layout means 36 arranges layout of the corresponding image components, corresponding text components, and corresponding linework components on the layout paper according to the command of an operator. Identifier layout means 38 reads identifiers for respective corresponding image components out of an identifier output means 34 and places them in the vicinity of associated corresponding image components. Output means 40 records the identifiers associated with the corresponding image components, corresponding text components, and corresponding linework components on the layout paper, and outputs a prepress command sheet.

Figure 2:
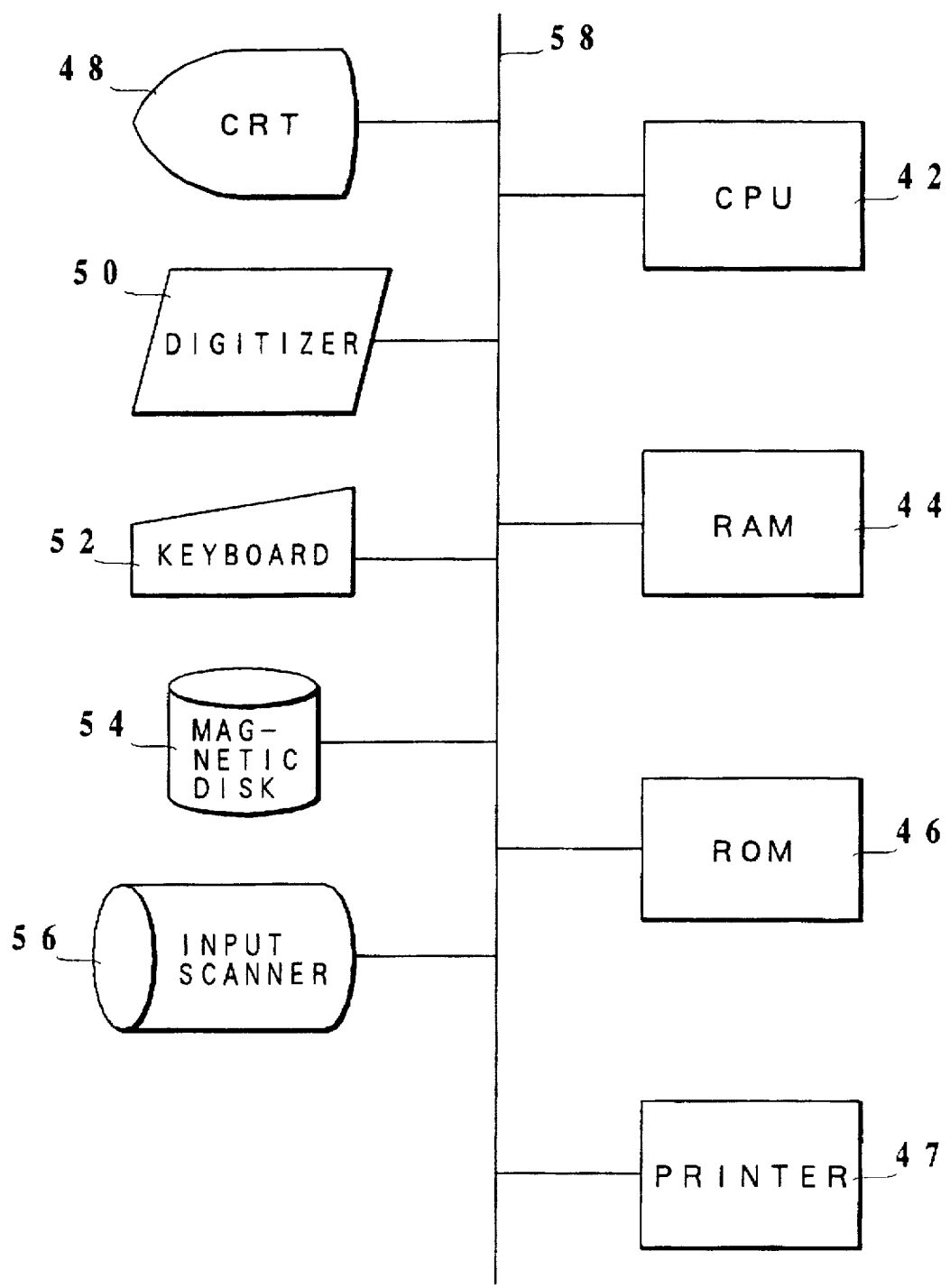
FIG. 2 is a drawing showing a hardware setup in which each of the functions shown in FIG. 1 is attained using a CPU.

FIG. 2 shows a hardware setup for attaining the functions of the blocks shown in FIG. 1 using a CPU. The CPU 42 is connected to a bus line 58. To the bus line 58 are connected also a CRT monitor 48, digitizer 50, keyboard 52; corresponding component storage means and layout paper storage means in the form of a magnetic disk 54, input scanner 56, RAM 44, and ROM 46; and output means in the form of a printer 47.

The procedure for making out the prepress command sheet using the prepress command sheet preparing device is explained below. The procedure flow charts are shown in FIGS. 3 through 7.

First, the operator enters a layout paper attribute file name by way of the keyboard 52 to make a layout paper attribute file. Here, it is assumed that a file name "HFILE01" is entered. The CPU 42 receives the file name and generates a layout paper attribute file HFILE01 in the magnetic disk 54 (step S1).

Next, the operator enters a layout paper name by way of the keyboard 52. Here, it is assumed that a layout paper name "HNAM" is entered. The CPU 42 receives the name and writes the layout paper name "HNAM" in the layout paper attribute file HFILE01 (step S2).

Next, the layout paper attribute file HFILE01 is associated with a layout paper file DFILE01 which is already generated and stored on the magnetic disk 54. In other words, a storage place DFILE01 ADRS for the layout paper file DFILE01 is written in the layout paper attribute file HFILE01 (step S3).

Figure 8:
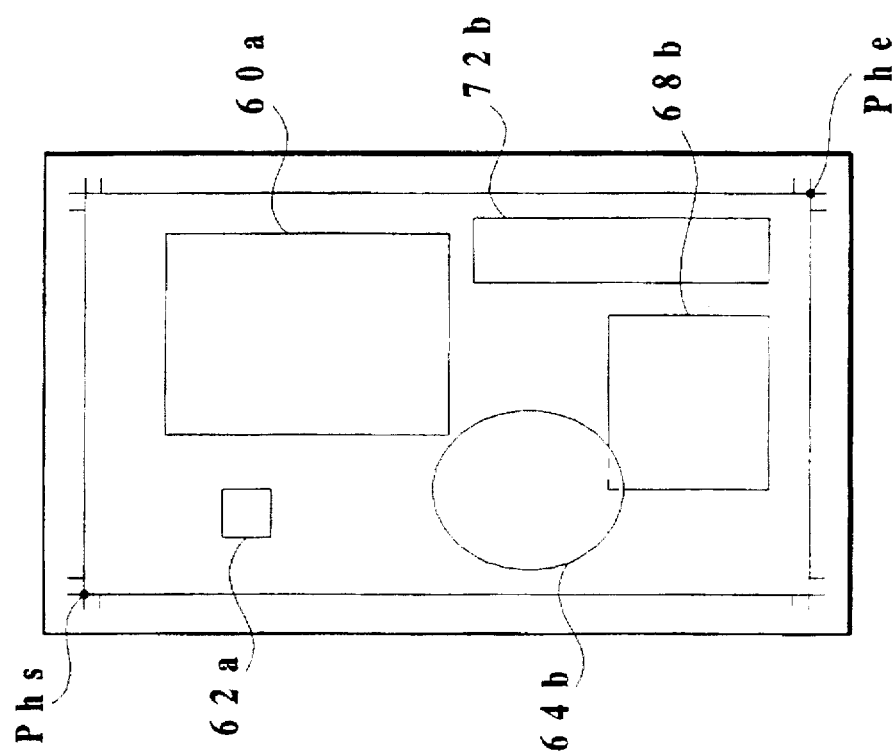
FIG. 8 is a drawing showing a displayed condition of the contents of a layout paper file.

Here, the contents of the layout paper file DFILE01 is explained in reference to FIG. 8 which is an exemplary drawing of layout data prepared in advance by a designer. First, there are coordinate data for diagonal two points representing the size of the layout paper: coordinate data for a start point Phs and coordinate data for an end point Phe. Also included are coordinate data for a text area 60a where the corresponding text components are placed, and coordinate data for a linework area 62a where the corresponding linework components are placed. Further included are coordinate data for mask areas 64b, 68b, and 72b for the corresponding image components. These coordinate data are collectively referred to here as layout data. In the step S3, such a layout paper file DFILE01 is associated with the layout paper attribute file HFILE01. It is assumed that the text data corresponding to the text area 60a and the linework data corresponding to the linework area 62a are respectively associated with and already stored in other files.

Next, the CPU 42 reads the coordinate data for the start point Phs and the end point Phe on the layout paper out of the layout data in the layout paper file DFILE01 and writes them in the layout paper attribute file HFILE01 (step S4).

After that, the CPU 42 generates image attribute files FILE0j (where the variable j=1, 2, . . . , N) and stores them on the magnetic disk 54 (step S5). Next, the storage place FILE01 ADRS for the image attribute files FILE0j is written in and associated with the layout paper attribute file HFILE01 (step S6). Next, the operator enters a corresponding image component name (called intended image name) by way of the keyboard 52. The CPU 42 receives the data and writes an intended image name "IMG01" on the image attribute file FILE01 (step S7). The intended image name IMG01 may be automatically generated by the CPU 42. Next, the operator specifies a mask area for the intended image according to the information from the layout paper file DFILE01 (step S8).

On the other hand, image components or color films (92, 94, 96 in FIG. 12 which will be explained later) are separated in colors by an input scanner 56, read, and stored in advance as corresponding image data on the magnetic disk 54 (step S9). Resolution of this scanner 56 here may be coarser than that of an input scanner used in the prepress process. The corresponding image data is stored in the magnetic disk 54 under the file name of IMGFILE01. Here, the CPU 42 writes the storage location "IMGFILE01 ADRS" for the corresponding image file IMGFILE01 in the image attribute file FILE01 (step S10).

Figure 9:
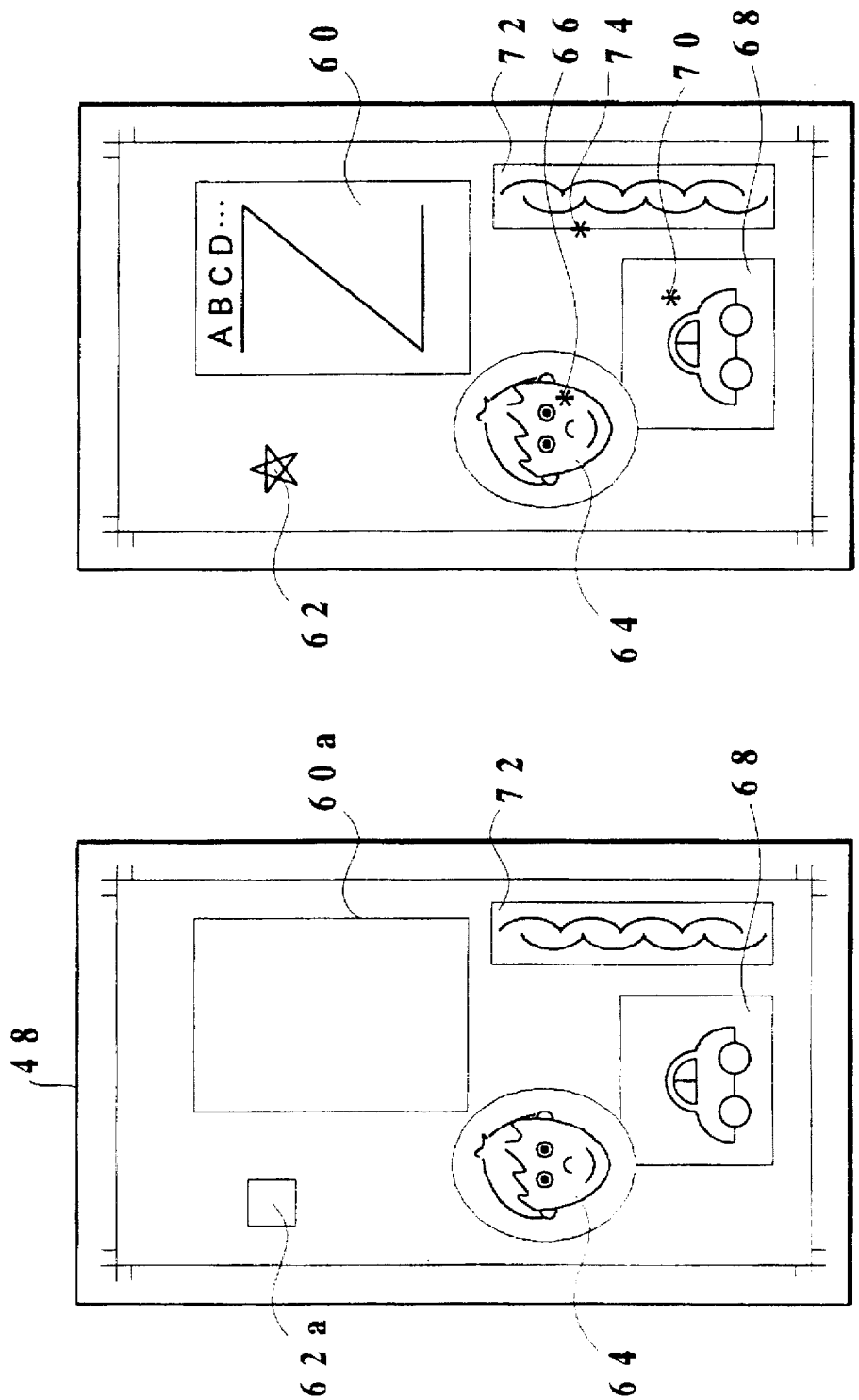
FIGS. 9A and 9B are drawings showing corresponding image components pasted on the layout paper.

Next, after the step S8, the CPU 42 reads the layout paper file DFILE01, and the corresponding image data file IMG-FILE01 for the mask area specified in the step S8 out of the magnetic disk 54, and displays the layout paper, mask area, and corresponding image components on the CRT monitor 48. The operator, referring to the mask area, pastes the corresponding image components IMG01 on the layout paper (step S11). The CPU 42 receives the data and writes the location for the corresponding image components IMG01 as layout data for the layout paper file DFILE01(step S12). Here, display appears on the CRT 48 as shown in FIG. 9A. In other words, the corresponding image components 64, 68, and 72 are displayed as laid out on the layout paper.

Next, the CPU 42 generates identifier codes id00j to be attached to the corresponding image components (step S13). In this embodiment, the identifier codes id00j are generated in consecutive numbers. Therefore, first the identifier code "id001" is generated. It may also be constituted that the identifier codes of consecutive numbers are stored in advance on the magnetic disk 54 and read out automatically in succession.

The CPU 42 writes the identifier codes "id003" in the image attribute file FILE01 (step S14). Here, the operator moves the cursor of the digitizer 50 to specify where (output coordinates) on a displayed corresponding image component (for example 64) an identifier code is to be laid out (step S15). Upon receiving the specification, the CPU 42 writes the location Pid (output coordinates) for the identifier code id00j in the image attribute file FILE01 using X-Y coordinates (step S16). At the same time, the identifier pasting location relative to the corresponding image component 64 is displayed (66) on the CRT monitor 48 as shown in FIG. 9B.

Next, it is judged whether or not the identifier correspondence process described above has been done for all the corresponding image components (step S17). If there are any corresponding image components not processed yet, steps S5 through S16 are performed by successively increasing the variable j by an increment of one. Here, the image attribute files are made in consecutive numbers such as FILE02, FILE03, . . . Also, the corresponding image data files are similarly made in consecutive numbers such as IMGFILE02, IMGFILE03, and so on. Furthermore, the identifier codes are similarly made in consecutive numbers such as id002, id003, . . .

A screen image of the CRT monitor 48 in the case of three image components is shown in FIG. 9B. The identifier pasting locations 66, 70, and 74 are respectively shown relative to the corresponding image components 64, 68, and 72.

When the identifier correspondence is completed for all the corresponding image components in the step S17, the process goes on to the step S18. In the step S18, first a storage location "IDPAT ADRS" for a pattern file IDPAT for the identifier is written in the image attribute file FILE01. Furthermore, bar code data idPAT0k (where the variable k=1, 2, . . . , N) as identifiers are stored in the pattern file IDPAT. Next in the step S19, it is judged whether or not the process of the step S18 (making the identifier pattern) is completed for all the corresponding image components. If not completed here, the process of S18 is repeated by increasing the variable k successively by an increment of one.

Figure 10:
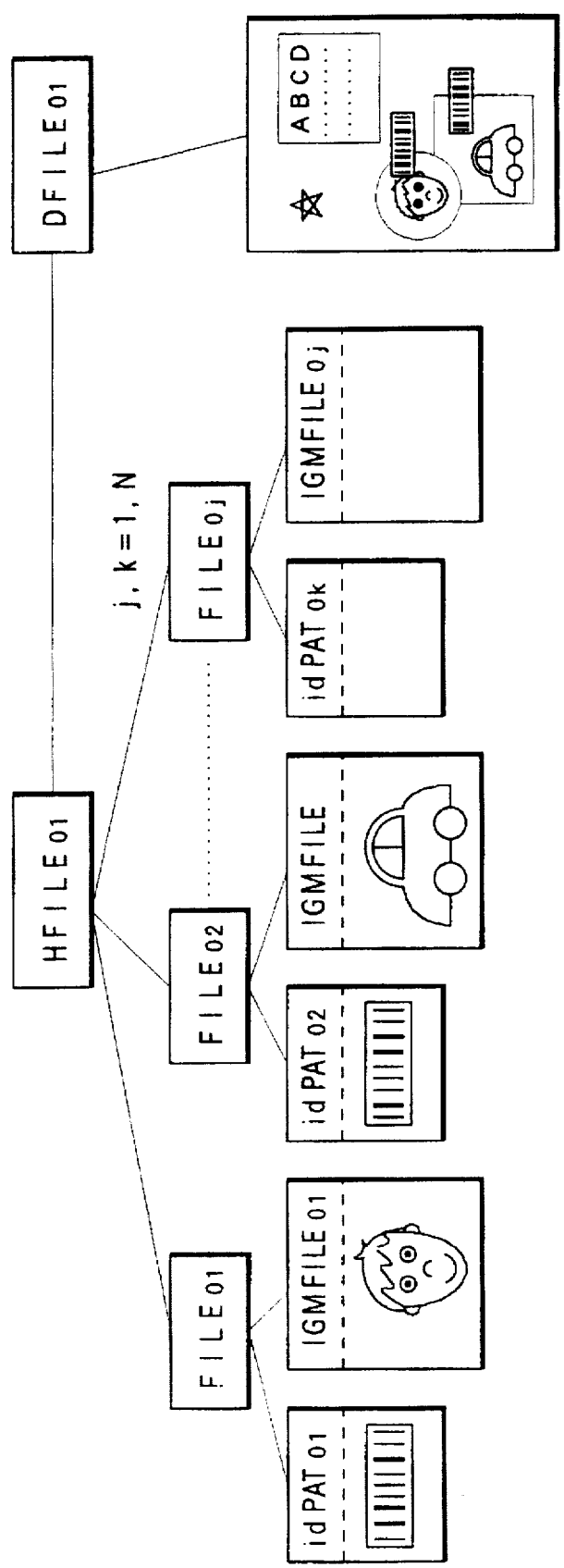
FIG. 10 is a drawing showing the structure of a layout paper attribute file and the layout paper file.

When the process of the step S18 is completed for all the image attribute files in the step S19, the CPU in the step S20 pastes the bar codes generated from the bar code data idPAT0k (idPAT01, idPAT02, . . . ) to the displayed identifier pasting locations for respective image components. In other words, the bar code (identifier) data idPAT0k are successively synthesized on the layout paper file DFILE01. At the same time here, text data corresponding to the text area and linework data corresponding to the linework area are read respectively from different files and written in the layout paper file DFILE01. The arrangement of such files at this point is shown in FIG. 10.

Figure 11:
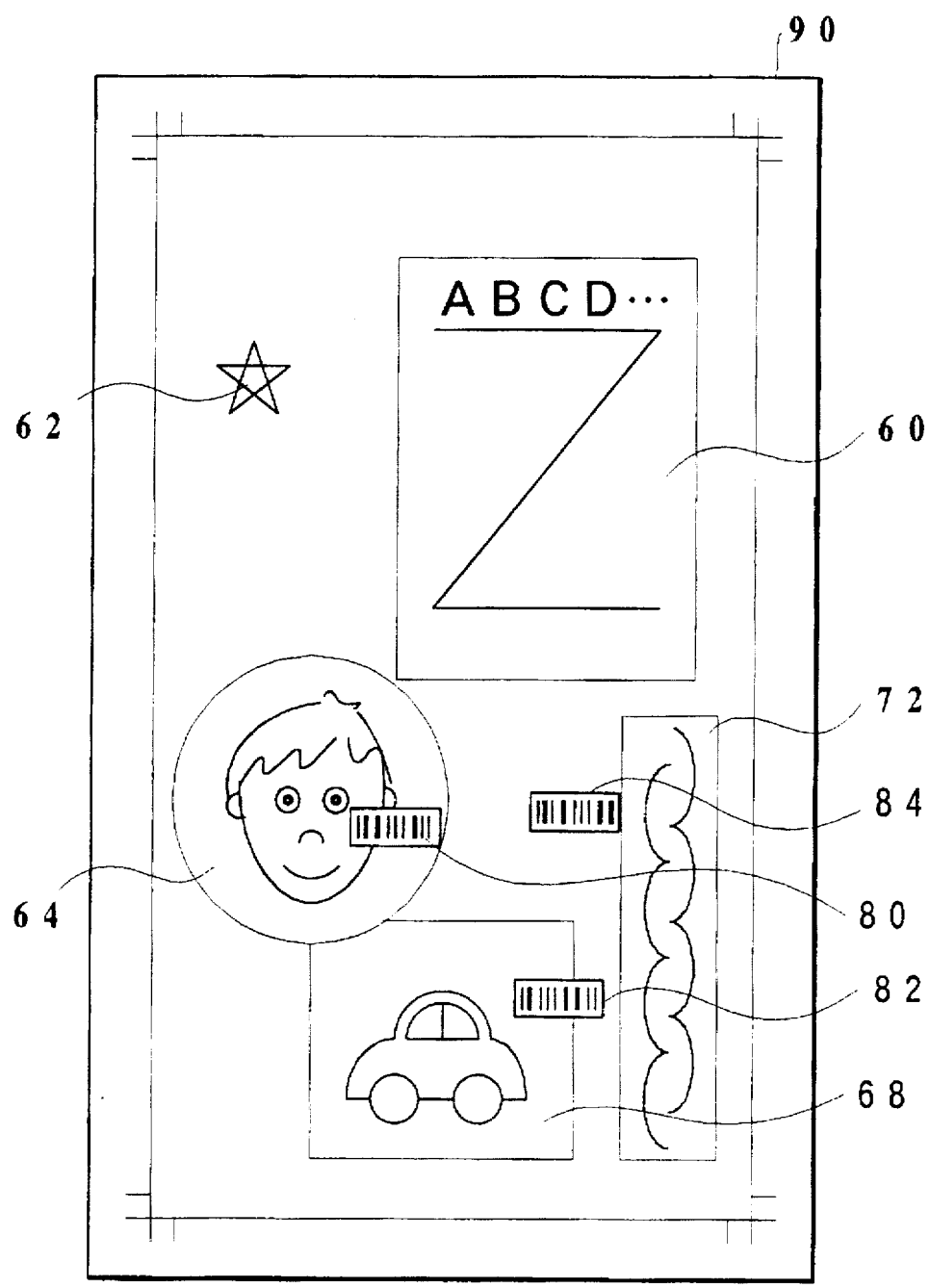
FIG. 11 is a drawing showing a completed layout paper 90.

Next, a layout paper which is a prepress command sheet is outputted from output means which is the printer 47 (step S21). FIG. 11 shows the layout paper 90 printed out in this way. Bar codes 80, 82, and 84 are respectively attached to locations in the vicinity of corresponding image components 64, 68, and 72. The phrase "in the vicinity" for the purpose of this specification represents either of the following cases: a case in which the bar code 80 is completely included in the corresponding image component 64, a case in which the bar code 82 is partially protruding from the corresponding image component 68, or a case in which the bar code 84 is laid out near the corresponding image component 72.

For the portion where the bar code overlaps the corresponding image component, it is preferable that the corresponding image component be not recorded but only the bar code be displayed. For, if the corresponding image component is recorded with the bar code overlapped on it, the bar code may be incorrectly read in the prepress process which will be explained later.

Figure 12:
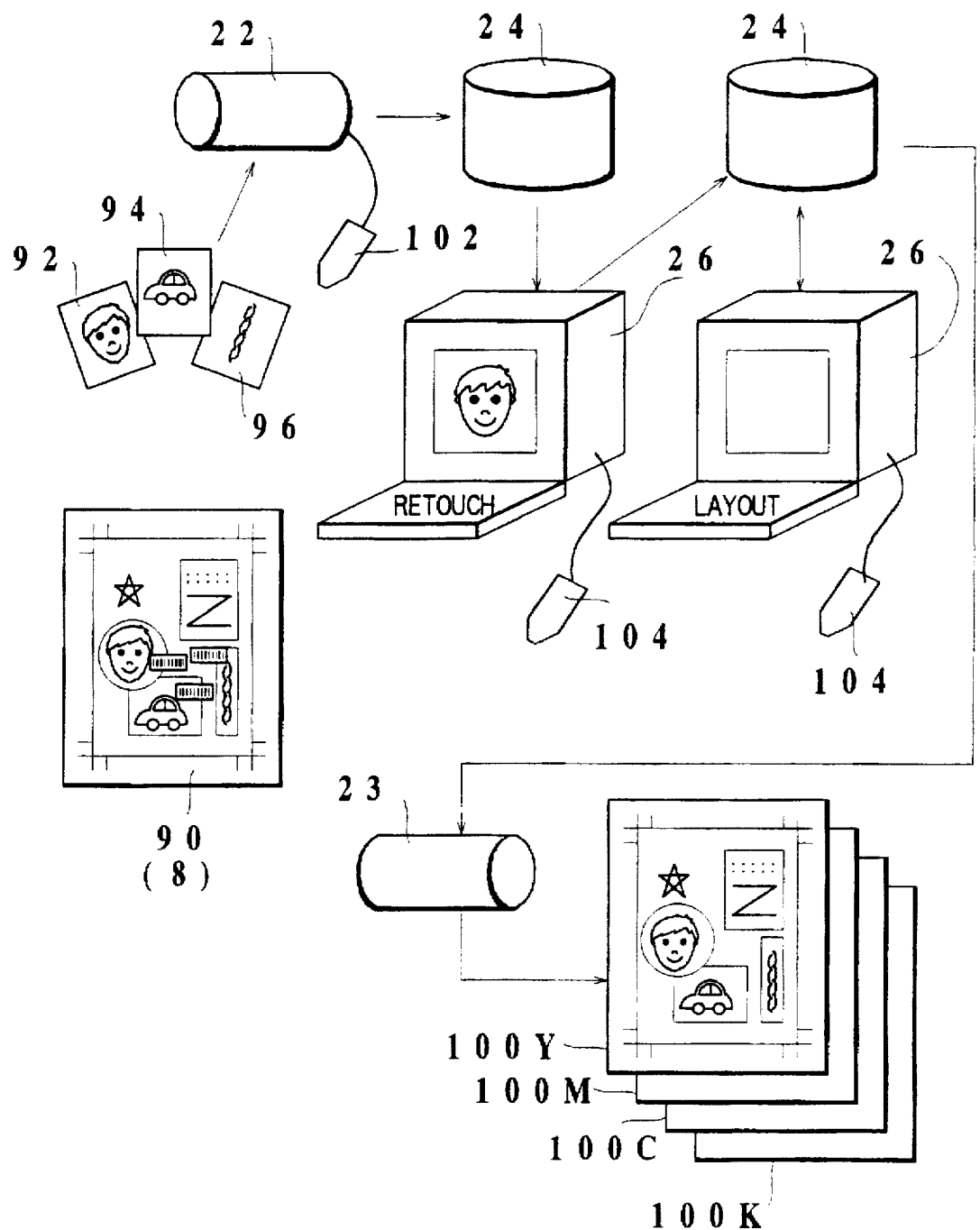
FIG. 12 is a conceptual drawing of the prepress process using the layout paper 90.
Figure 47B:
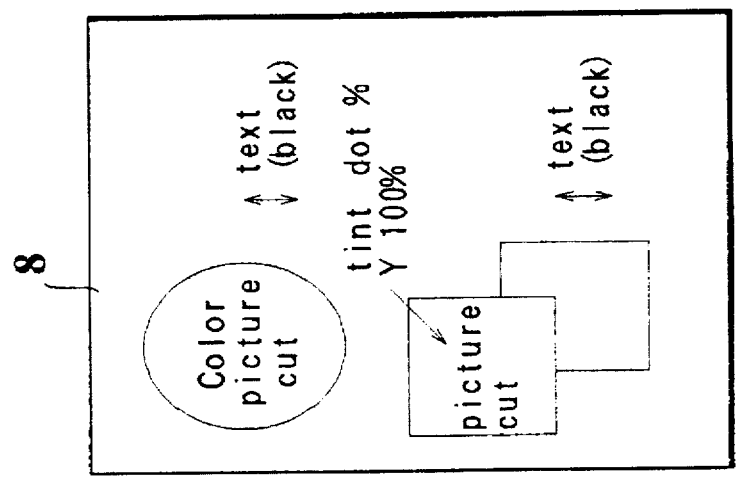
FIGS. 47A and 47B are drawings showing conventional layout paper 6 and command sheet 8.
Figure 47A:
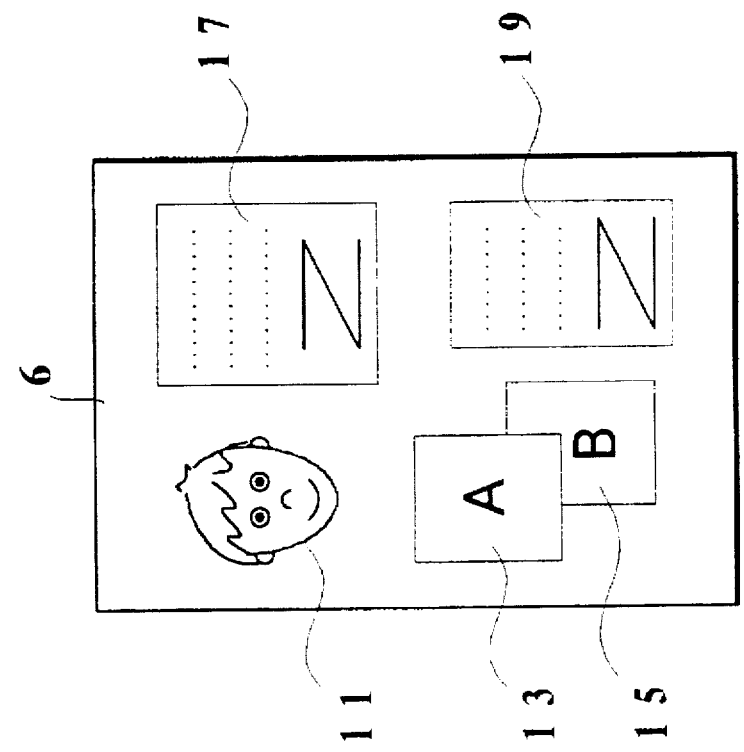

Next, the process of prepress using the layout paper 90 is explained in reference to FIG. 12. A command sheet 8 as shown in FIG. 47B, as well as the layout paper 90, are handed to the operator of the prepress process.

In the prepress process, the image components 92, 94, and 96 are read by the input scanner 22 and stored as image data on the magnetic disk 24. The input scanner 22 used in the prepress process has a resolution higher than that of the scanner 56 (Refer to FIG. 2) used in the design process. At the time of this reading, the operator using a bar code reader 102 reads bar codes 80, 82, and 84 (refer to FIG. 11) on the layout paper 90 respectively corresponding to the image components 92, 94, and 96, attaches identification numbers aside from the file names, and stores them on the magnetic disk 24.

Next, the prepress operator reads the image components 92, 94, and 96 stored on the magnetic disk 24 into the computer 26, displays them on the monitor, and retouches the image components 92, 94, and 96 according to the layout paper 90 and the command sheet. At this time, the operator using a bar code reader 104 reads the bar code attached to the corresponding image component corresponding to the image component he intends to read on the layout paper 90 and enters the data into the computer 26. The computer 26, according to the read bar code, searches and reads the image component of the same identification number from the magnetic disk 24. Therefore, the operator can read the image component accurately by only tracing the bar code with the bar code reader 104 so that the work is done fast.

The image components 92, 94, and 96 retrieved in this way are cut to the size indicated on the layout paper 90 and the command sheet, adjusted for their hues, enlarged or contracted, or rotated. The retouched image components 92, 94, and 96 are again stored on the magnetic disk 24.

Next, each of the image components is laid out (collected) according to the layout paper 90 and the command sheet. Here too, reading of the image components 92, 94, and 96 is done by only tracing the bar code with the bar code reader 104. The collected data are again stored on the magnetic disk 24. Single color films 100Y, 100M, 100C, and 100K are prepared by the output scanner 23 and used for exposure work and succeeding development work to produce printing plates (not shown) in respective colors.

With the prepress command sheet preparing device, prepress command sheet preparing method, and prepress command sheet according to the invention, the identifiers associated at least with respective image components are laid out in the vicinity of respective corresponding image components. Therefore, the image components corresponding to the respective corresponding image components can be specified readily only by reading the identifiers. In other words, the prepress work is done efficiently without errors according to the invention.

Figure 13:
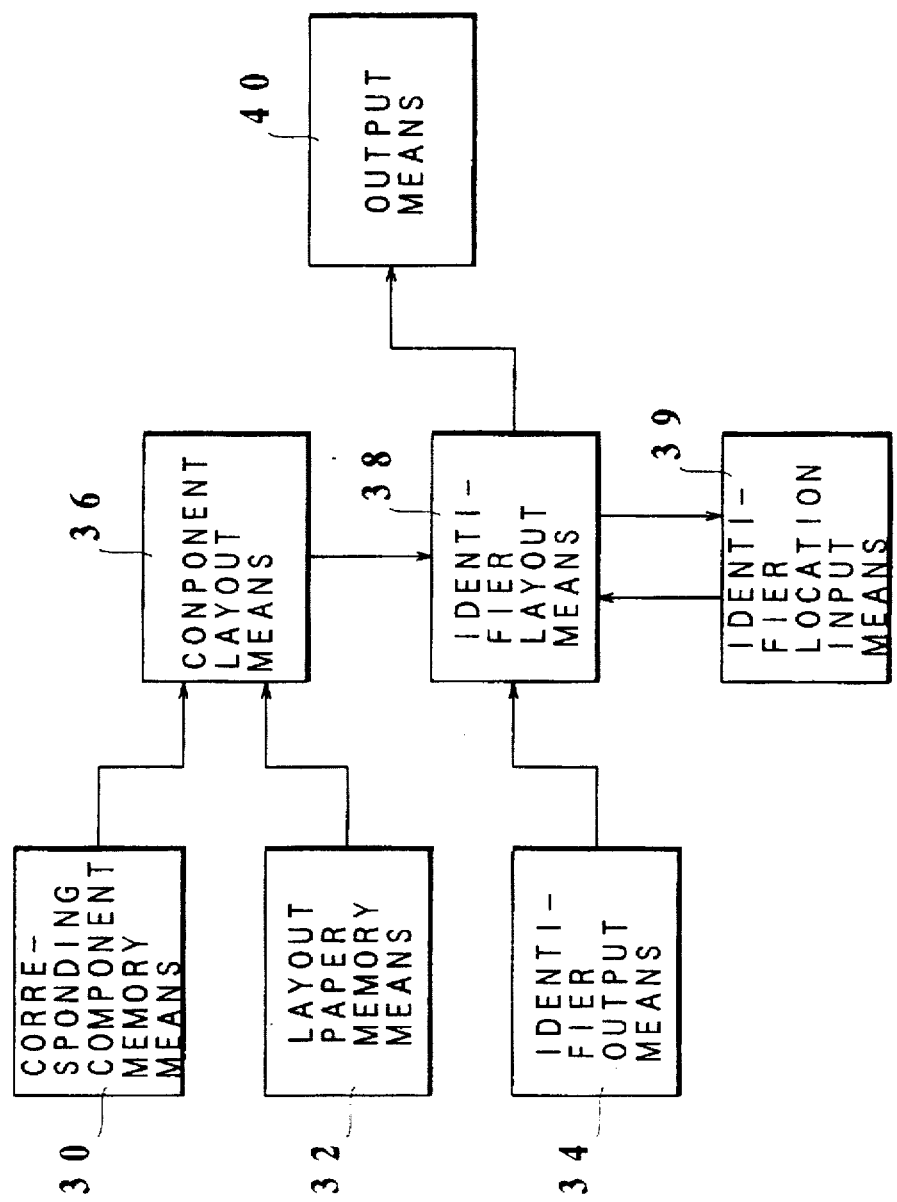
FIG. 13 is a block diagram showing the entire setup of a prepress command sheet preparing device according to another embodiment.

FIG. 13 shows another embodiment of entire setup of the prepress command sheet preparing device according to the invention. In the corresponding image component memory means 30 are stored electronic data for the corresponding image components, corresponding text components, and corresponding linework components. In the layout paper memory means 32 are stored electronic data for the layout paper for the prepress command sheet. The component layout means 36 lays out the corresponding image components, corresponding text components, and corresponding linework components on the layout paper according to a command of the operator. An identifier location input means 39 displays the corresponding image components. The operator according to the display enters the identifier layout location in the vicinity of the corresponding image components. An identifier layout means 38 reads the identifier for each of the corresponding image components from the identifier output means 34 and places it in the inputted layout location. If the layout in this location cannot be made, the identifier layout means 38 prompts an identifier location input means 39 to input again. If the inputted location is not in the vicinity of the corresponding image components, the identifier layout means 38 places a relation line connecting between the identifier and the corresponding image component. An output means 40 records the corresponding image components, corresponding text components, corresponding linework components, relation lines, and identifiers associated with respective corresponding image components on the layout paper, and outputs the prepress command sheet.

In this embodiment, judgment is made whether or not the inputted location of the identifier is appropriate, and if not, the identifier is pasted to blank portion of the layout paper, and the relation line is recorded between the identifier and corresponding image component.

Figure 14:
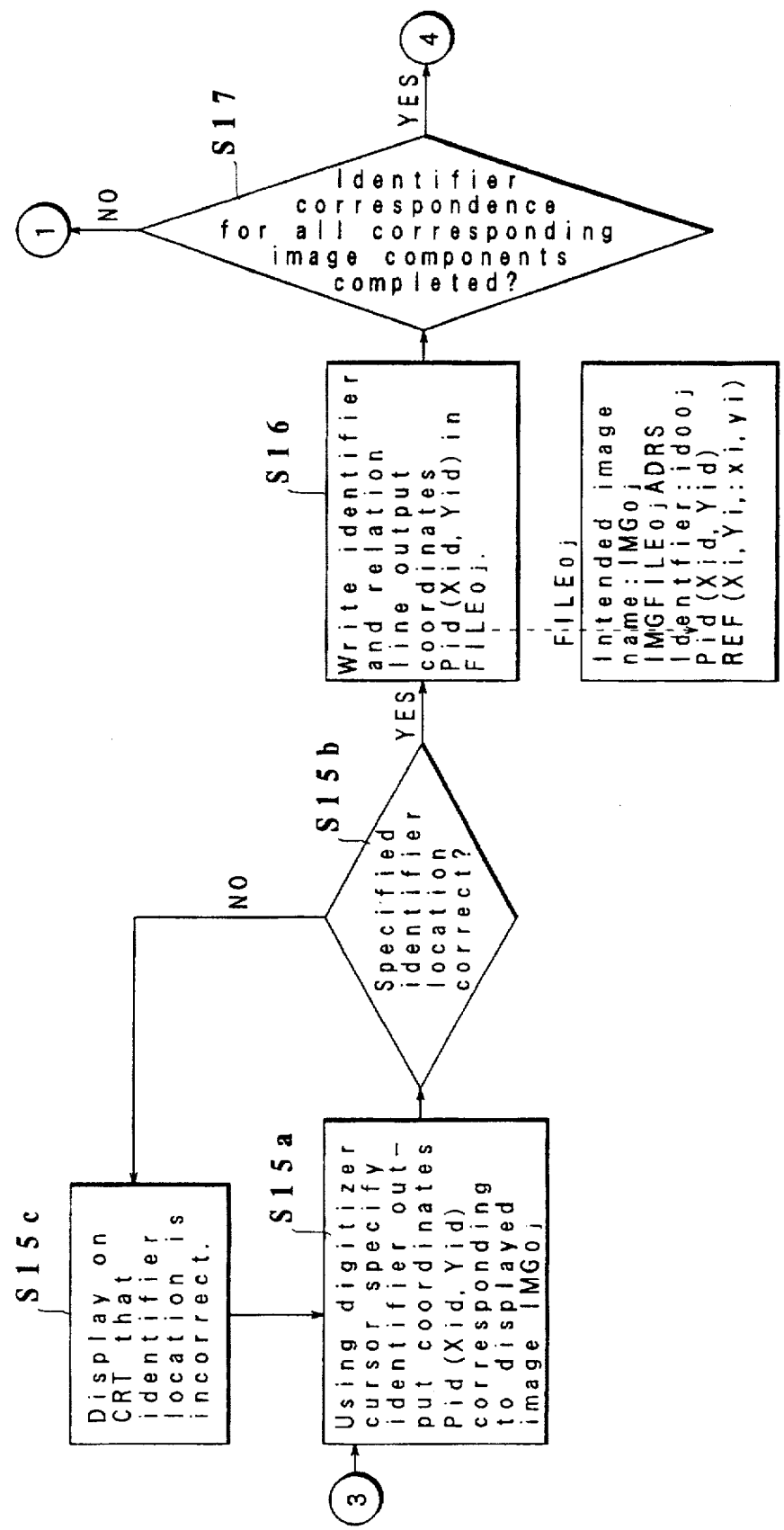
FIG. 14 is a flow chart showing the process of preparing the prepress command sheet.

The hardware setup for attaining the functions of the blocks in FIG. 13 is the same with that of FIG. 2. In this embodiment, the identifier location input means 39 is constituted with the CRT monitor 48 and the digitizer 50. Also, the process flow charts are similar to FIGS. 3 through 7. However, since the functions of the identifier location input means 39 and the identifier layout means 38 are different from those of the embodiment shown in FIG. 1, the flow chart corresponding to such parts is also different. The flow chart for such different parts only is shown in FIG. 14. This flow chart is a counterpart of FIG. 6 for the embodiment shown in FIG. 1.

Figure 3:
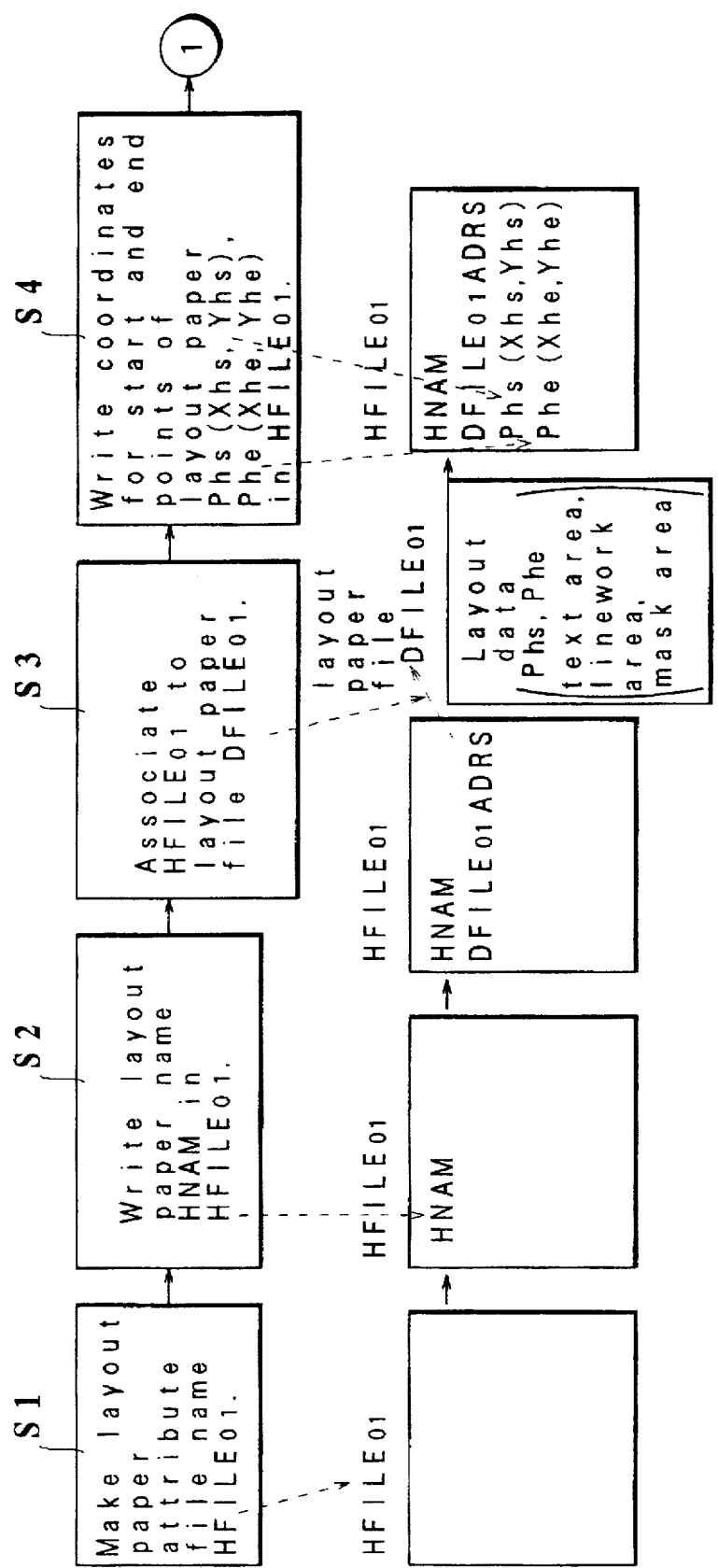
Figure 5:
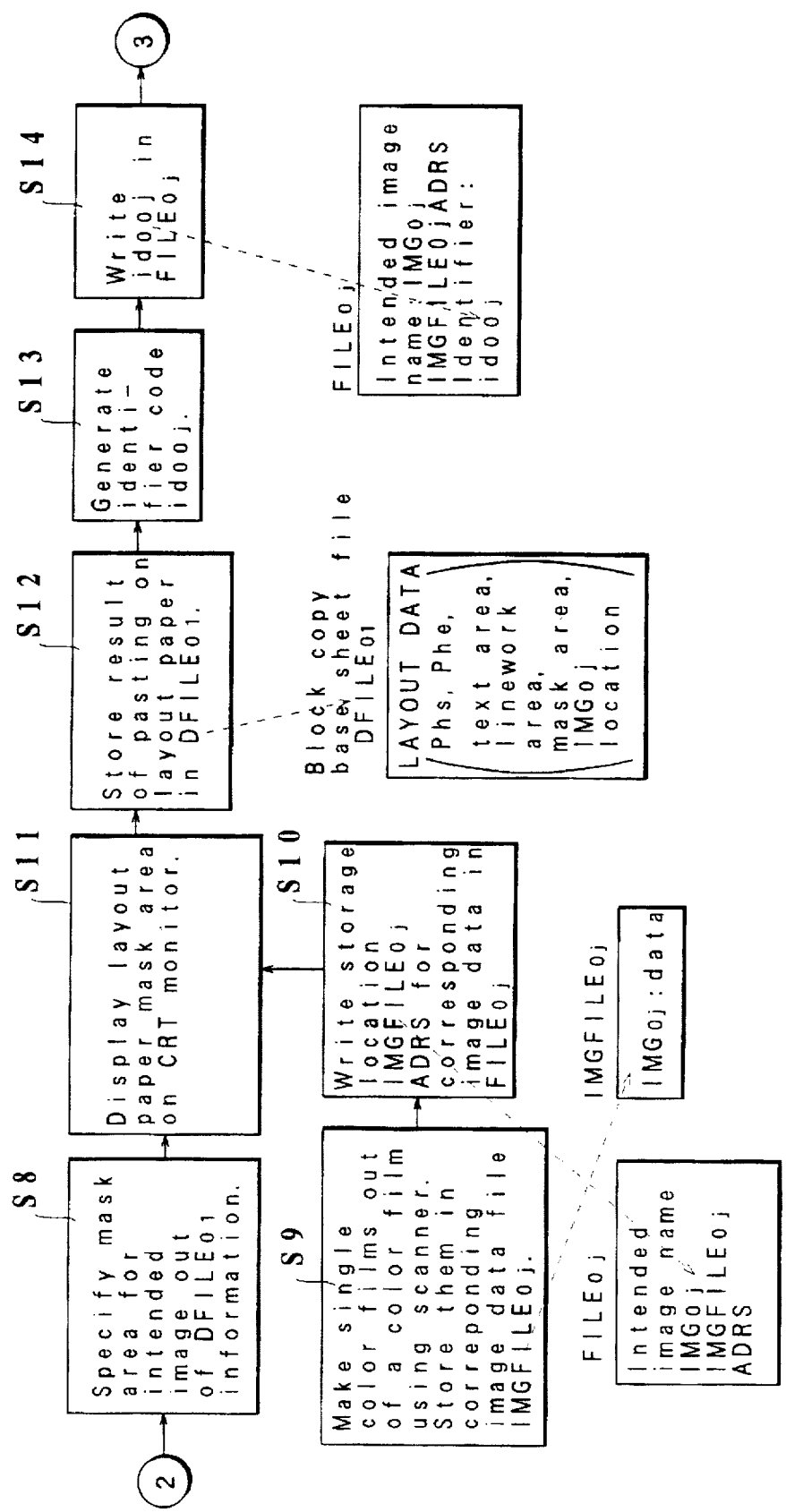
Figure 6:
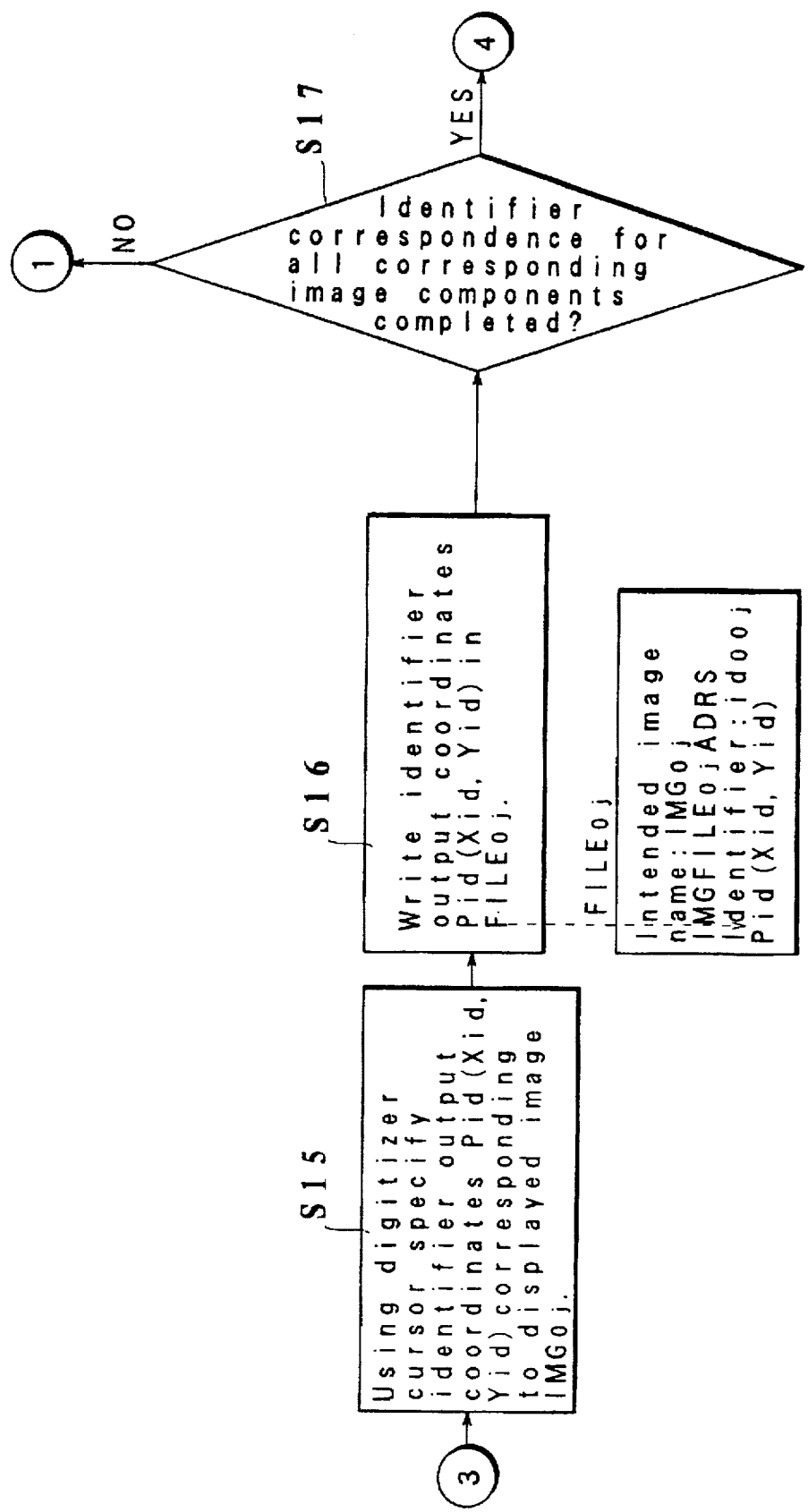
Figures 15A, 15B:
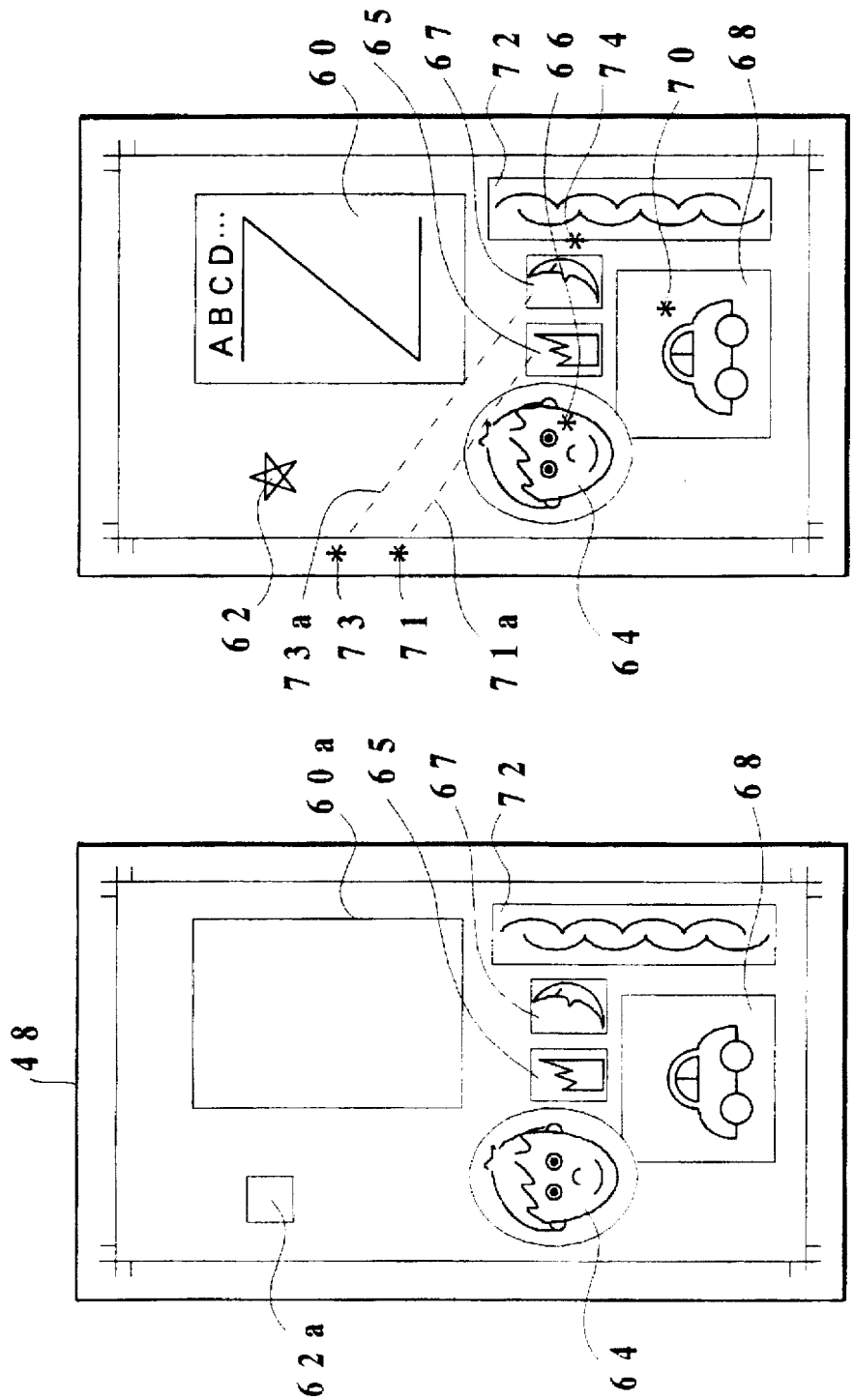
FIGS. 15A and 15B are drawings showing corresponding image components pasted on the layout paper file.

First, as shown in flow charts (steps S1 through S12) of FIGS. 3 through 5, the locations for the corresponding image components read by the input scanner 56 are written in the layout paper file DFILE01. This produces a display on the CRT monitor 48 as shown in FIG. 15A. In other words, the corresponding image components (here, they are assumed as 64, 65, 67, 68 and 72) are displayed as they are laid out on the layout paper.

Next, the CPU generates the identifier codes id00j to be attached to these corresponding image components (FIG. 5, step S13). In this embodiment, the identifier codes id00j are generated in consecutive numbers. Therefore, first the identifier code "id001" is generated. It may also be constituted that the identifier codes of consecutive numbers are stored in advance on the magnetic disk 54 and read out automatically in succession.

The CPU 42 writes the identifier codes "id00j" in the image attribute file FILE01 (FIG. 5, step S14). Here, the operator moves the cursor of the digitizer 50 to specify where (output coordinates) on a displayed corresponding image component (for example 64) an identifier code is to be laid out (FIG. 14, step S15a). Upon receiving the specification, the CPU 42 judges whether or not the inputted location of the identifier is correct (FIG. 14, step S15b). The judgment on the correctness of the location of the identifier will be explained later. Here, the explanation is continued assuming that the location is judged as correct.

Next, the CPU 42 writes the pasting location (output coordinates) Pid of the identifier id00j in the image attribute file FILE0j using X-Y coordinates (FIG. 14, step S16). At the same time, the identifier pasting location relative to the corresponding image component 64 is displayed (66) on the CRT monitor 48 as shown in FIG. 15B.

Next, judgment is made whether or not the identifier correspondence process described above has been done for all the corresponding image components (FIG. 14, step S17). If there are any corresponding image components not processed yet, steps S5 through S16 are performed by successively increasing the variable j by an increment of one. Here, the image attribute files are made in consecutive numbers such as FILE02, FILE03, . . . Also, the corresponding image data files are made in consecutive numbers such as IMGFILE02, IMGFILE03, and so on. Furthermore, the identifier codes are similarly made in consecutive numbers such as id002, id003, . . .

By the way, if two image components are close to each other like the corresponding image components 65 and 67 shown in FIG. 15B, and the identifiers are small and placed close to each other, it is possible that the identifiers overlap each other and reading becomes impossible, or the corresponding image components are hidden by the identifiers. Therefore, when the location of the identifiers are specified in the step S15a, the CPU 42 judges whether or not the identifiers adjacent to each other overlaps each other, or the corresponding image components are hidden by the identifiers (FIG. 14, step S15b). If such a problem occurs, it is displayed on the CRT monitor 48 that the identifiers cannot be placed in the specified location (FIG. 14, step S15c). Then, input of the identifier location is again prompted.

In that case, the operator specifies the identifier pasting locations 71 and 73 for the corresponding image components 65 and 67 on the blank margin of the layout paper as shown in FIG. 15B. Upon receiving the specification, the CPU 42 generates a relation line 71a between the pasting location 71 and the corresponding image component 65. A relation line 73a is likewise generated between the pasting location 73 and the corresponding image component 67. Here, the CPU 42 stores the coordinates (Xi, Yi: xi, yi) for the start and end points of the relation lines in the image attribute file FILE0j (FIG. 14, step S16).

FIG. 15B shows the state of the screen of the CRT monitor 48 after the process described above is finished with five image components. In the figure are shown the identifier pasting locations 60, 70, and 74 for the corresponding image components 64, 68, and 72. Also shown are pasting locations 71 and 73 related to the corresponding image components 65 and 67 by way of relation lines 71a and 73a.

When the identifier correspondence is completed for all the corresponding image components in the step S17 shown in FIG. 14, the process goes on to the step S18. In the step S18, first a storage location "IDPAT ADRS" for a pattern file IDPAT for the identifier is written in the image attribute file FILE01. Furthermore, bar code data idPAT0k (where the variable k =1, 2, . . . , N) as identifiers are stored in the pattern file IDPAT. Next in the step S19, it is judged whether or not the process of the step S18 (making the identifier pattern) is completed for all the corresponding image components. If not completed here, the process of S18 is repeated by increasing the variable k successively by an increment of one.

When the process of the step S18 is completed for all the image attribute files in the step S19, the CPU in the step S20 pastes the bar codes generated from the bar code data idPAT0k (idPAT01, idPAT02, . . . ) to the displayed identifier pasting locations for respective image components. In other words, the bar code (identifier) data idPAT0k are successively synthesized on the layout paper file DFILE01. At the same time here, text data corresponding to the text area and linework data corresponding to the linework area are read respectively from different files and written in the layout paper file DFILE01. The arrangement of such files at this point is shown in FIG. 10.

Figure 7:
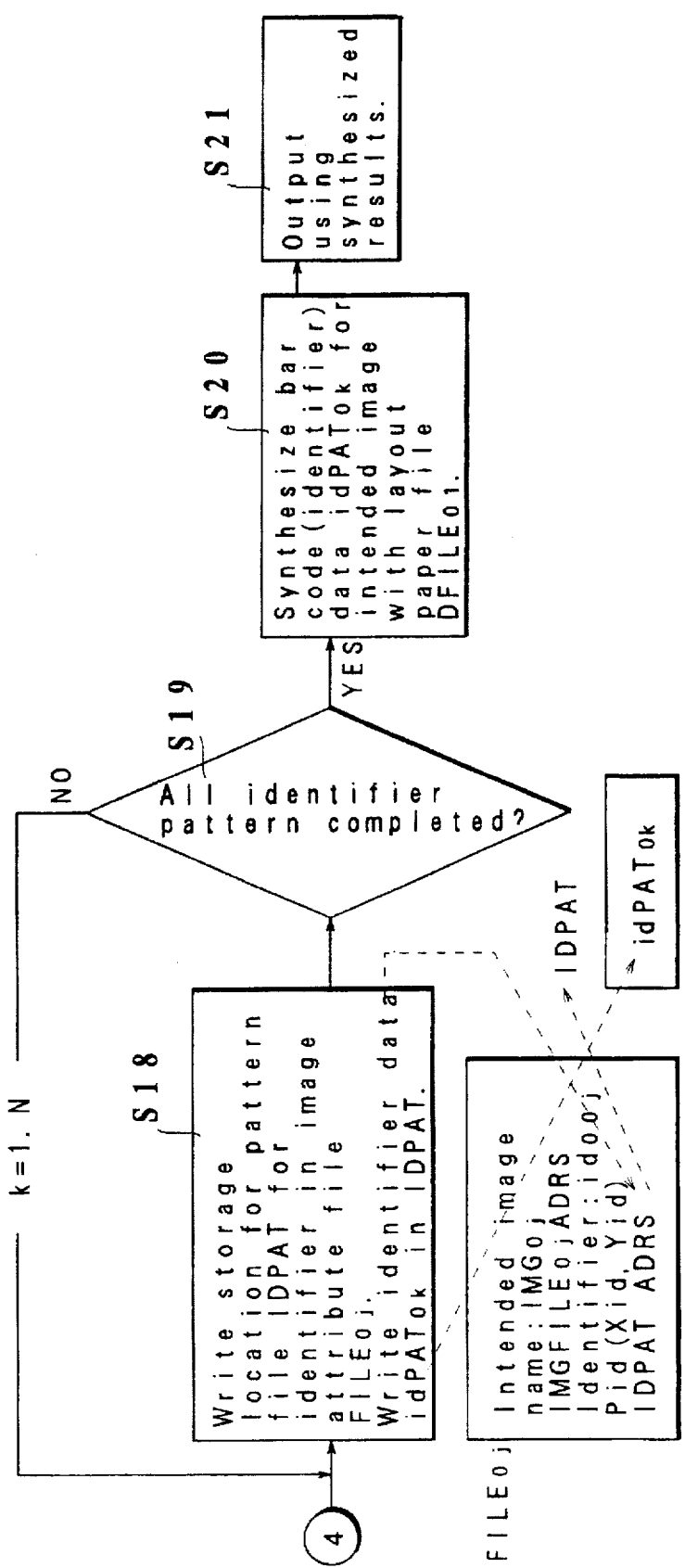
Figure 16:
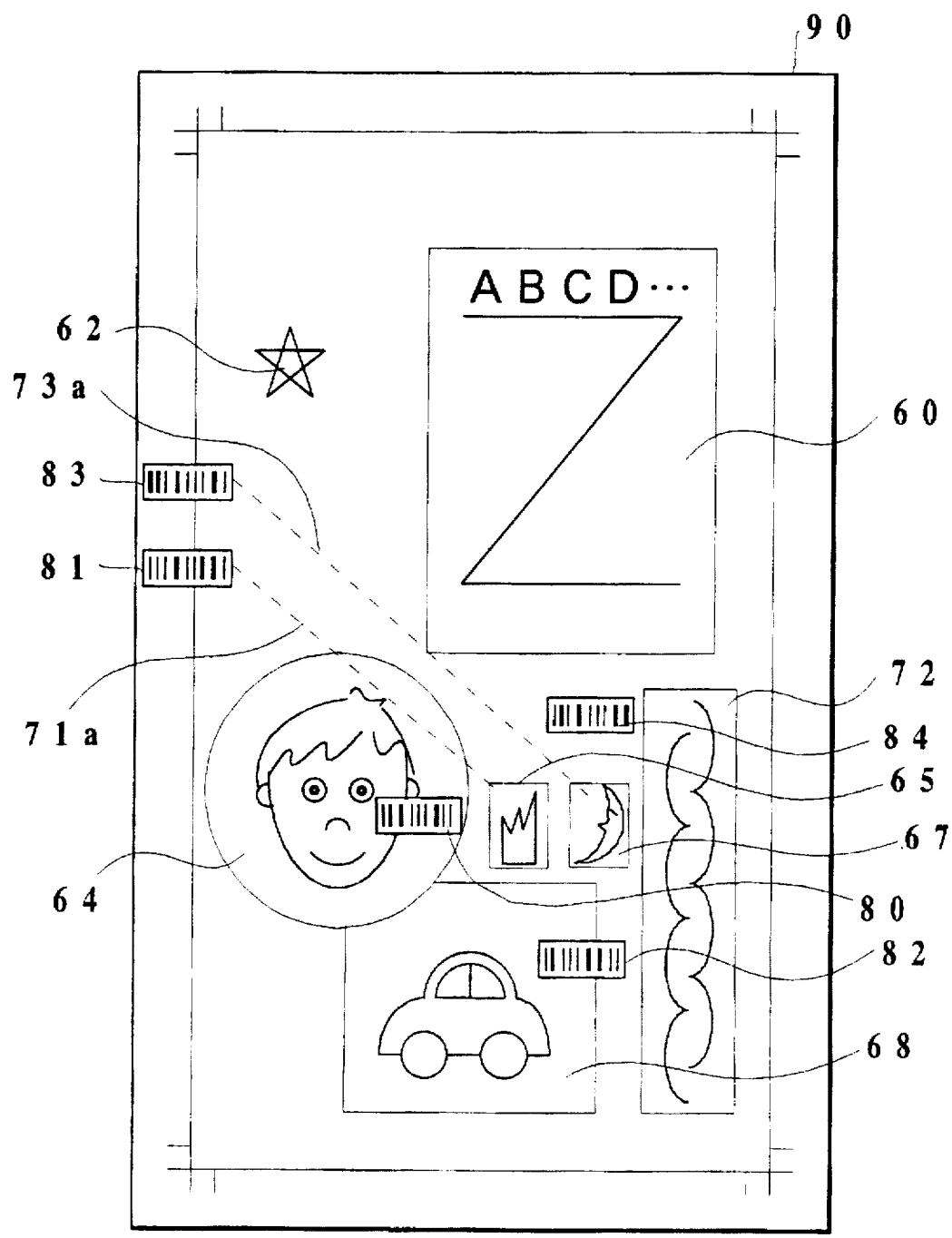
FIG. 16 is a drawing showing the completed layout paper 90.

Next, a layout paper which is a prepress command sheet is outputted from output means which is the printer 47 (FIG. 7, step S21). FIG. 16 shows the layout paper 90 printed out in this way. Bar codes 80, 82, and 84 are respectively attached to locations in the vicinity of corresponding image components 64, 68, and 72. For the corresponding image components 65 and 67, the bar codes 81 and 82 are placed in the blank margin and the relation lines 71a and 73a are provided to show the corresponding relationship. With the prepress command sheet preparing device, prepress command sheet preparing method, and prepress command sheet according to the invention, the identifiers associated at least with respective image components are laid out in the vicinity of respective corresponding image components. Therefore, the image components corresponding to the respective corresponding image components can be specified readily only by reading the identifiers. In other words, the prepress work is done efficiently without error according to the invention.

Figure 17:
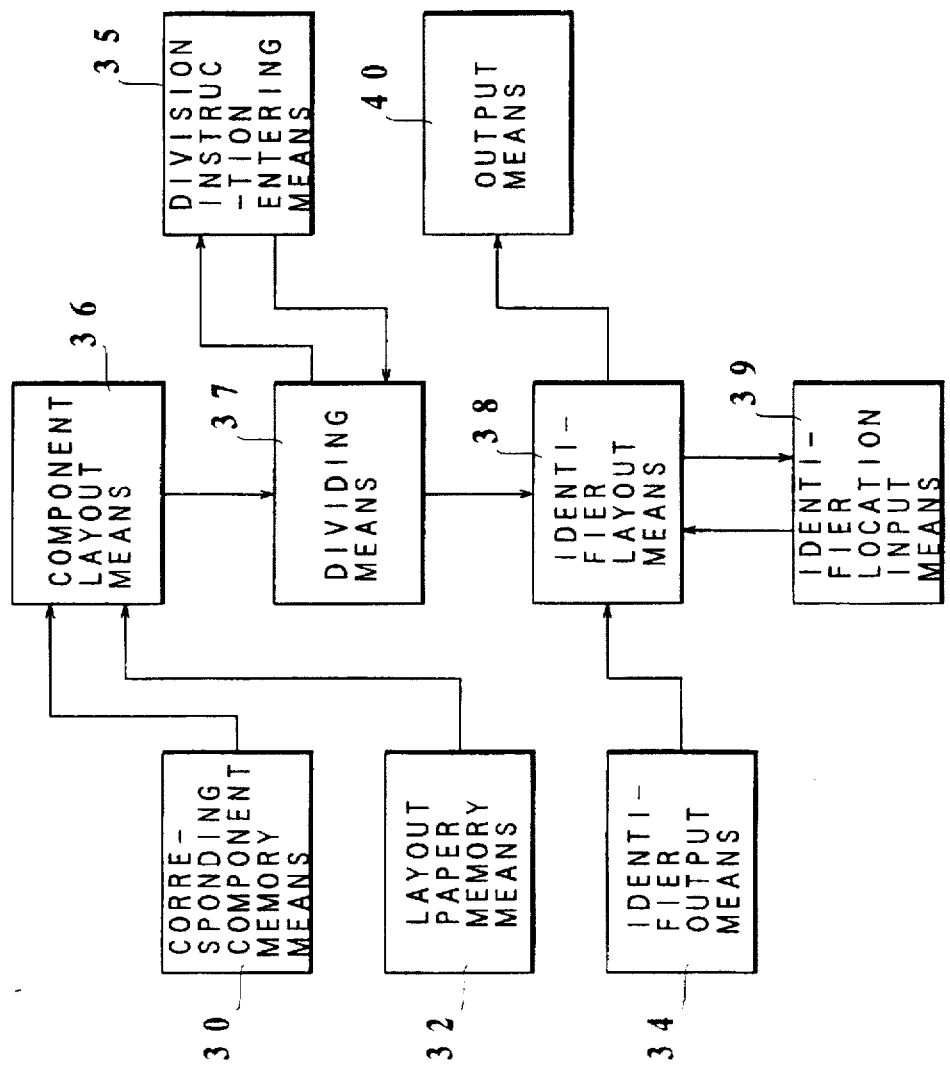
FIG. 17 is a block diagram showing the entire setup of a prepress command sheet preparing device according to another embodiment.
Figure 18:
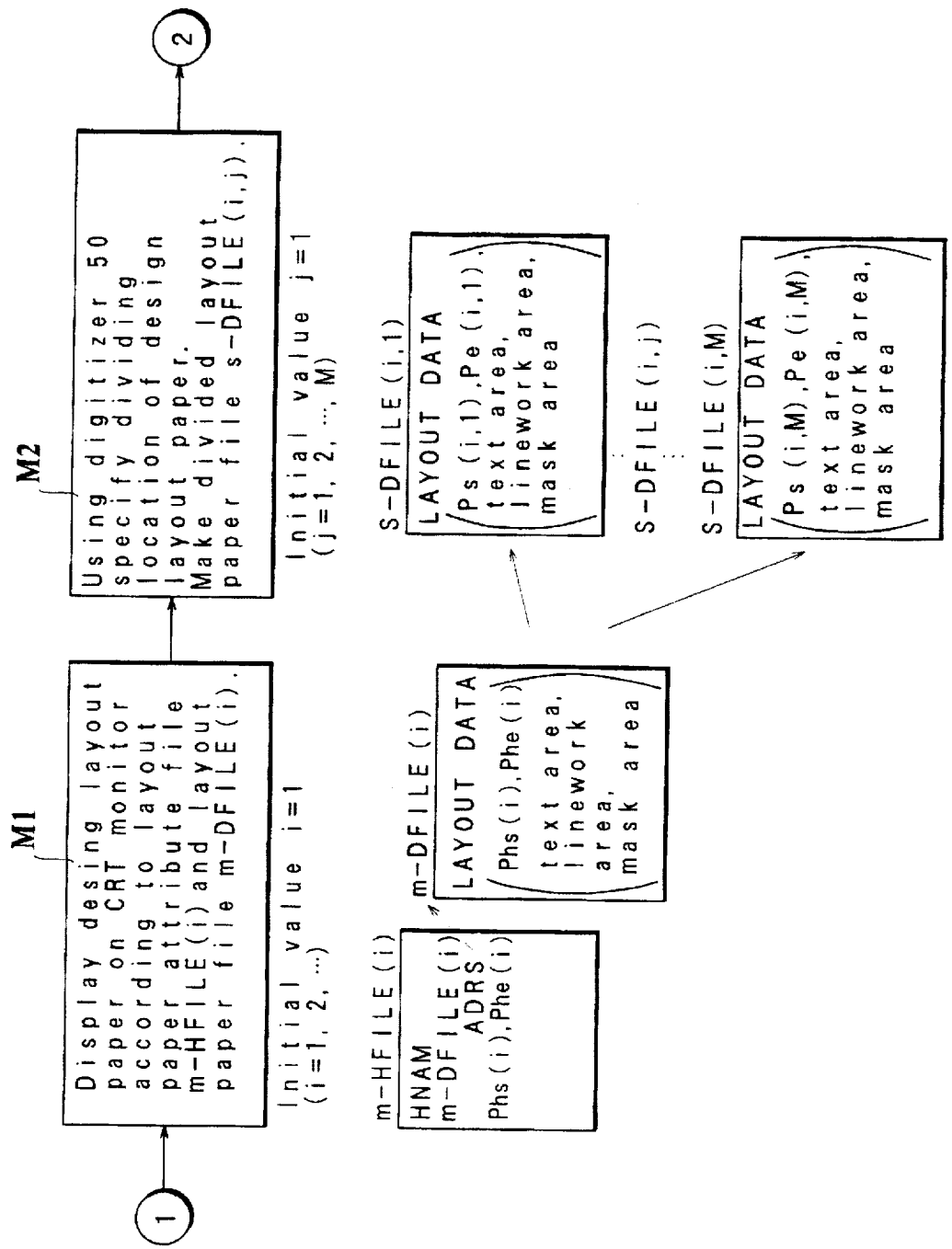
Figure 19:
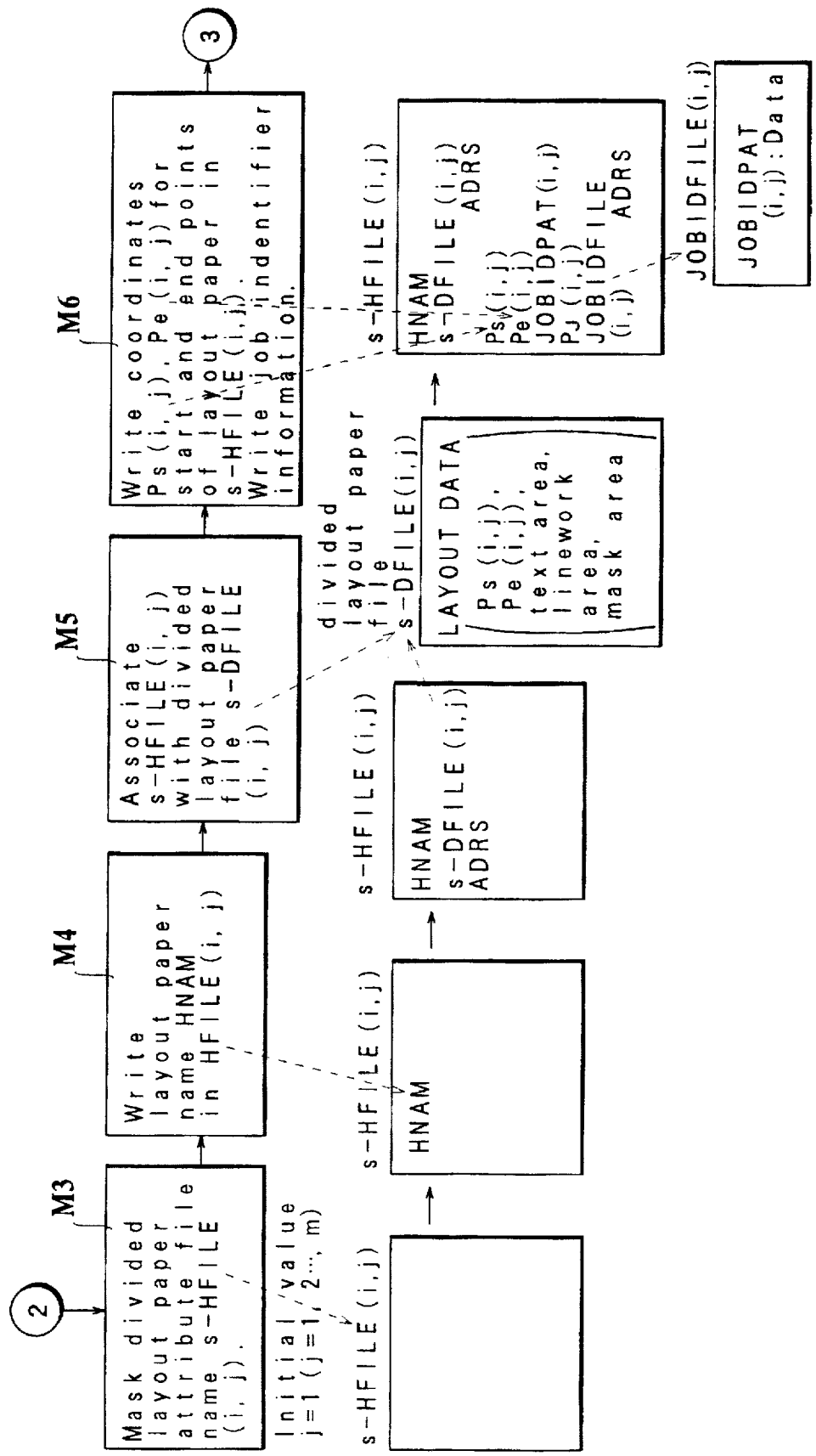
Figure 21:
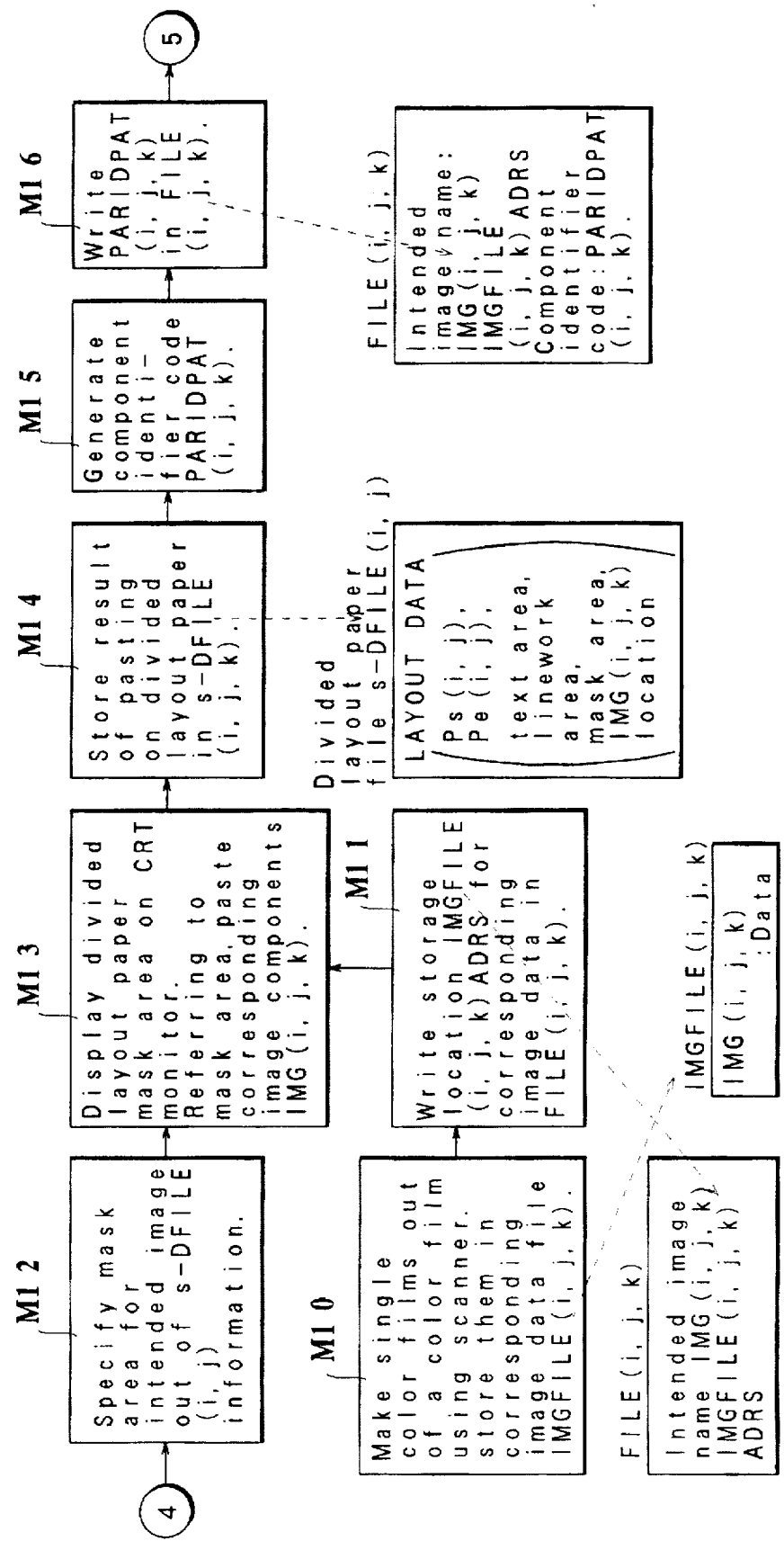
Figure 22:
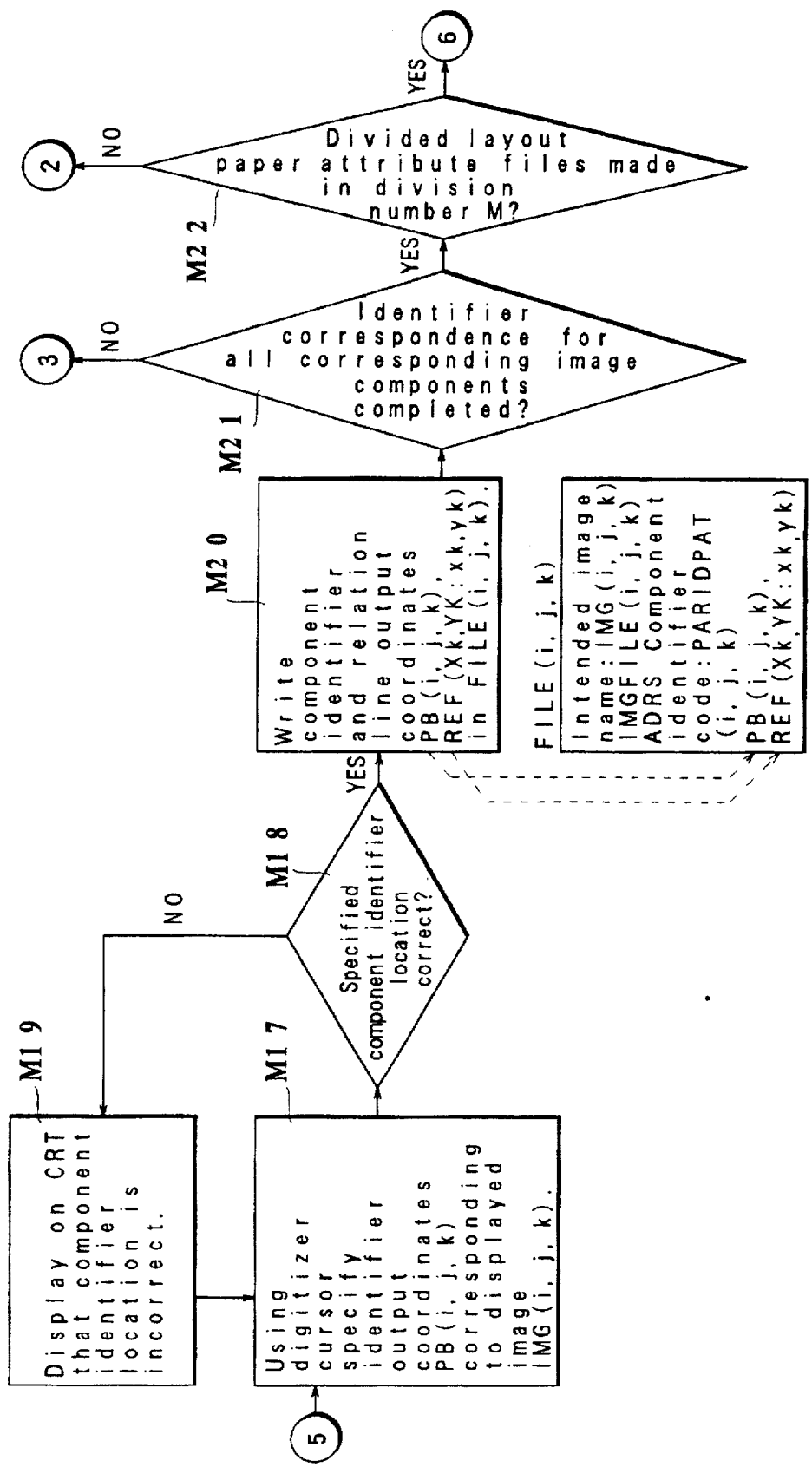
Figure 23:
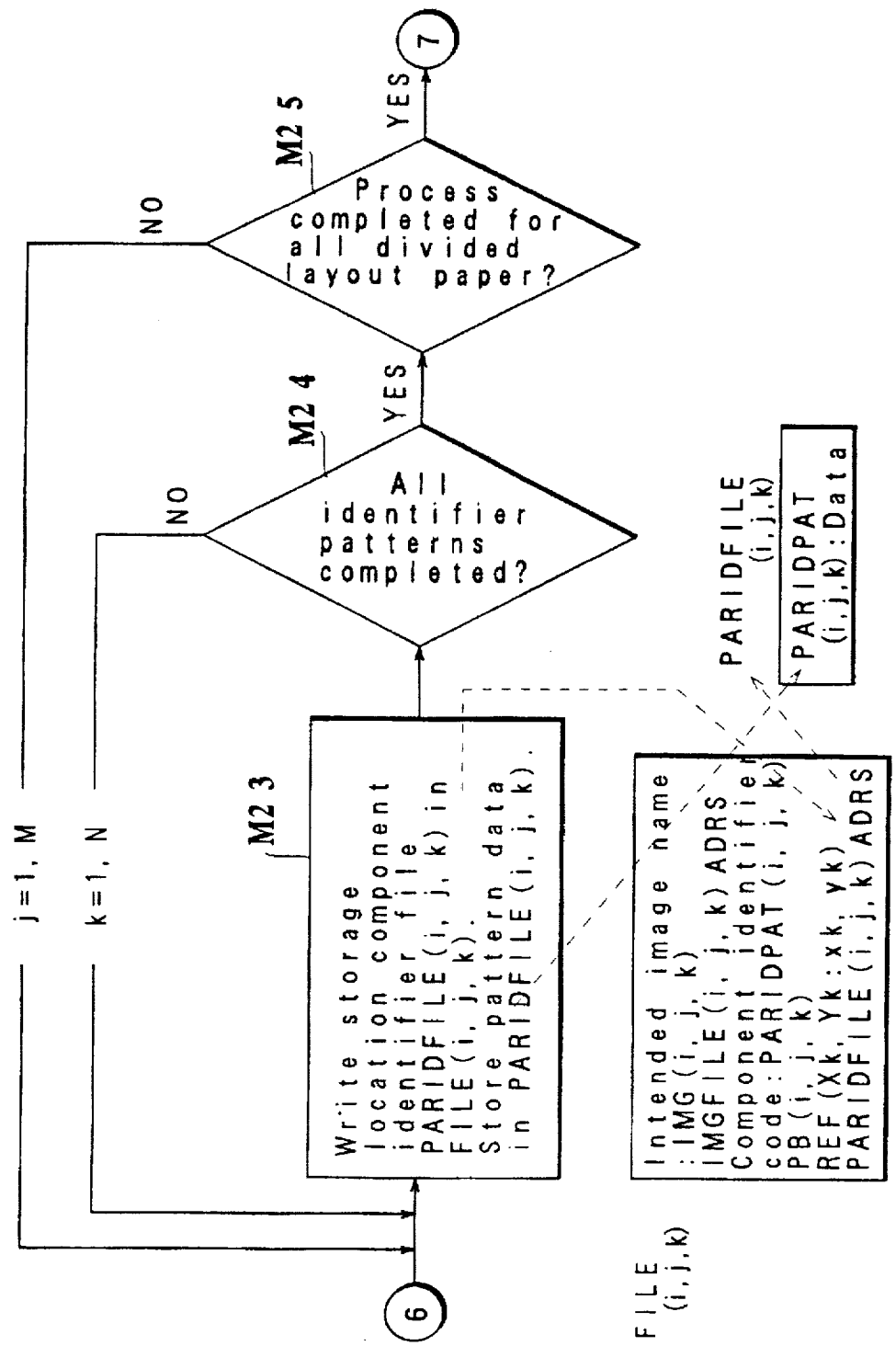
Figure 24:
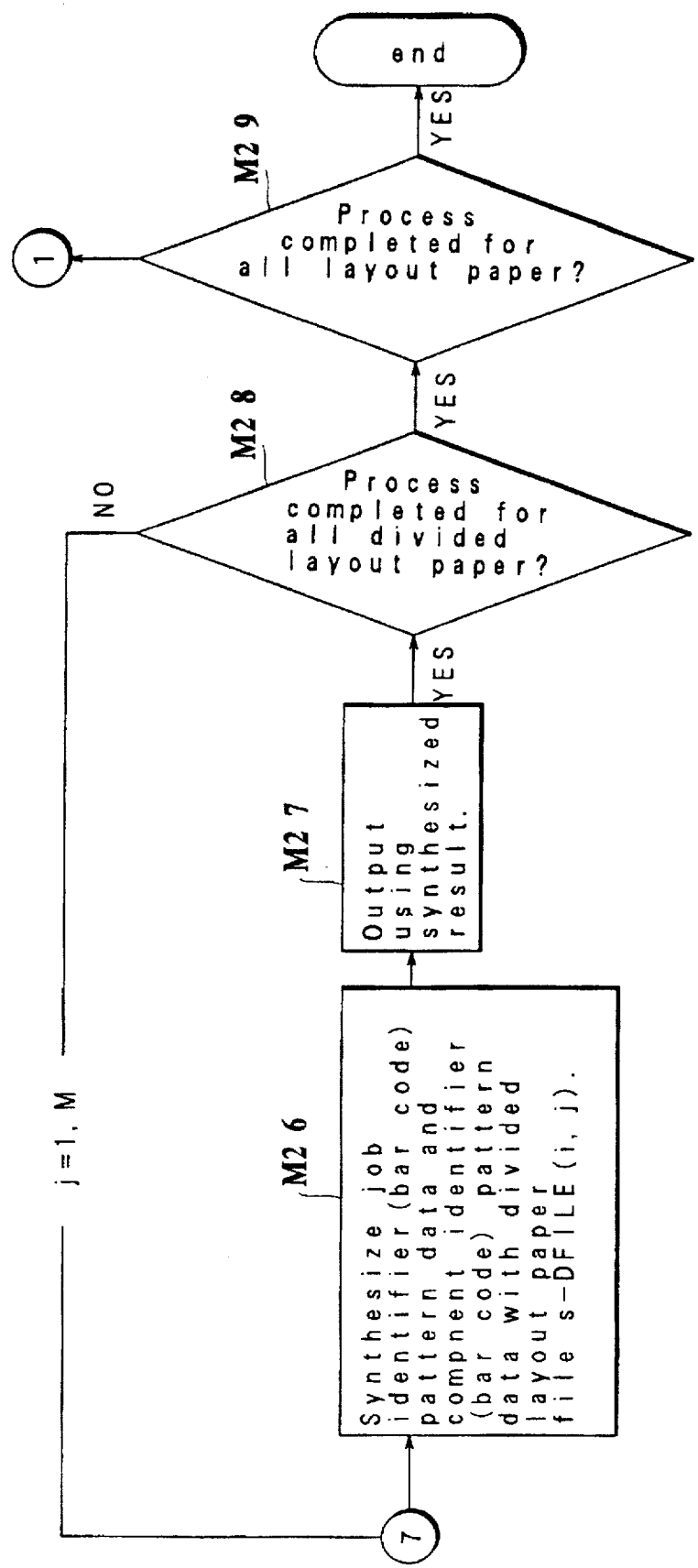

FIG. 17 shows another embodiment of entire setup of the prepress command sheet preparing device according to the invention. In the corresponding image component memory means 30 are stored electronic data for the corresponding image components, corresponding text components, and corresponding linework components. In the layout paper memory means 32 are stored electronic data for the layout paper for the prepress command sheet. The component layout means 36 lays out the corresponding image components, corresponding text components, and corresponding linework components on the layout paper according to a command of the operator. A division instruction input means 35 displays locations of the corresponding image components, corresponding text components, and corresponding linework components on the layout paper. The operator enters a division instruction according to the display. A division means 37 receiving the instruction separates the layout paper. The identifier location input means 39 displays the corresponding image components for each of the layout papers. The operator according to the display enters the locations of the identifiers in the vicinity of the corresponding image components. The identifier layout means 38 reads the identifier for each of the corresponding image components from the identifier output means 34 and places it in the inputted layout location. If the layout in this location cannot be made, the identifier layout means 38 prompts the identifier location input means 39 to input again. If the inputted location is not in the vicinity of the corresponding image components, the identifier layout means 38 places a relation line connecting between the identifier and the corresponding image component. The output means 40 records the corresponding image components, corresponding text components, corresponding linework components, relation lines, and identifiers associated with respective corresponding image components on the layout paper, and outputs a divided prepress command sheet.

The hardware setup for attaining the functions of the blocks in FIG. 17 is the same with that of FIG. 2. In this embodiment, the division instruction input means 35 and the identifier location input means 39 are constituted with the CRT monitor 48 and the digitizer 50.

Figure 32:
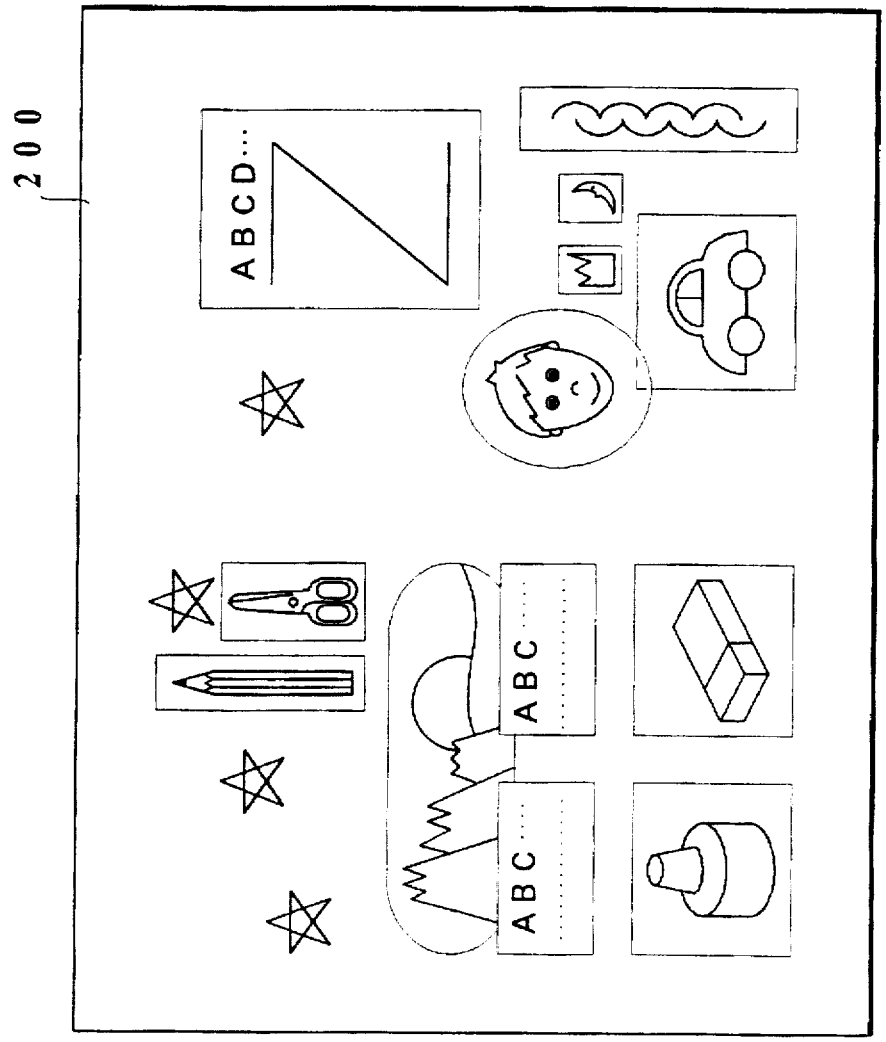
FIG. 32 is a drawing showing a final print as an example.

The procedure for making out the prepress command sheet using the prepress command sheet preparing device is explained below. The flow charts are shown in FIGS. 18 through 24. Here it is assumed that a prepress command sheet is to be made for a final print 200 as shown in FIG. 32.

First, the operator using the CRT monitor 48, digitizer 50, and keyboard 52 lays out the corresponding text components, corresponding linework components, and corresponding image component on the layout paper. As a result, a layout paper attribute file m-HFILE(i) and a layout paper file m-DFILE(i) are made and recorded on the magnetic disk 54. Here, in the layout paper attribute file m-HFILE(i) are stored a layout paper name HNAM, layout paper size (coordinate data for diagonally located start point Phs(i) and end point Phe(i)), and the relationship with the layout paper file m-DFILE(i). In the layout paper file m-DFILE(i) which is related to the layout paper attribute file m-HFILE(i) are stored layout locations (coordinate data) for the corresponding text components, corresponding linework components, and corresponding image components, in the form of text area, linework areas, and mask areas. These coordinate data are collectively referred to as layout data.

The variable i of the layout paper attribute file m-HFILE(i) indicates at what sequence number a layout paper is among all the block copies. In other words, the first layout paper attribute file is m-HFILE(1), the second is m-HFILE(2), the third is m-HFILE(3), and so on. The same rule applies to the layout paper file. Since the number of the final print 200 is one here, only the layout paper attribute file m-HFILE(1) and layout paper file m-DFILE(1) are made.

Figure 25:
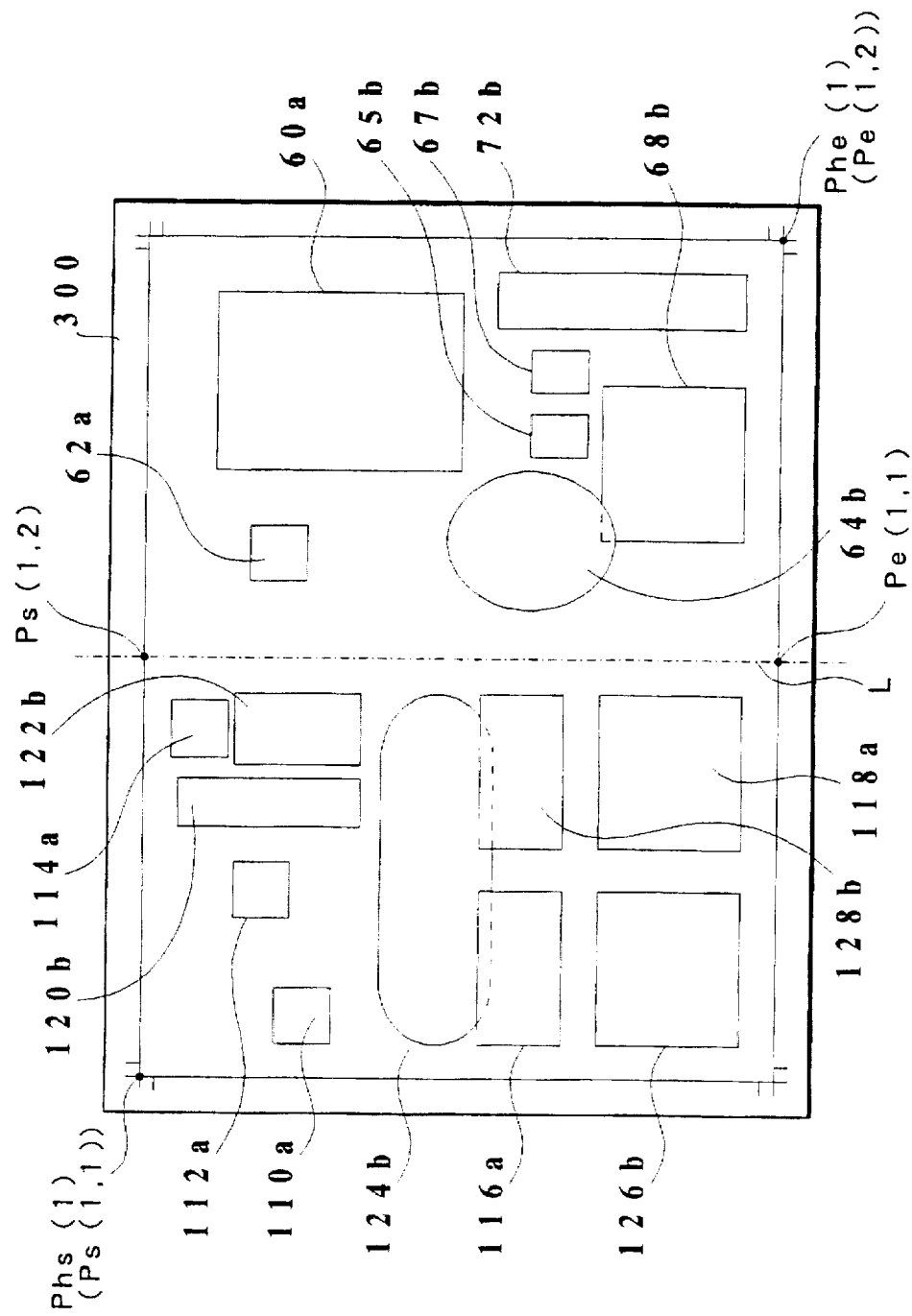
FIG. 25 is a drawing showing a displayed condition of contents of a layout paper file.

When the layout (or the layout design) is finished as described above, the operator reads the layout paper attribute file m-HFILE(i) and layout paper file m-DFILE(i) from the magnetic disk 54 and displays them in the form of a design layout paper on the CRT monitor 48. For example, a design layout paper corresponding to the final print 200 shown in FIG. 3 is displayed as shown in FIG. 25 (step M1). By the way in this embodiment, while text data, and linework data are not displayed in the text areas 60a, 116a, 118a, and linework areas 62a, 110a, 112a, 114a, it may be made to display them.

The operator, while watching the display shown in FIG. 25 and considering the amount of work, divides the layout paper 300 into a plural number of parts. For example, to divide into two parts of right and left by a central imaginary line L, the operator draws the imaginary line L by operating the digitizer 50 (step M2). To divide the work, the operator has to know the contents of the design. Therefore, overall efficiency is improved when the dividing work is done by the person who makes the design.

Also in the step M2, the CPU 42 receiving the instruction divides the layout paper file m-DFILE(i) into a plural number of divided layout paper files s-DFILE(i,j). Here the variable j represents integers from 1 through M, each indicating at what sequence number a divided layout paper is. The CPU 42 further makes divided layout paper attribute files s-HFLE(i,j) (step M3). The divided layout paper attribute files s-HFILE(i,j) are made in the same number with the number of divisions M in the step M2 (Refer to the step M22).

Next, the CPU 42 reads the layout paper name HNAM from the original layout paper attribute files m-HFILE(i) and writes them in the divided layout paper attribute files s-HFILE(i,j) (step M4). Next, the divided layout paper attribute files s-HFILE(i,j) and the divided layout paper files s-DFILE(i,j) are associated with each other. In other words, storage locations "s-DFILE(i,j) ADRS" for the divided layout paper files s-DFILE(i,j) in the divided layout paper attribute file s-HFILE(i,j) (step M5).

Here, the contents of the divided layout paper files s-DILE (i,j) are explained in reference to FIG. 26. FIG. 26 shows an exemplary drawing of the contents of the divided layout paper files s-DFILE(i,j) corresponding to the right half of the design layout paper shown in FIG. 25 when the design is divided into two. First there are coordinate data for the diagonal two points, the start point Ps(1,2) and the end point Pe(1,2), representing the size of the layout paper. These coordinate data are calculated in advance and written at the time of dividing process by the CPU 42 in the step M2. Also included are coordinate data for the text area 6a where the corresponding text components are laid out, and coordinate data for the linework area 62a where the corresponding linework components are laid out. Further included are coordinate data for the mask areas 64b, 65b, 67b, 68b, 72b for the corresponding image components. Those coordinate data are collectively referred to as layout data. In the step M5, such divided layout paper files s-DFILE(i,j) are associated with the divided layout paper attribute files s-HFILE (i,j). Here, it is assumed that the text data for the text area 60a and the linework data for the linework area 62a are already stored in separate files respectively associated with those areas.

Figure 28:
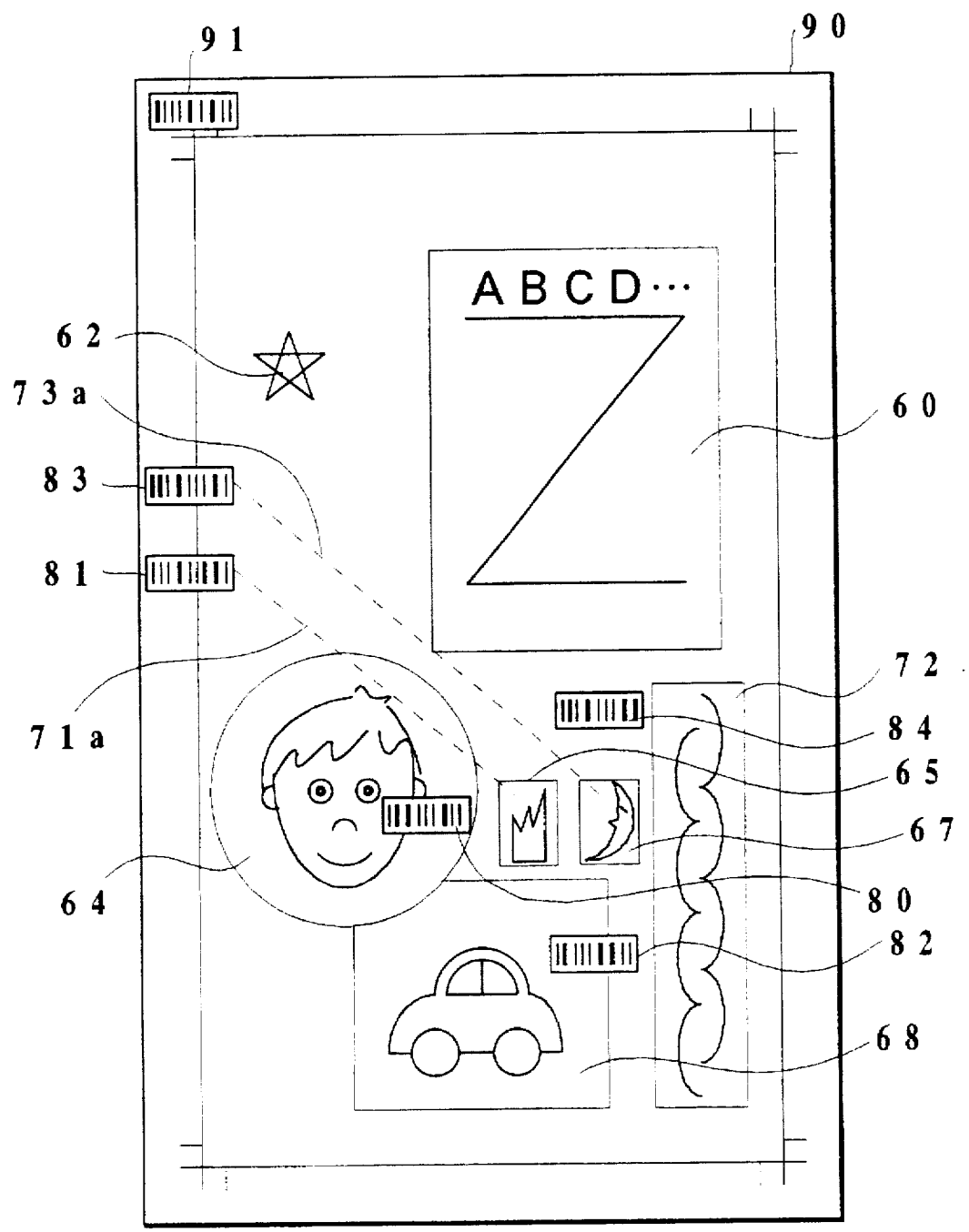
FIG. 28 is a drawing showing the completed divided layout paper 90.
Figure 29:
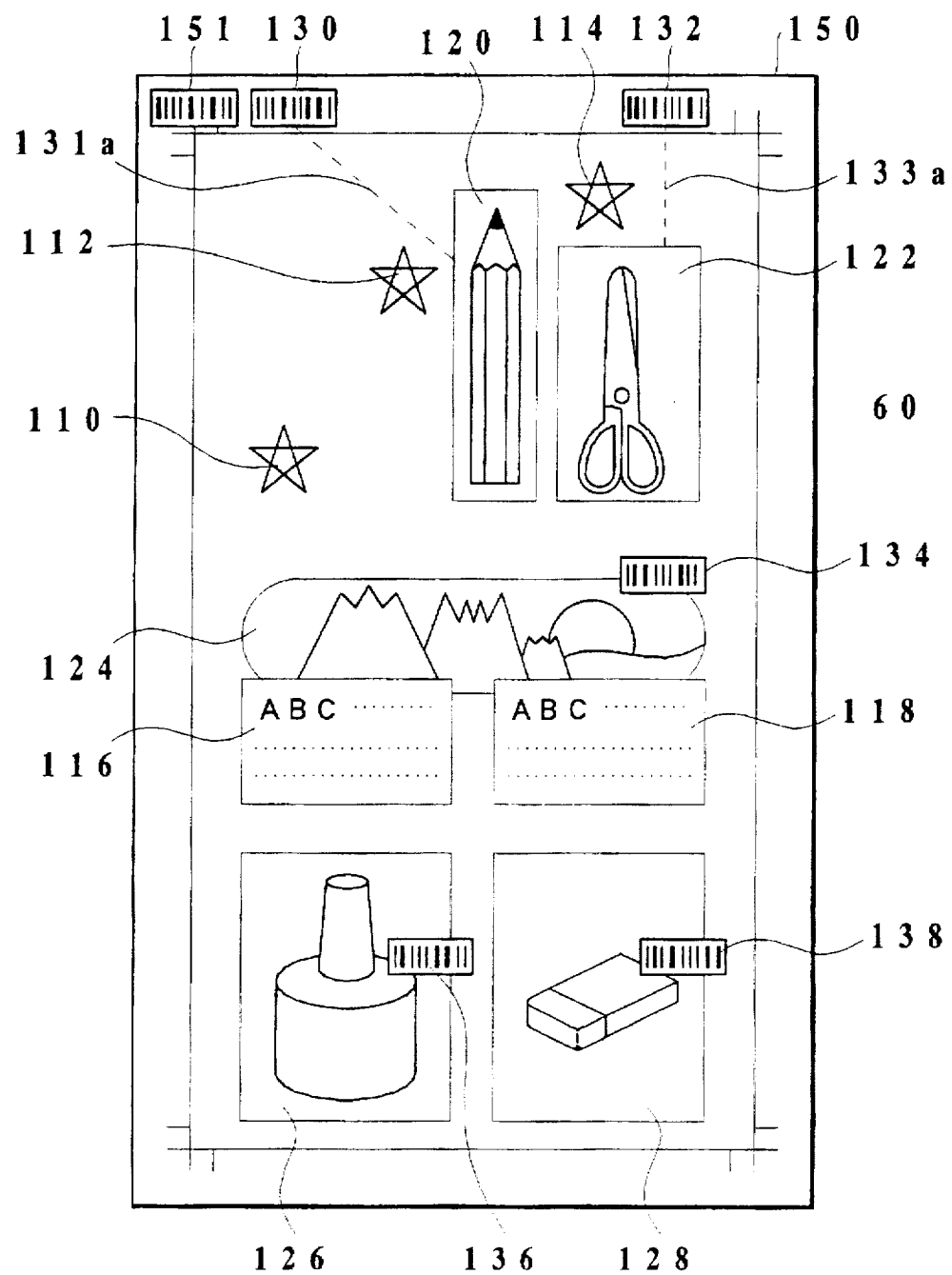
FIG. 29 is a drawing showing the completed divided layout paper 150.

Next, the CPU 42 reads the coordinate data for the start point Ps(i,j) and the end point Pe(i,j) of the divided layout paper from among the layout data of the divided layout paper files s-DFILE(i,j) and writes them in the divided layout paper attribute files s-HFILE(i,j) (step M6). Job identifier information is also written in. Here, the job identifier information refers to the information used when divided prepress command sheets are outputted as shown in FIGS. 28 and 29 for attaching a job identifier 91 (FIG. 28) and a job identifier 151 (FIG. 29) to respective divided prepress command sheets. As the job identifier information are stored, job identifier codes JOBIDPAT(i,j), job identifier pasting positions PJ(i,j), and storage locations JOBIDFILE (i,j)ADRS for the job identifier files JOBIDFILE(i,j). In the job identifier files JOBIDFILE(i,j) are stored the pattern data for the job identifier codes JOBIDPAT(i,j). The job identifier pasting location PJ(i,j) is automatically determined by the CPU 42 for example to the upper left corner.

After that, the CPU 42 generates image attribute files FILE(i,j,k), where the variable k representing the sequence number of the corresponding image components is changed from 1 through N, and stores them on the magnetic disk 54 (step M7). Next, the storage locations "FILE(i,j,k)ADRS" for the image attribute files FILE(i,j,k) in the layout paper attribute files s-FILE(i,j) to associate them with each other (step M8). Next, the operator enters corresponding image component name (referred to as intended image name) from the keyboard 52. The CPU, upon receiving the input, writes the intended image name "IMG(i,j,k)" in the image attribute files FILE(i,j,k) (step M9). It may also be constituted that the intended image names IMG(i,j,k) are automatically generated by the CPU 42. Next, the operator specifies the mask area for the intended image according to the information for the divided layout paper files s-DFILE(i,j) (step M12).

On the other hand, image components or color films (92 through 96 in FIG. 12 which will be explained later) are separated in colors by an input scanner 56, read, and stored in advance as corresponding image data on the magnetic disk 54 (step M10). Resolution of this scanner 56 here may be coarser than that of an input scanner used in the prepress process. The corresponding image data is stored in the magnetic disk 54 under the file name of IMGFILE(i,j,k). Here, the CPU 42 writes the storage location "IMGFILE(i,j,k)ADRS" for the corresponding image file IMGFILE(i,j,k) in the image attribute file FILE(i,j,k) (step M11).

Figure 27:
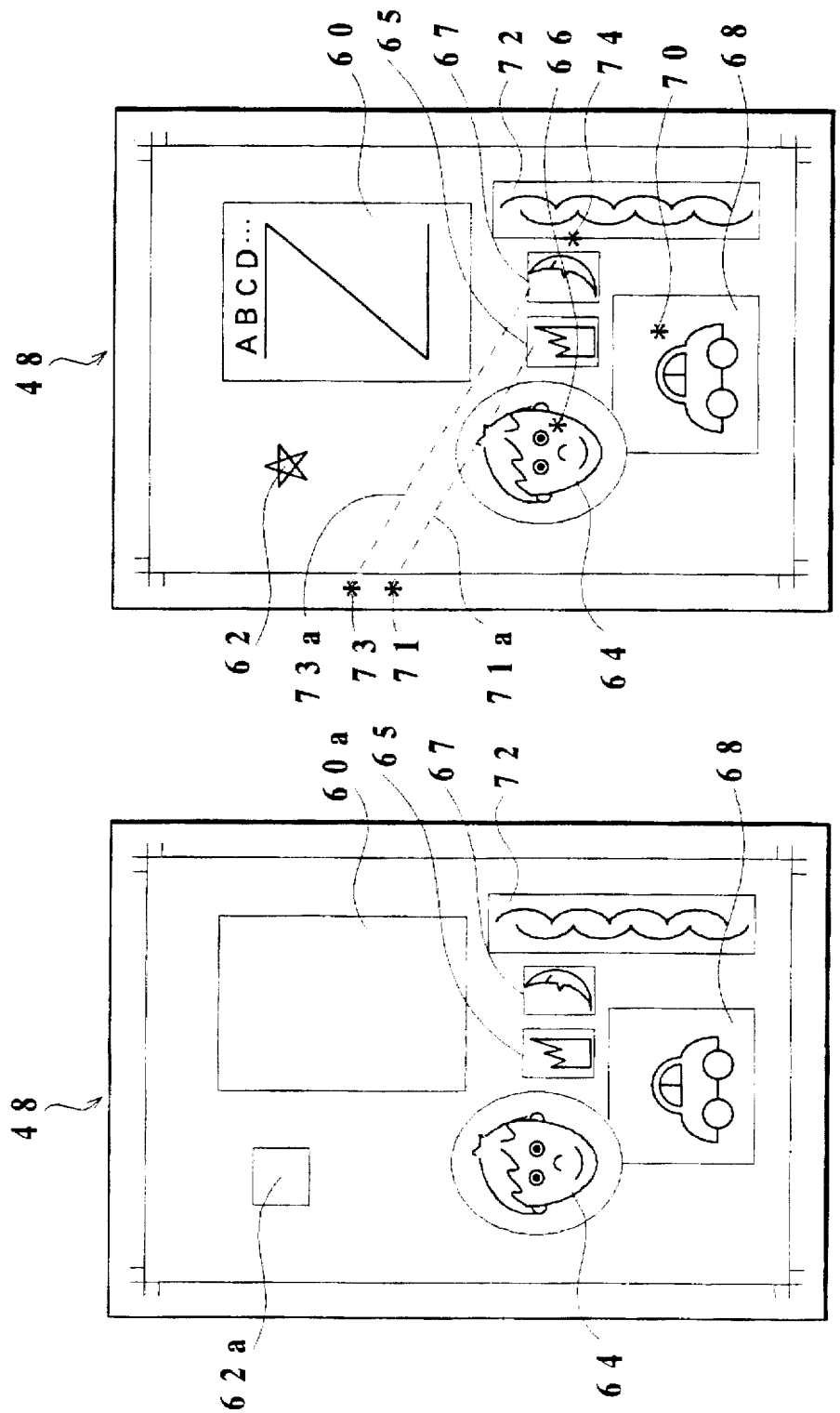
FIGS. 27A and 27B are drawings showing corresponding image components pasted on the divided layout paper file.

Next, after the step M12, the CPU 42 reads the corresponding image data files IMGFILE(i,j,k) for the mask areas specified in the step M12, in the divided layout paper files s-DFILE(i,j) out of the magnetic disk 54, and displays the divided layout paper, mask areas, and corresponding image components on the CRT monitor 48. The operator, referring to the mask areas, pastes the corresponding image components IMG(i,j,k) on the layout paper (step M13). The CPU 42 receives the data and pastes the corresponding image components IMG(i,j,k) on the layout paper (step M13). The CPU 42, upon receiving this, writes the locations for the corresponding image components IMG(i,j,k) as layout data for the divided layout paper files s-DFILE(i,j) (step M14). Here, display appears on the CRT 48 as shown in FIG. 27A. In other words, the corresponding image components 64, 65, 67, 68, and 72 are displayed as laid out on the layout paper.

Next, the CPU 42 generates component identifier codes PARIDPAT(i,j,k) to be attached to the corresponding image components (step M15).

The CPU 42 writes the component identifier codes "PARIDPAT(i,j,k)" in the image attribute file FILE(i,j,k) (step M16). Here, the operator moves the cursor of the digitizer 50 to specify where (output coordinates) PB(i,j,k) on a displayed corresponding image component (for example 64) component identifiers are to be laid out (step M17). Upon receiving the specification, the CPU 42 judges whether or no the inputted locations of the component identifiers are correct (M18). The judgment on the correctness of the locations of the identifiers will be explained later. Here, the explanation is continued assuming that the locations are judged as correct.

Next, the CPU 42 writes the pasting locations (output coordinates) PB(i,j,k) for the component identifiers in the image attribute files FILE(i,j,k) using X-Y coordinates (step M20). At the same time, the identifier pasting locations relative to the corresponding image component 64 are displayed (66) on the CRT monitor 48 as shown in FIG. 27B.

Next, judgment is made whether or not the identifier correspondence process described above has been done for all the corresponding image components (step M21). If there are any corresponding image components not processed yet, steps M7 through M21 are performed by successively increasing the variable k by an increment of one. Here, the image attribute files are made in consecutive numbers such as FILE(i,j,1), FILE(i,j,2), . . . Also, the corresponding image data files are made in consecutive numbers such as IMGFILE(i,j,1), IMGFILE(i,j,2), and so on. Furthermore, the identifier codes are similarly made in consecutive numbers such as PARIDPAT(i,j,1), PARIDPAT(i,j,2), . . .

By the way, if two image components are close to each other like the corresponding image components 65 and 67 shown in FIG. 27B, and the identifiers are small and placed close to each other, it is possible that the identifiers overlap each other and reading becomes impossible, or the corresponding image components are hidden by the identifiers. Therefore, when the location PB(i,j,k) for the identifiers are specified in the step M17, CPU 42 judges whether or not the identifiers adjacent to each other overlaps each other, or the corresponding image components are hidden by the identifiers (step M18). If such a problem occurs, it is displayed on the CRT monitor 48 that the identifiers cannot be placed in the specified location (step M19). Then, input of the component identifier locations PB(i,j,k) is again prompted.

In that case, the operator specifies the identifier pasting locations 71 and 73 for the corresponding image components 65 and 67 on the blank margin of the layout paper as shown in FIG. 27B. Upon receiving the specification, the CPU 42 generates a relation line 71a between the pasting location 71 and the corresponding image component 65. A relation line 73a is likewise generated between the pasting location 73 and the corresponding image component 67. Here, the CPU 42 stores the coordinates (Xk, Yk: xk, yk) for the start and end points of the relation lines in the image attribute files FILE(i,j,k) (step M20).

FIG. 27B shows the state of the screen of the CRT monitor 48 after the process described above is finished with five image components. In the figure are shown the identifier pasting locations 60, 70, and 74 for the corresponding image components 64, 68, and 72. Also shown are pasting locations 71 and 73 related to the corresponding image components 65 and 67 by way of relation lines 71a and 73a.

If the identifier correspondence is completed for all the corresponding image components in the step M21, it is judged whether or the divided layout paper attribute files are made in the number equal to the number of divisions M (step M22). If there are any corresponding image components not processed yet, steps M3 through M22 are performed by successively increasing the variable j by an increment of one.

For the example shown in FIG. 25, similar process is performed also for the left half to make the divided layout paper attribute files, image attribute files, corresponding image data files, and identifier codes.

When the divided layout paper attribute files are made in the number equal to the number of divisions, the process goes on to the step M23. In the step M23, first the storage locations "PARIDFILE(i,j,k)ADRS" for the component identifier files PARIDFILE(i,j,k) are written in the image attribute files FILE(i,j,k). Furthermore, pattern data for the bar codes which are the component identifiers are stored in the component identifier file PARIDFILE(i,j,k). Next in the step M24, it is judged whether or not the process of the step M23 (making the identifier pattern) is completed for all the corresponding image components. If not completed here, the process of M23 is repeated by increasing the variable k successively by an increment of one from 1 through N.

When the identifier making process of the step M23 is completed for all the image attribute files FILE(i,j,k), judgment is made whether or not process for all the divided layout papers is completed (step M25). If not, the process of M23 is repeated by changing the variable j from 1 through M by an increment of one.

Figure 30:
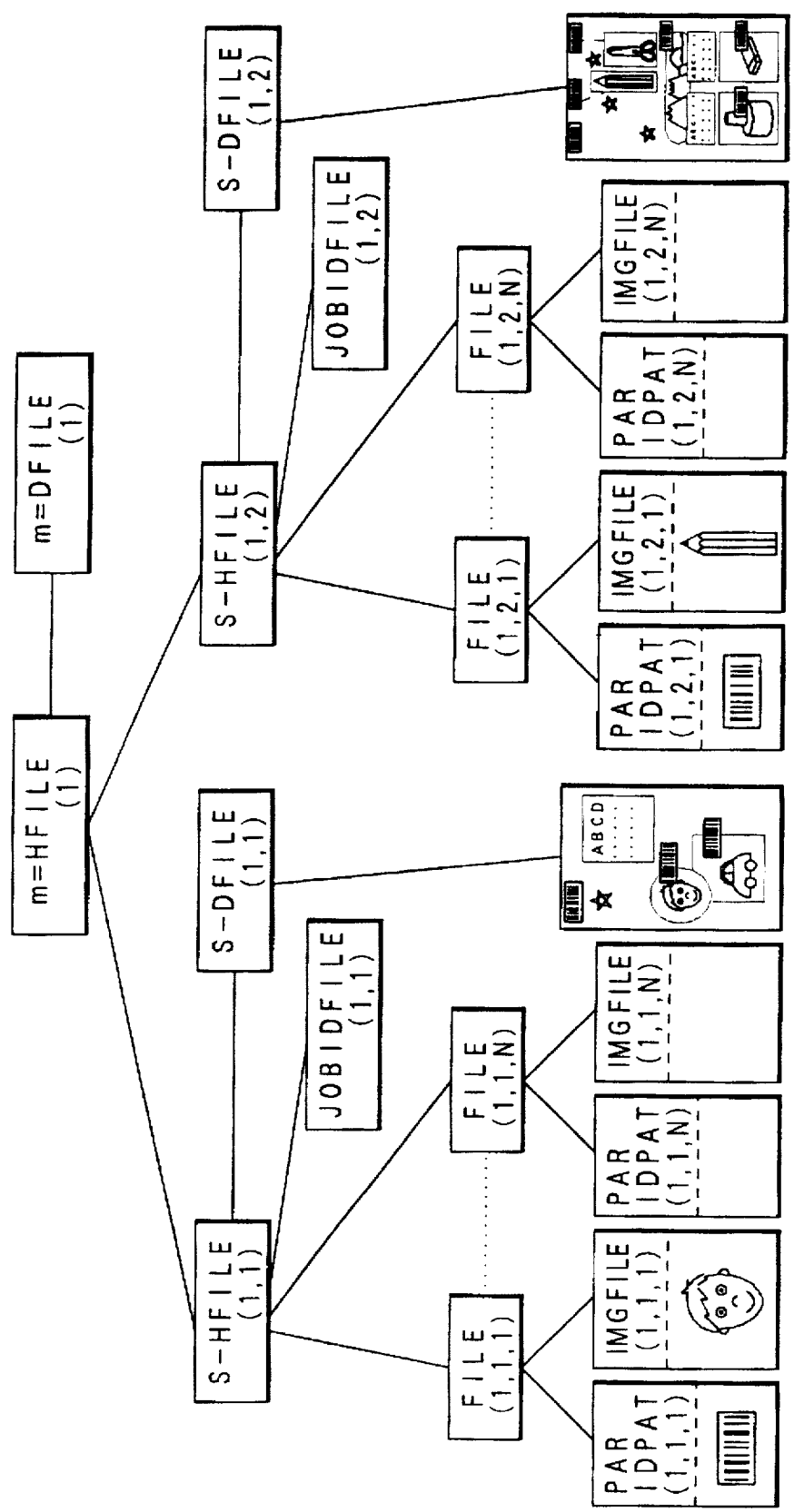
FIG. 30 is a drawing showing structures of a layout paper attribute file and the layout paper file.

When it is judged that the process is completed for all the divided layout paper in the step M25, the step M26 is performed. In the step M26, the CPU 42 successively pastes the bar code pattern data to the indicated pasting locations for the component identifiers for respective corresponding image components. In other words, the bar code pattern data as component identifiers are successively synthesized on the divided layout paper file s-DFILE(i,j). At the same time here, pattern data for the job identifiers (bar codes) are also synthesized at the specified pasting locations. Text data corresponding to the text area and linework data corresponding to the linework area are read respectively from different files and written in the divided layout paper file s-DFILE(i, j). The arrangement of such files at this point is shown in FIG. 30. This figure shows the file structure in the case a layout paper is divided into two. The divided layout paper attribute files s-HFILE(i,j) and the divided layout paper files s-DFILE(i,j) are made respectively in the number equal to the number of divisions M.

Next, the divided block copies which are the divided prepress command sheets are outputted from the printer 47 according to the divided layout paper files s-DFILE(i,j) (step M27). In the step M28, judgment is made whether or not the output process is completed for all the divided layout papers. If not, processes of the steps M26 and M27 are repeated by changing the variable j up to M by an increment of one.

FIGS. 28 and 29 show divided block copies 90 and 150 printed out in this way. FIG. 28 corresponds to the right half of the final print 200 (FIG. 32) and FIG. 29 corresponds to the left half. In FIG. 28, bar codes (component identifiers) 80, 82, and 84 are placed in the vicinity of respectively corresponding image components 64, 68, and 72. For the corresponding image components 65 and 67, the bar codes (component identifiers) 81 and 83 are placed in the blank margin and the relation lines 71a and 73a are provided to show the corresponding relationship. A characteristic bar code (job identifier) 91 is attached to the upper left corner of each divided layout paper. This is also the case for FIG. 29.

When the output process is completed for all the divided layout papers, steps M1 through M29 are performed for the succeeding block copies (namely by changing the variable i by an increment of one). When it is judged that the process is completed for all the block copies in the step M29, the process is finished.

Next, prepress using the divided block copies 90 and 150 shown in FIGS. 28 and 29 is explained. Besides the divided block copies 90 and 150, the command sheet 8 as shown in FIG. 47B is also handed to the operator of the prepress process. The divided layout paper 90 is handed to the prepress process together with the image components 92 through 96 required for the prepress. Similarly, the divided layout paper 150 is handed to the prepress process together with the image components 160 through 168 required for the prepress.

In the prepress process, different operators carry out the prepress work respectively according to the divided layout paper 90 and the divided layout paper 150. First, the operator in charge of the divided layout paper 90 reads the image components 92 through 96 using the input scanner 22 and stores them as image data on the magnetic disk 24. The input scanner 22 is higher in resolution than the scanner 56 (Refer to FIG. 2) used in the design process. Here, the operator using the bar code reader 102 reads bar codes 80, 81, 82, 83 and 84 (Refer to FIG. 28) on the layout paper 90 respectively corresponding to the image components 92, 93, 94, 95 and 96, attaches identification numbers aside from the file names, and stores them on the magnetic disk 24. Another operator in charge of the divided layout paper 150 also reads the image components 160-168 using an input scanner 170 and stores them as image data on the magnetic disk 24. Each data is also provided with an identification number as described above.

Next, the operator in charge of the divided layout paper 90 reads the image components 92 through 96 stored on the magnetic disk 24 into the computer 26, displays them on the monitor, and retouches the image components 92 through 96 according to the divided layout paper 90 and the command sheet. At this time, the operator using the bar code reader 104 reads the bar code attached to the corresponding image component corresponding to the image component he intends to read on the divided layout paper 90 and enters the data into the computer 26. The computer 26, according to the read bar code, searches and reads the image component of the same identification number from the magnetic disk 24. Therefore, the operator can read the image component accurately by only tracing the bar code with the bar code reader 104 so that the work is done fast.

The image components 92, 94, and 96 retrieved in this way are cut to the size indicated on the divided layout paper 90 and the command sheet, adjusted for their hues, enlarged or contracted, or rotated. The retouched image components 92 through 96 are again stored on the magnetic disk 24.

The operator in charge of the divided layout paper 150 also retouches the image components as described above and stores the retouched image components as image data on the magnetic disk Next, each of the image components is laid out (collected) according to the divided block copies 90, 150, and their command sheets. Here, the two divided block copies are collected into one layout paper. Here too, reading of the image components 92 through 96, and 160 through 168 is done by only tracing the bar code with the bar code reader 104. When recognizing the divided block copies 90 and 150 too, only tracing the bar code 91 (Refer to FIG. 28) and the bar code 151 (Refer to FIG. 29) suffices.

The collected data are again stored on the magnetic disk 24. Single color films 100Y, 100M, 100C, and 100K are prepared by the output scanner 23 and used for exposure work and succeeding development work to produce printing plates (not shown) in respective colors.

With the prepress command sheet preparing device, prepress command sheet preparing method, and prepress command sheet according to the invention, the identifiers associated at least with respective image components are laid out in the vicinity of respective corresponding image components. Therefore, the image components corresponding to the respective corresponding image components can be specified readily only by reading the identifiers. Also, it is constituted that divided prepress command sheets are outputted for respective divided block copies by dividing the layout paper into a plural number of divided layout papers in consideration of the laid out corresponding image components, corresponding text components, and corresponding linework components. Therefore, work division is not required in the prepress process, and the work efficiency is enhanced. In other words, the prepress work is done efficiently without errors according to the invention.

Figure 33:
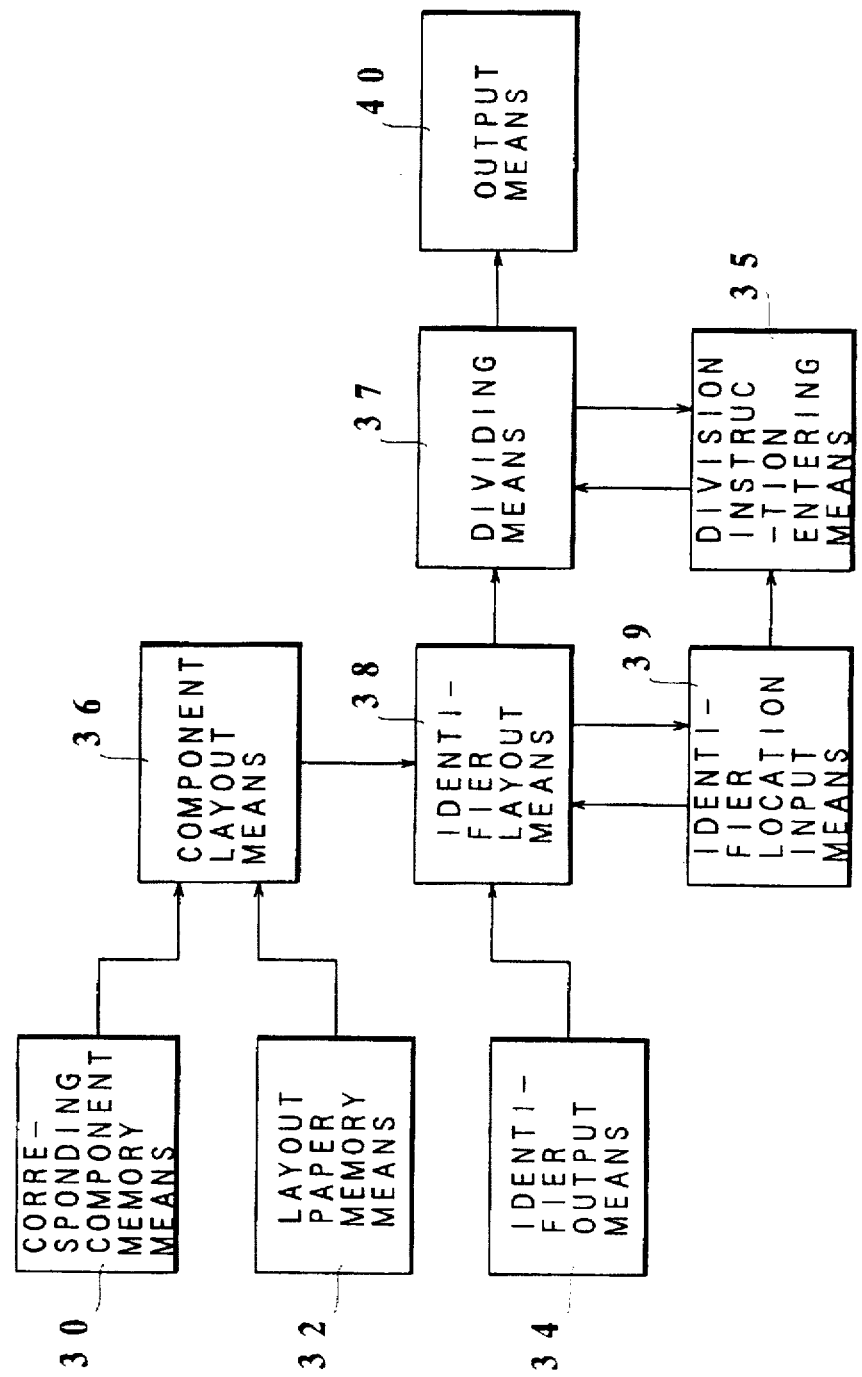
FIG. 33 is a block diagram showing the entire setup of a prepress command sheet preparing device according to another embodiment.
Figure 34:
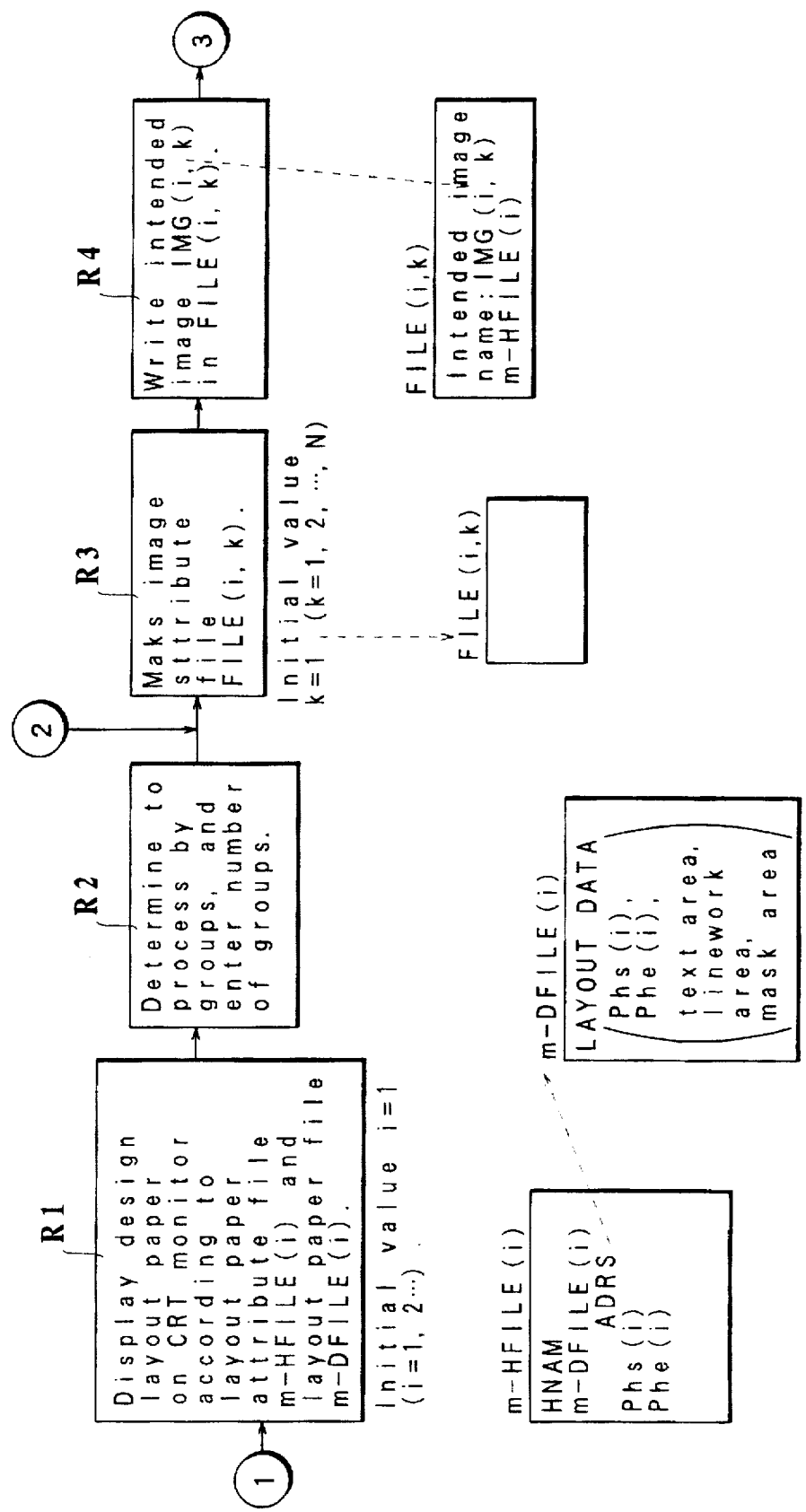
FIGS. 34 through 39 are flow charts showing the process of preparing the prepress command sheet.
Figure 35:
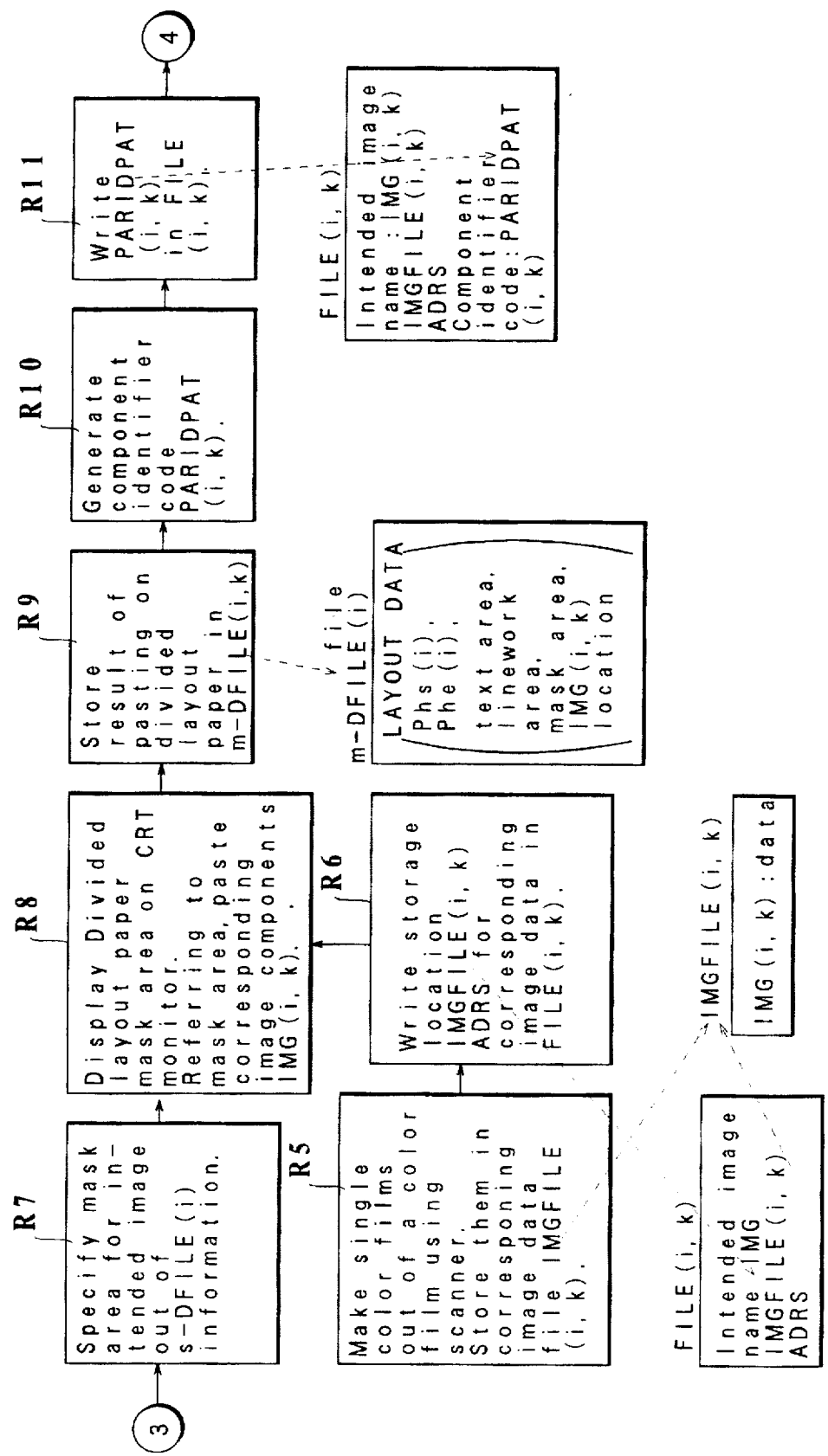
Figure 36:
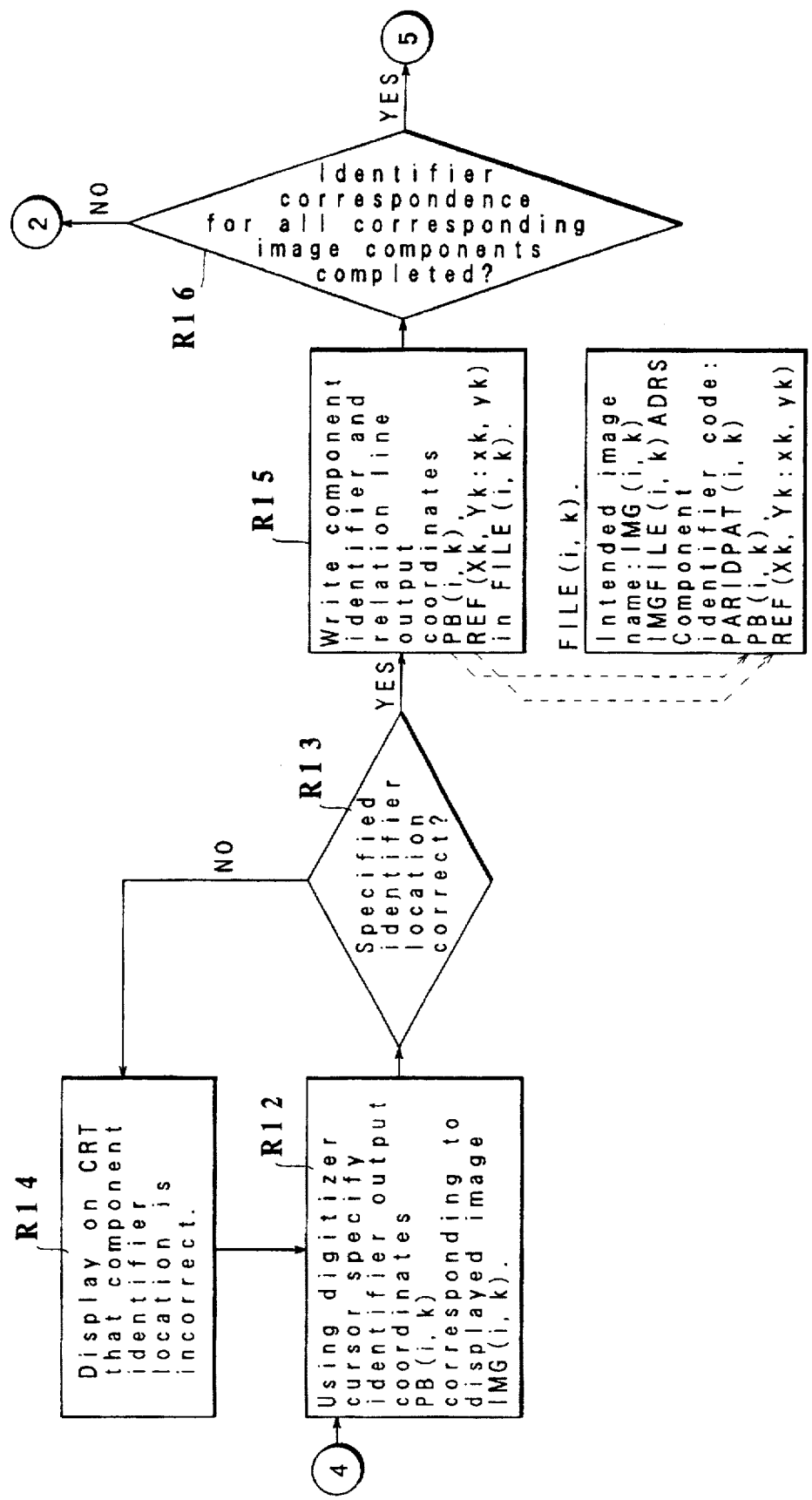
Figure 37:
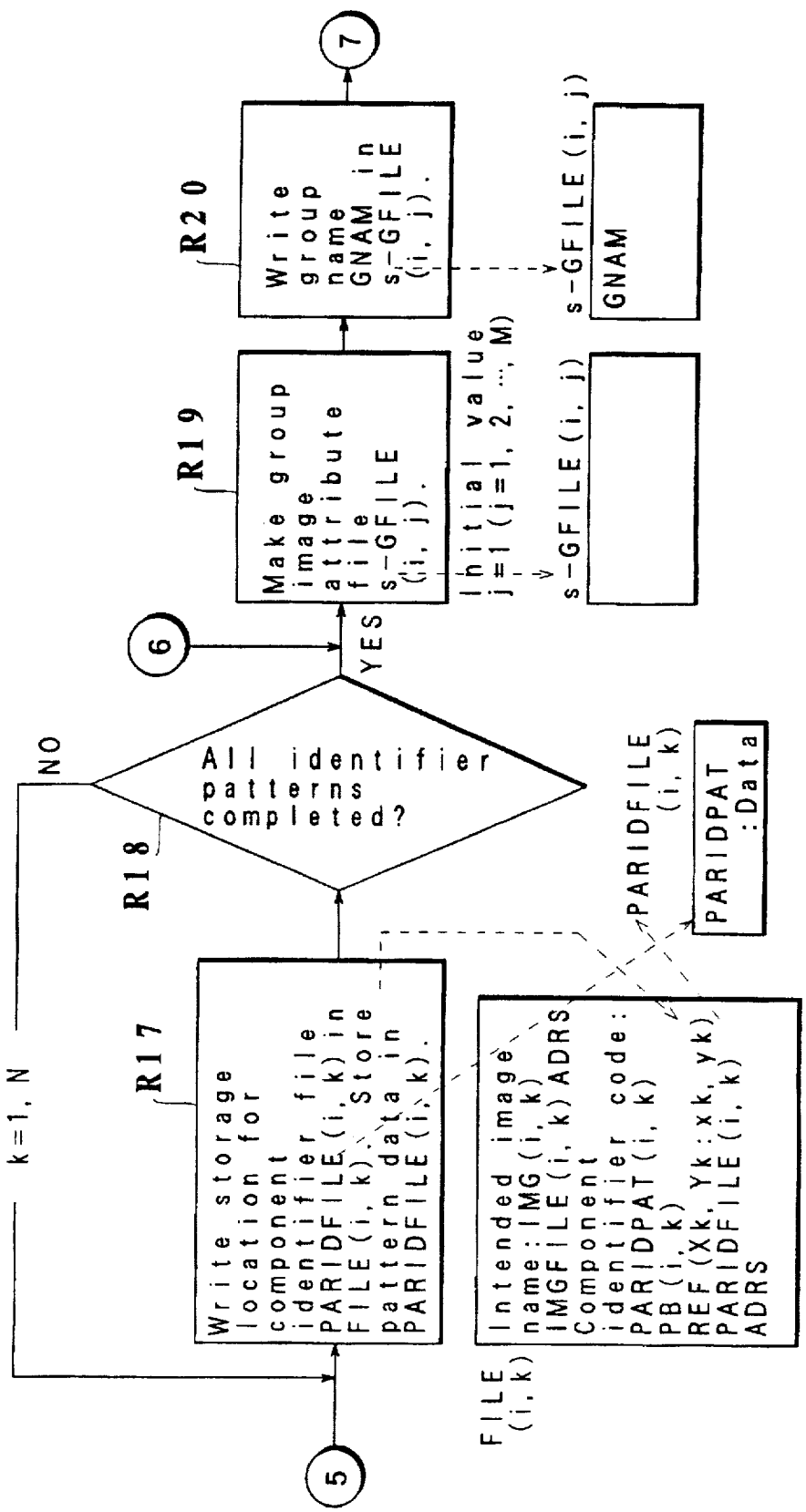
Figure 38:
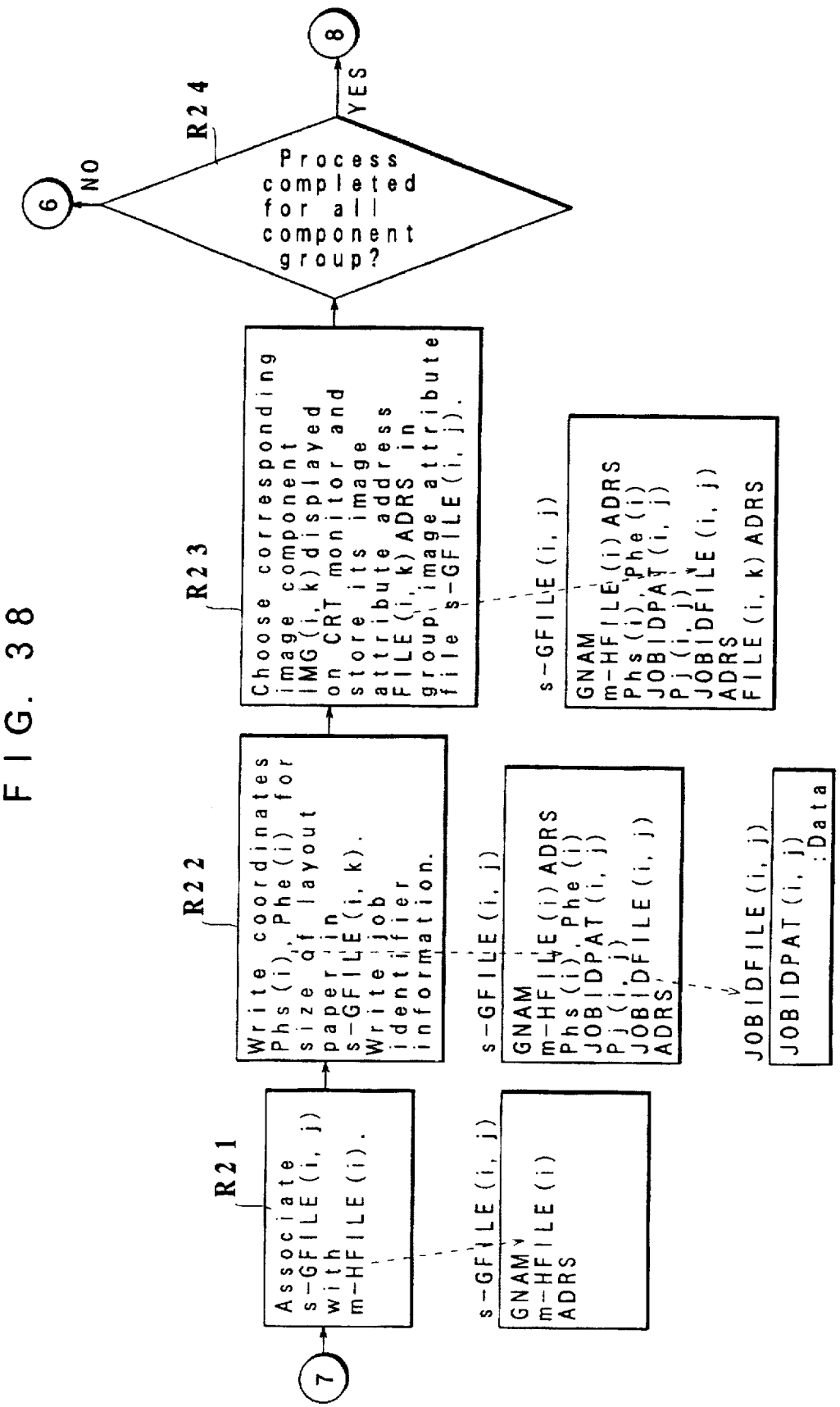
Figure 39:
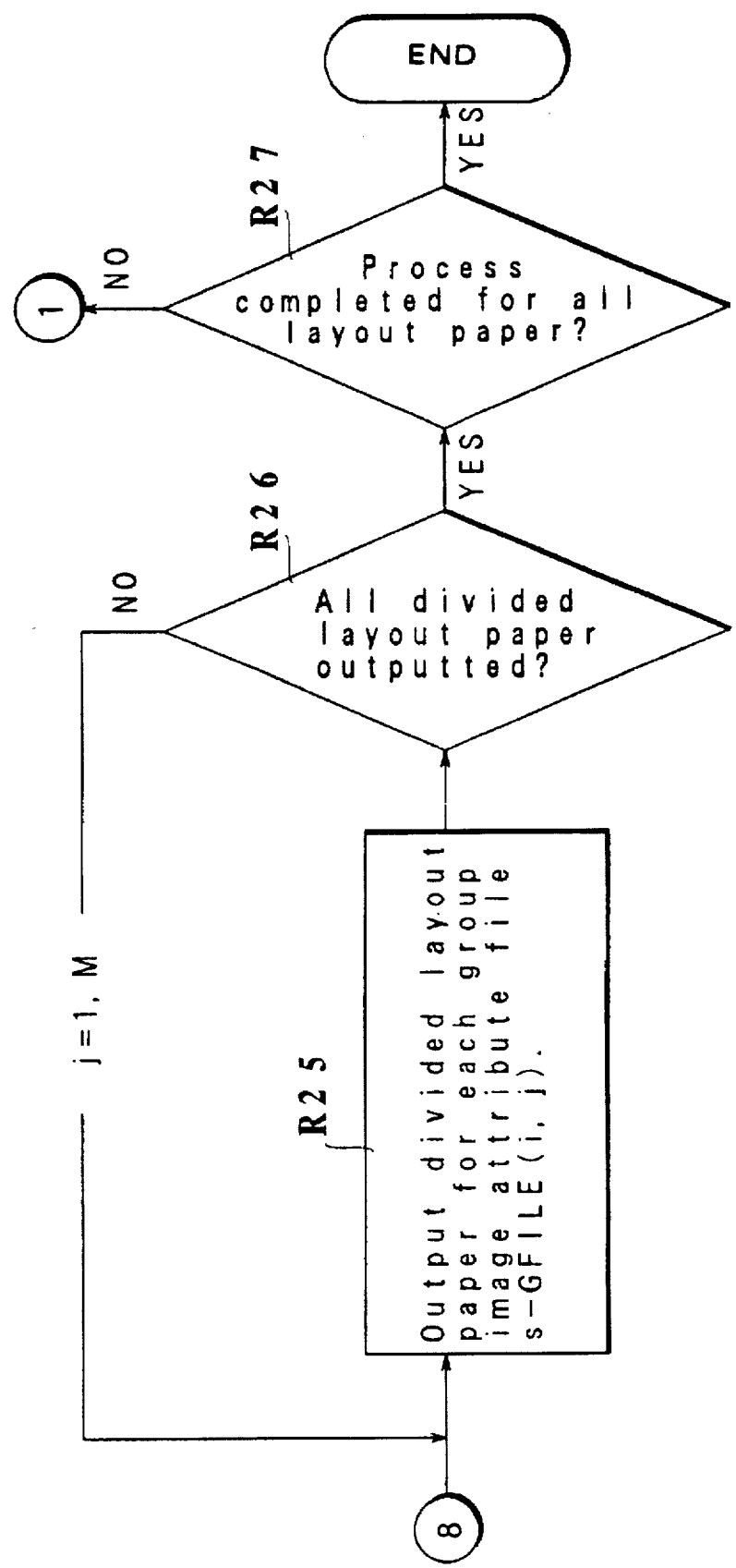

FIG. 33 shows another embodiment of entire setup of the prepress command sheet preparing device according to the invention. In the corresponding image component memory means 30 are stored electronic data for the corresponding image components, corresponding text components, and corresponding linework components. In the layout paper memory means 32 are stored electronic data for the layout paper for the prepress command sheet. The component layout means 36 lays out the corresponding image components, corresponding text components, and corresponding linework components on the layout paper according to a command of the operator. The identifier location input means 39 displays the corresponding image components on the layout paper. The operator enters the layout locations of the identifiers in the vicinity of the corresponding image components according to the display. The identifier layout means 38 reads the identifier for each of the corresponding image components from the identifier output means 34 and places it in the inputted layout location. If the layout in this location cannot be made, the identifier layout means 38 prompts the identifier location input means 39 to input again. If the inputted location is not in the vicinity of the corresponding image components, the identifier layout means 38 places a relation line connecting between the identifier and the corresponding image component. The division instruction means 35 displays the corresponding image components on the layout paper. The operator referring to the display divides the corresponding image components into a plural number of groups based on a work JOB. The division means 37 receiving the division instruction divides the corresponding image components into component groups. The output means 40 outputs divided prepress commands for respective component groups. Each of the divided prepress command sheets is a sheet on which corresponding image components, corresponding text components, and corresponding linework components are recorded. On the sheet are also recorded relation lines and identifiers for the corresponding image components belonging to the corresponding component groups.

While the embodiment shown in FIG. 33 is constituted that the division means 37 receiving the output from the identifier layout means 38 performs the division, it may also be constituted that the identifiers are laid out by the identifier layout means 38 after the division is made in advance by the division means 37.

The hardware setup for attaining the functions of the blocks shown in FIG. 33 using the CPU is the same with that described before in reference to FIG. 2. The CPU 42 is connected to the bus line 58. To the bus line 58 are also connected a CRT monitor 48, digitizer 50, keyboard 52; corresponding component storage means and layout paper storage means in the form of a magnetic disk 54, input scanner 56, RAM 44, and ROM 46; and output means in the form of a printer 47. In this embodiment, the division instruction input means and the identifier location input means are constituted with the CRT monitor 48 and the digitizer 50.

The process of making the prepress command sheet using this prepress command sheet preparing device is explained below in reference to flow charts shown in FIGS. 34 through 39. Here it is assumed that a prepress command sheet is to be made for the final print 200 as shown in FIG. 32.

First, the operator using the CRT monitor 48, digitizer 50, and keyboard 52 lays out the corresponding text components, corresponding linework components, and corresponding image component on the layout paper. As a result, a layout paper attribute file m-HFILE(i) and a layout paper file m-DFILE(i) are made and recorded on the magnetic disk 54.

When the layout (or the layout design) is finished as described above, the operator reads the layout paper attribute file m-HFILE(i) and layout paper file m-DFILE(i) from the magnetic disk 54 and displays them in the form of a design layout paper on the CRT monitor 48. For example, a design layout paper corresponding to the final print 200 shown in FIG. 32 is displayed as shown in FIG. 40 (step R1).

Figure 40:
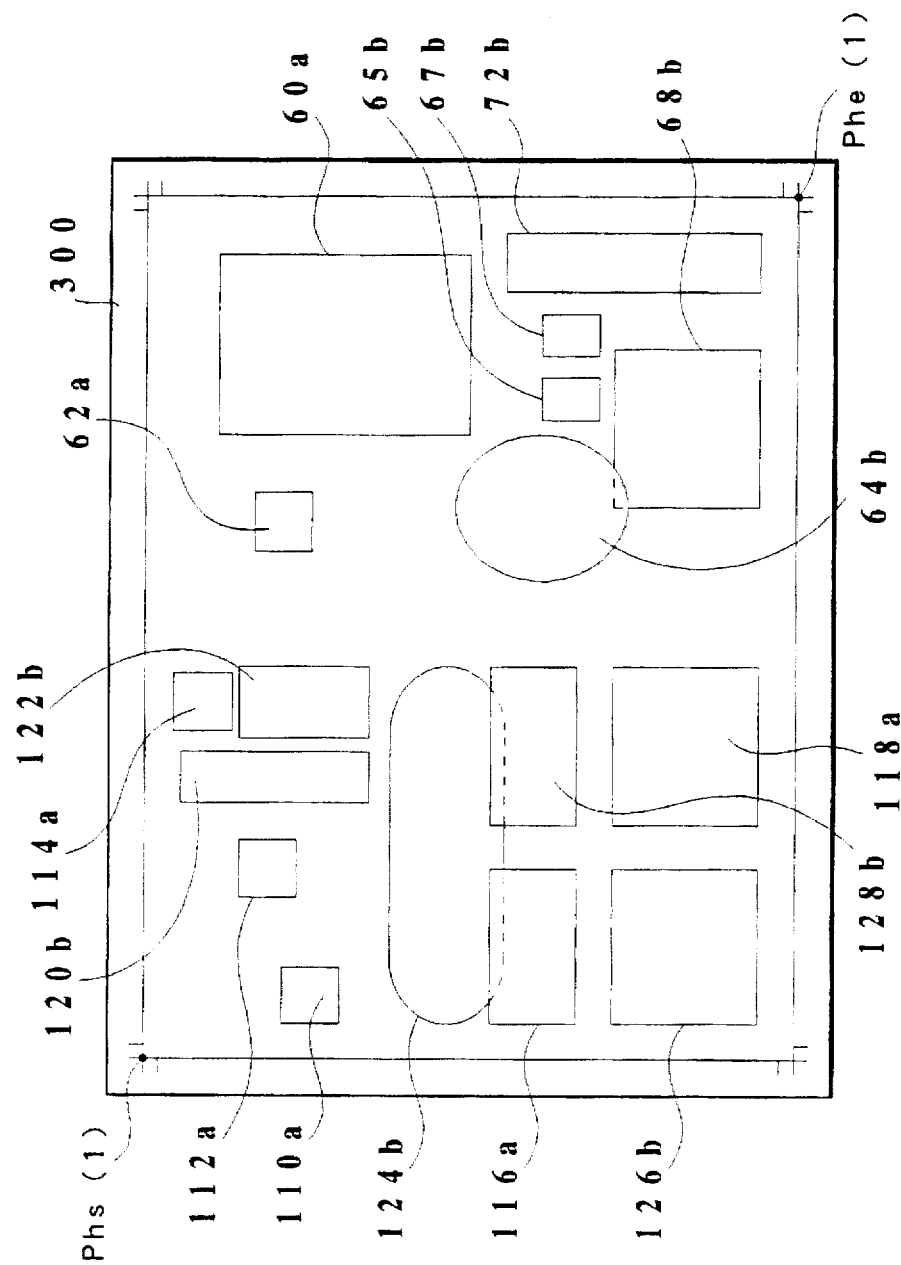
FIG. 40 is a drawing showing a displayed condition of the contents of a layout paper file.

The operator referring to the display shown in FIG. 40 decides how many component groups M the corresponding image components on the layout paper 300 are to be divided into, and enters the number from the keyboard 52 (step R2).

Next, the CPU 42 generates image attribute files FILE(i,k) (where the variable k=1, 2, . . . , N; respectively indicating the sequence number of the corresponding image components) and stores them on the magnetic disk 54 (step R3). Next, the operator enters the corresponding image component names (referred to as intended image name) from the keyboard 52. The CPU 42 receiving the input writes the intended image names "IMG(i,k)" in the image attribute files FILE(i,k) (step R4). Next, the operator specifies the mask area for the intended images according to the information from the layout paper files m-DFILE(i) (step R7).

Figure 31:
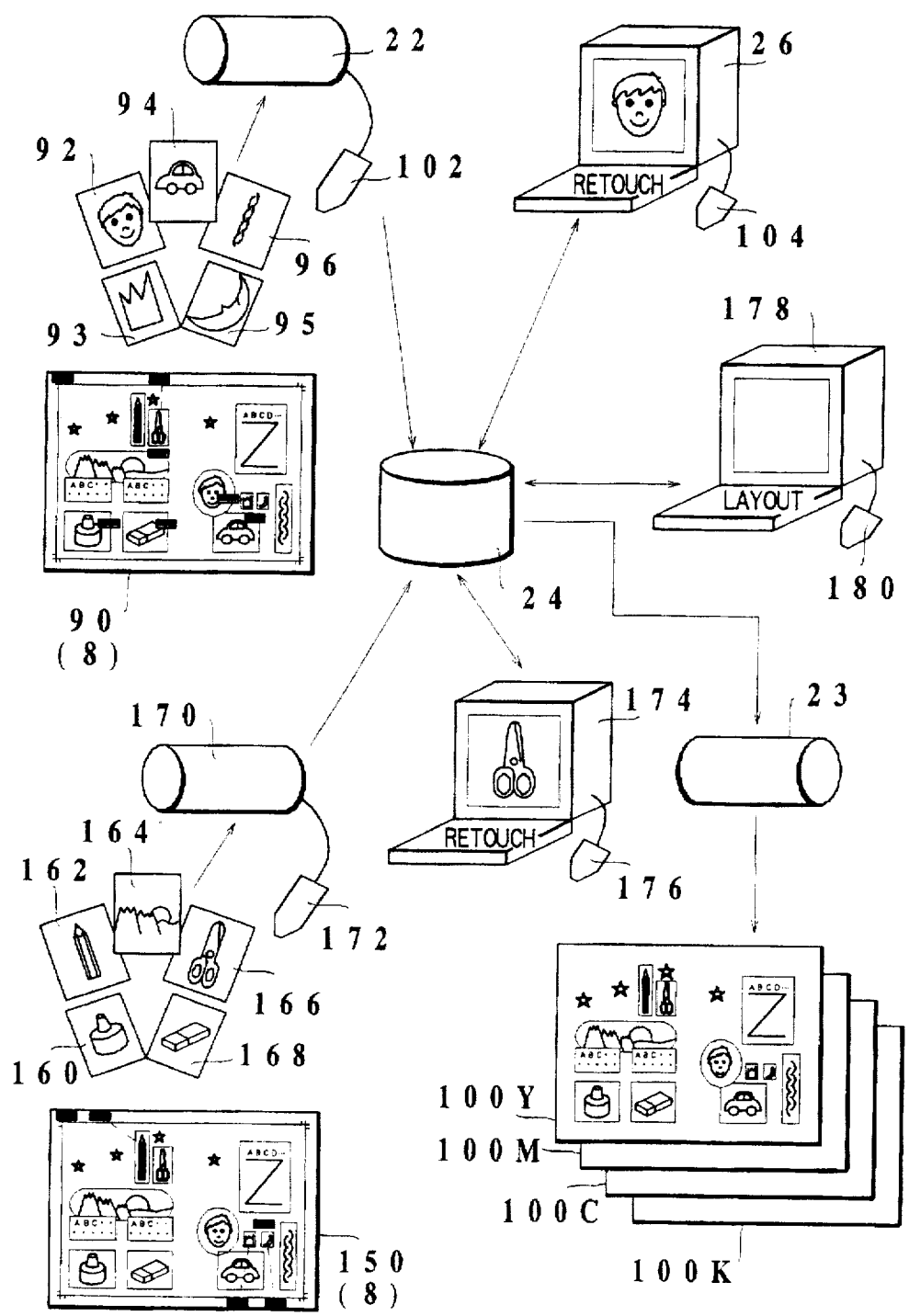
FIG. 31 is a conceptual drawing of the prepress process using the divided block copies 90 and 150.

On the other hand, image components or color films (92 through 96, and 160 through 168 in FIG. 31 described before) are already separated in colors by an input scanner 56, read, and stored in advance as corresponding image data on the magnetic disk 54 (step R5). Resolution of this scanner 56 here may be coarser than that of an input scanner used in the prepress process. The corresponding image data is stored on the magnetic disk 54 under the file name of IMGFILE (i,k). Here, the CPU 42 writes the storage locations "IMGFILE(i,k)ADRS" for the corresponding image files in the image attribute files FILE(i,k) (step R6).

Figure 41:
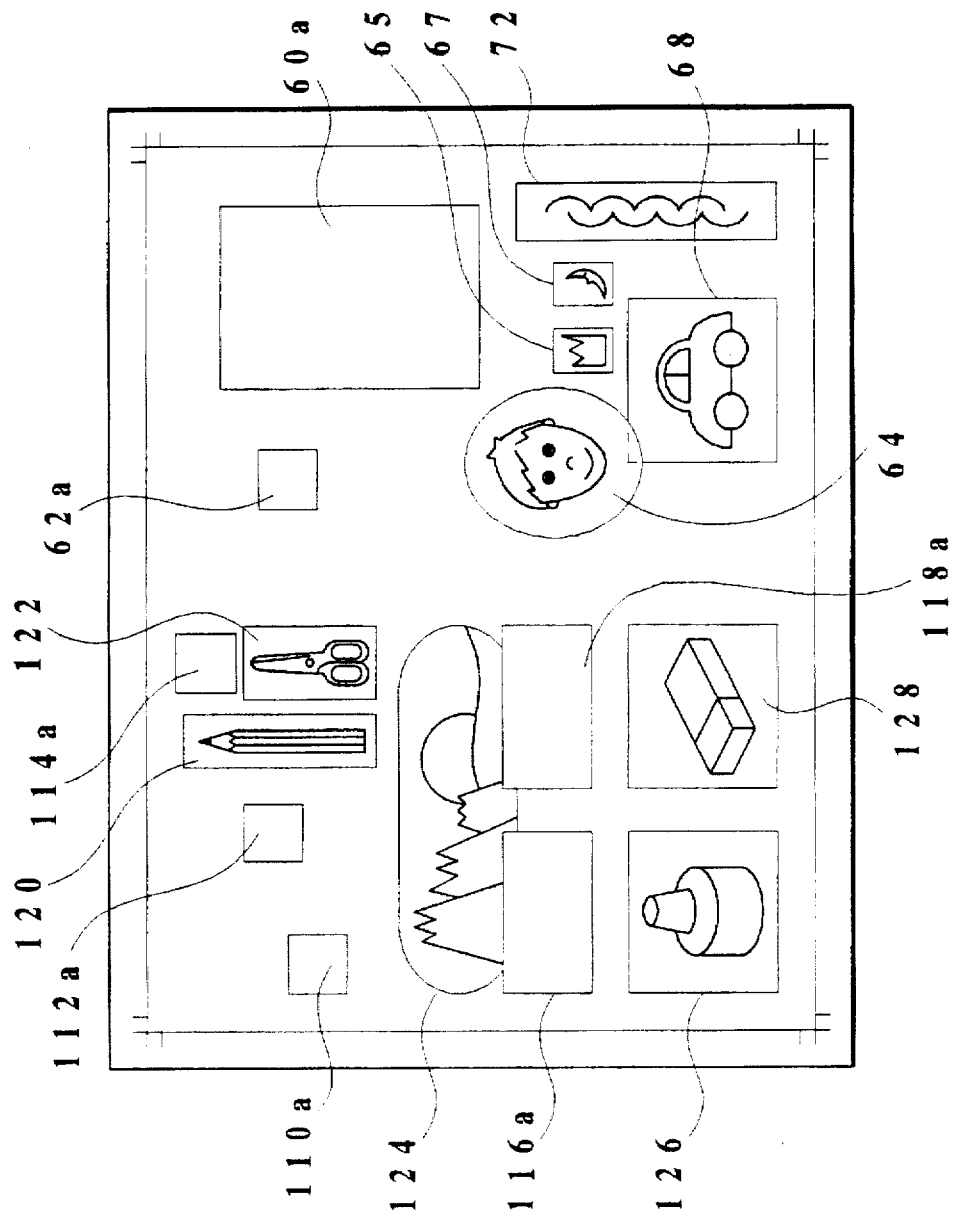
FIG. 41 is a drawing showing corresponding image components pasted on the layout paper file.

Next, after the step R7, the CPU 42 reads the layout paper file m-DFILE(i), and the corresponding image data file IMGFILE(i,k) for the mask area specified in the step R7 out of the magnetic disk 54, and displays the layout paper, mask areas, and corresponding image components on the CRT monitor 48. The operator, referring to the mask area, pastes the corresponding image components IMG(i,k) on the layout paper (step R8). The CPU 42 receives the data and writes the location for the corresponding image components IMG(i,k) as layout data for the layout paper file m-DFILE(i) (step R9). Here, display appears on the CRT 48 as shown in FIG. 41. In other words, the corresponding image components 64, 65, 67, 68, 72, 120, 122, 124, 126, and 128 are displayed as laid out on the layout paper.

Next, the CPU 42 generates component identifier code PARIDPAT(i,k) to be attached to the corresponding image component (step R10). The CPU 42 writes the component identifier code "PARIDPAT(i,k)" in the image attribute file FILE(i,k) (step R11). Here, the operator moves the cursor of the digitizer 50 to specify the location of the (output coordinates) PB(i,k) where the component identifier is to be placed relative to the displayed corresponding image component (for example 64) (step R12). Upon receiving the specification, the CPU 42 judges whether or not the inputted location of the component identifier is correct (step R13).

Figure 42:
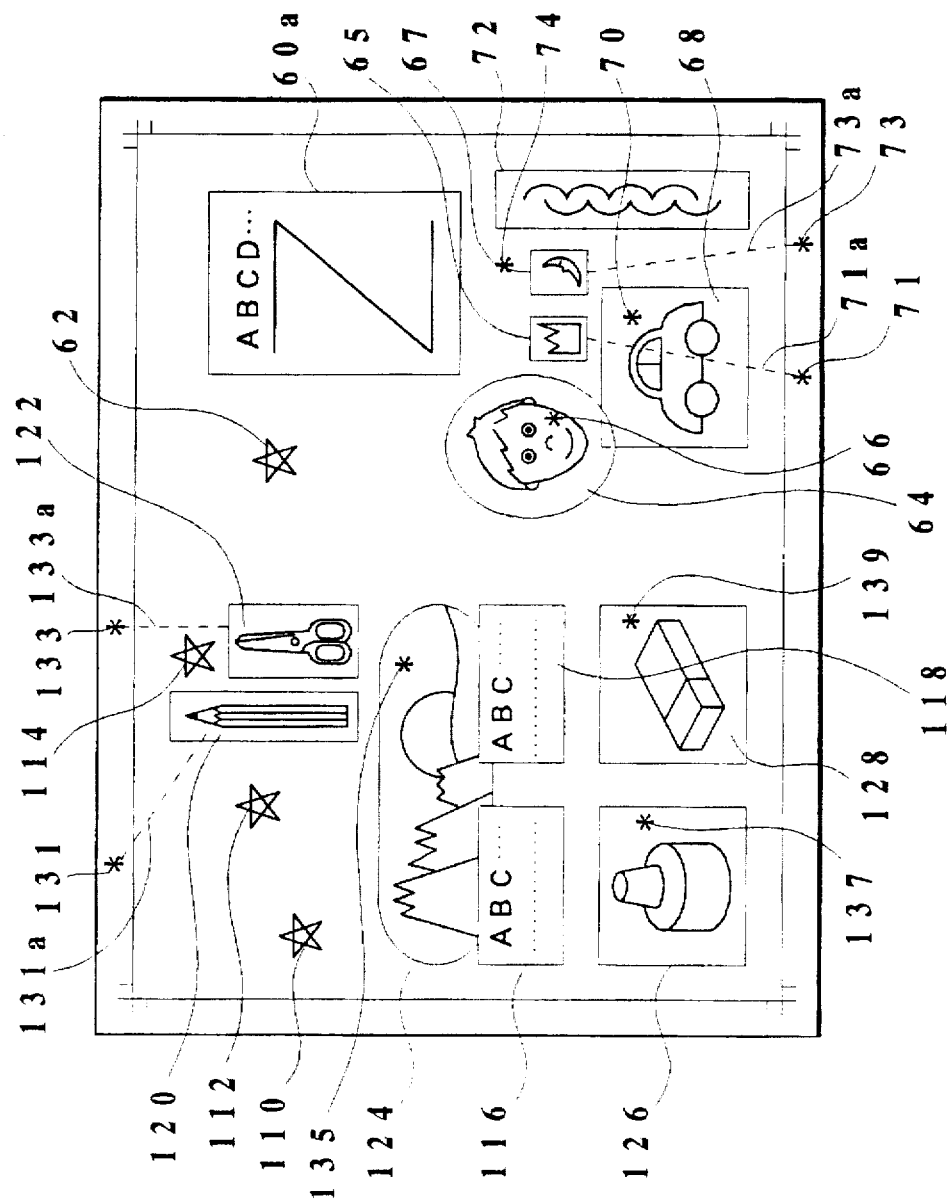
FIG. 42 is a drawing showing a display of identifier pasting locations.

If the location of the component identifier is correct, the CPU 42 writes the pasting location (output coordinates) PB(i,k) for the component identifier in the image attribute file FILE(i,k) using X-Y coordinates (step R15). At the same time, the identifier pasting location relative to the corresponding image component 64 is displayed (66) on the CRT monitor 48 as shown in FIG. 42.

If the location of the component identifier is incorrect, such as the component identifier overlapping other component identifier, the CRT monitor 48 displays that the component identifier cannot be placed in the specified location (step R14) and prompts to enter the component identifier location PB(i,k) again. The operator specifies, as shown in FIG. 42, the component identifier locations 71, 73, 131, and 133 relative to the corresponding image components 65, 67, 120, and 122 on the blank margin of the layout paper. The CPU 42, upon receiving the specification, generates a relation line 71a between the pasting location 71 and the corresponding image component 65. Similarly, a relations line 73a is generated between the pasting location 73 and the corresponding image component 67, a relation line 131a between the pasting location 131 and the corresponding image component 120, and a relation line 133a between the pasting location 133 and the corresponding image component 122. Here, the CPU 42 stores coordinates REF(Xk, Yk: xk, yk) of the start and end points of the relation line in the image attribute file FILE(i,k) (step R15 ).

Next, judgment is made whether or not the identifier correspondence process described above is completed for all the image components (step R16). If there are any corresponding image components not processed yet, the steps R3 through R16 are repeated by changing the variable k by an increment of one.

When the identifier correspondence process described above is completed for all the image components, the process goes on to the step R17. In the step R17, first the storage location "PARIDFILE(i,k)ADRS" of the component identifier file PARIDFILE(i,k) in the image attribute file FILE(i,k). Furthermore, bar code pattern data which are the component identifiers are stored in the component identifier file PARIDFILE(i,k). Next in the step R18, judgment is made whether or not the process of the step R17 (identifier pattern making) is completed for all the component identifiers. If not, the process of the step R17 is repeated by changing the variable k from 1 through N by an increment of one.

When the identifier pattern making process of the step R17 is completed for all the image attribute files FILE(i,k), the process goes on to the step R19. In the step R19, group image attribute files s-GFILE(i,j) corresponding to the component groups are made. Here, the variable j represents the group sequence numbers from 1 through M. In other words, the group image attribute files s-GFILE(i,j) are generated in the number equal to the number M specified in the step R2. Next, when the operator enters the group name GNAM from the keyboard 52, the CPU 42 writes it in the group image attribute file s-GFILE(i,j) (step R20). Next, the group image attribute file s-GFILE(i,j) and the layout paper attribute file m-HFILE(i) are associated with each other. In other words, the storage location "m-HFILE(i)ADRS" for the layout paper attribute file m-HFILE(i) is written in the group image attribute file s-GFILE(i,j) (step R21).

Next, the CPU 42 reads the coordinate data of the start point Phs(i) and the end point Phe(i) of the layout paper from the layout data of the layout paper file m-DFILE(i) and writes them in the group image attribute file s-GFILE(i,j) (step R22). The job identifier information is also written in. Here, the job information is the information for attaching the job identifier 91 (FIG. 43) and the job identifier 151 (FIG. 44) to respective divided prepress command sheets when the prepress command sheet is outputted. As the job identifier information, job identifier code JOBIDPAT(i,j), job identifier pasting location PJ(i,j), and the storage location JOBIDFILE(i,j)ADRS for the job identifier file JOBDFILE (i,j) are stored. In the job identifier file JOBIDFILE(i,j) are stored the pattern data for the job identifier code JOBIDPAT (i,j).

Next, the CPU 42 displays the corresponding image components on the CRT monitor 48 as shown in FIG. 41. The operator referring to the display selects corresponding image components to be collected in a group of components by means of the digitizer 50. The CPU writes the addresses of image attribute file FILE(i,k) of the selected corresponding image components in the group image attribute file s-GFILE(i,k) (step R23). Next, judgment is made whether or not the process is completed for all the groups of components (step R24). If not, the steps R19 through R24 are repeated by increasing the variable j.

If completed, the step R25 is performed. In the step R25, the CPU 42 reads text data corresponding to the text area and linework data corresponding to the linework area respectively from different files and writes them in the layout paper file m-DFILE(i). Divided block copies (divided prepress command sheets) are printed out from the printer 47 for respective groups of components according to the image attribute file address FILE(i,k)ADRS of the group image attribute file s-GFILE(i,j) and the layout paper file m-DFILE (i) (step R25). At this time, bar code pattern data are pasted at the component identifier pasting location for each of the corresponding image components belonging to respective groups of components and recorded. Also at this time, the pattern data for the job identifier (bar code) are recorded in the specified pasting location. For the corresponding image components not belonging to the component groups, recording of the component identifiers is not made.

Figure 45:
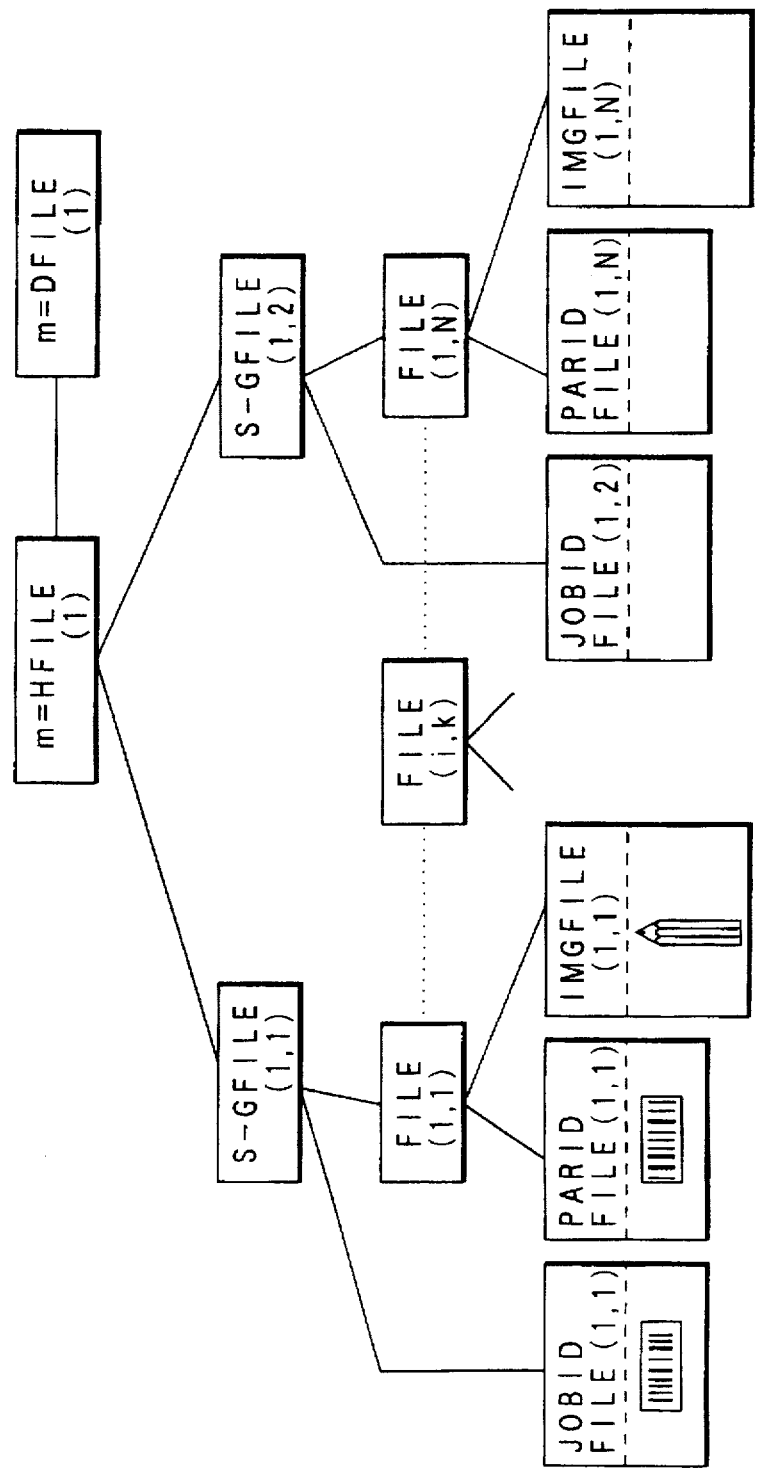
FIG. 45 is a drawing showing the structure of a layout paper attribute file and the layout paper file.

The structure of files in this state is shown in FIG. 45. In this figure, the file structure is shown for the case the components are divided into two groups. The group image attribute files s-GFILE(i,j) are generated in the number of group divisions M.

In the step R26, judgment is made whether or not the output process is completed for all the divided block copies. If not, the process of the step R25 is repeated by changing the variable j from 1 through M by an increment of one.

Figure 43:
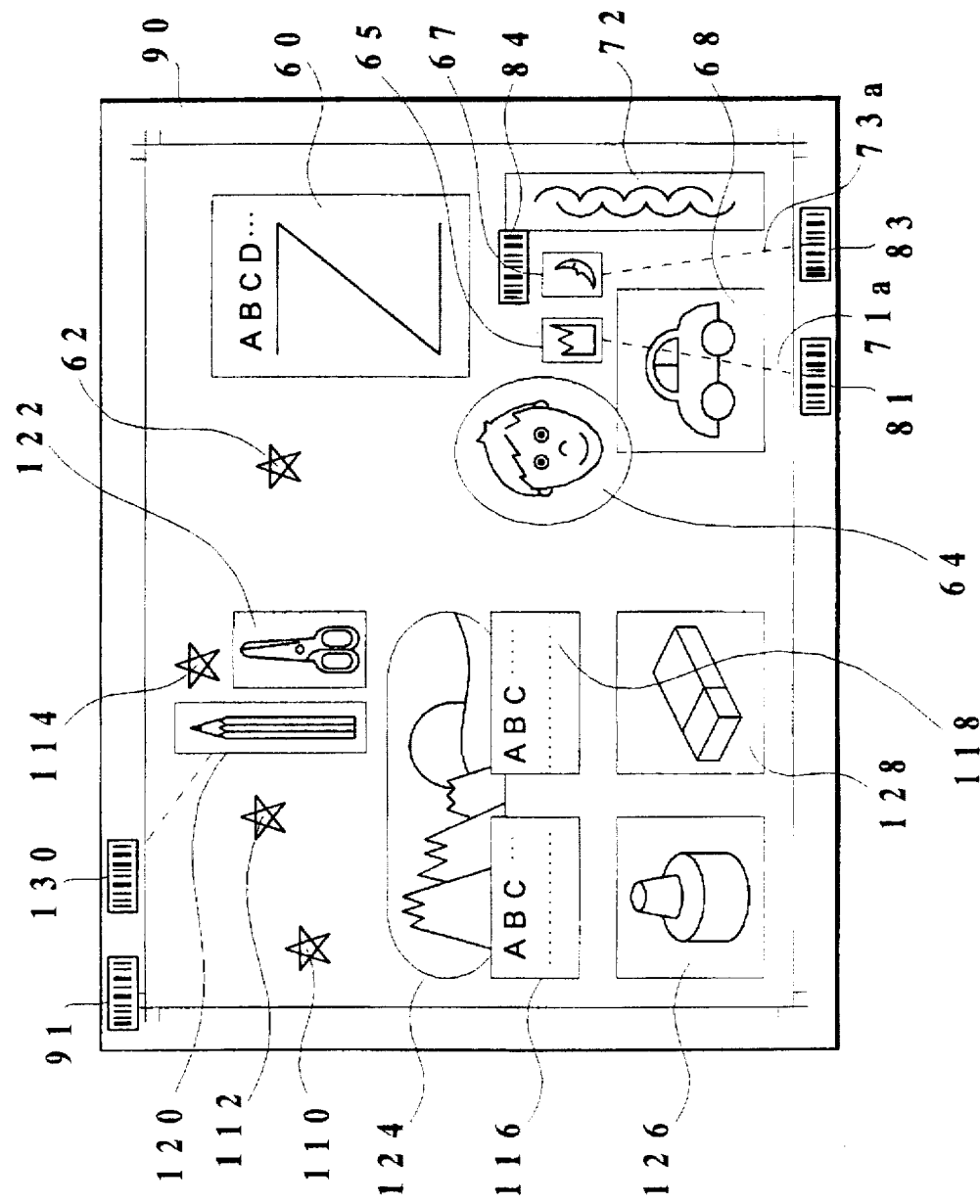
FIG. 43 is a drawing showing the completed divided layout paper 90.
Figure 44:
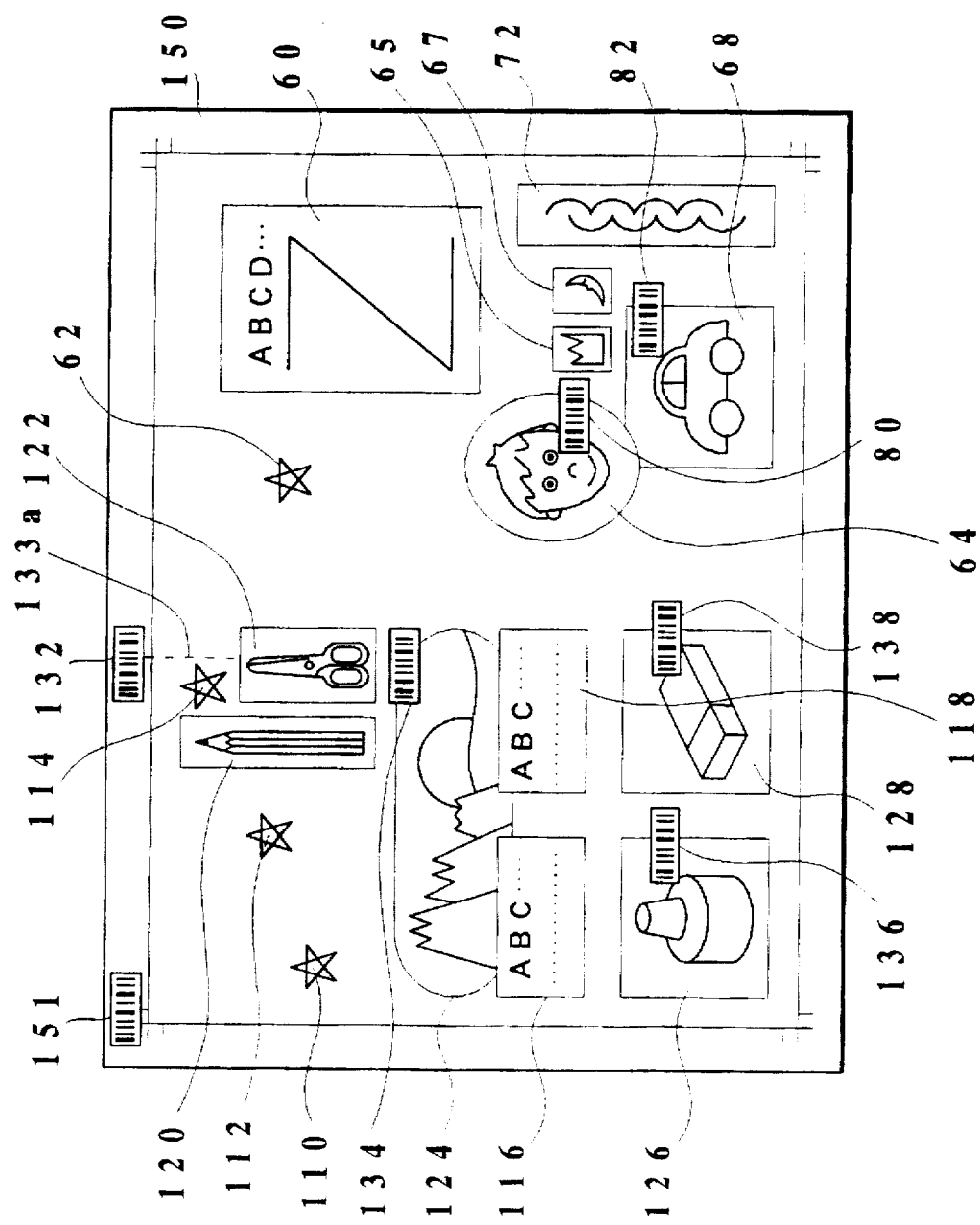
FIG. 44 is a drawing showing the completed divided layout paper 150.

FIGS. 43 and 44 show the divided block copies 90 and 150 outputted in this way. Here, the corresponding image components 65, 67, 72, and 120 are treated as one group of components (FIG. 43) and the corresponding image components 64, 68, 124, 126, and 128 as the other (FIG. 44). In FIG. 43, a bar code (component identifier) 84 is placed in the vicinity of the corresponding image component 72. For the corresponding image components 66, 67, and 120, bar codes (component identifiers) 81, 83, and 130 are placed in the blank margin, and relation lines 71a, 73a, and 131a are provided to show correspondence relationship. A bar code (job identifier) 91 inherent to the divided layout paper is provided in the upper left corner. Similar explanation applies to the divided layout paper 150 shown in FIG. 44.

When the output process is completed for all the divided block copies, the steps R1 through R27 are repeated for the succeeding layout paper (increasing the variable i by one). If it is judged that the process is completed for all the block copies in the step R27, the process is finished.

With the prepress command sheet preparing device and the prepress command sheet preparing method of this invention, the identifiers associated with at least respective image components are laid out in association with respective corresponding image components. Therefore, the image components corresponding to respective corresponding image components are readily specified by only reading the identifiers.

The corresponding image components are divided into a plural number of groups of components according to the work JOB so that divided prepress command sheets are outputted for respective groups of components. Therefore, work division is not required in the prepress process. As a result, work efficiency is improved and errors are eliminated.

In other words, this invention makes it possible to perform the prepress work efficiently without errors.

While the bar code was used as an identifier in the embodiments described above, other kinds of identifiers which can be optically read may be used. Or the identifier may be such that can be read magnetically or electrically.

While the identifier is recorded on the layout paper in the embodiments described above, the identifier may also be recorded on the command sheet which is overlaid on the layout paper when it is used. In that case, it suffices to place the identifier in the vicinity of the corresponding image component when the command sheet is overlaid on the layout paper.

While the layout paper and the command sheet are made out on different sheets in the embodiments described above, it may also be constituted to enter the contents of the command sheet from the keyboard shown in FIG. 2 so that the layout paper is outputted including the contents of the command sheet.

While the identifiers are attached only to the corresponding image components in the embodiments described above, the identifiers may also be attached to the corresponding text components and the corresponding linework components.

While the embodiments described above are constituted so that the operator enters the layout locations of the identifiers, it may also be constituted so that the CPU calculates the locations of the identifiers and lays them out.

While the functions of the blocks shown in FIG. 1, FIG. 13, FIG. 17 and FIG. 33 are attained by the CPU in the embodiments described above, part or whole of such functions may be attained by a hardware logic.

What is claimed is:

1. A prepress command sheet preparing device comprising:

corresponding component memory means for storing electronic data for corresponding image components, corresponding text components, and corresponding linework components respectively corresponding to image components, text components, and linework components, identifier output means for outputting electronic data for identifiers, layout paper memory means for storing electronic data for layout papers for prepress command sheets, component layout means for determining locations of the corresponding image components, corresponding text components, and corresponding linework components to be laid out on the layout paper according to memory contents in the corresponding component memory means and the layout paper memory means, identifier layout means which retrieves identifiers associated with at least respective corresponding image components from the identifier output means, and lays out the identifiers at a position where at least a part of the respective identifiers overlaps with respective corresponding image components and output means for outputting on the layout paper corresponding image components, corresponding text components, corresponding linework components, and identifiers capable of being read either electrically, magnetically, or optically.

2. The prepress command sheet preparing device of claim 1, characterized in that the device further comprises:

division instruction input means for entering division instruction to divide the layout paper in consideration of locations for the corresponding image components, corresponding text components, and corresponding linework components determined by the component layout means, and dividing means for dividing the layout paper into a plural number of divided layout papers according to the division instruction from the division instruction input means, said identifier layout means performing the process of laying out the identifiers at the position where at least a part of the respective identifiers overlaps with respective corresponding image components for each divided layout paper, and said output means performing the process of outputting the corresponding image components, corresponding text components, and corresponding linework components on each divided layout paper.

3. The prepress command sheet preparing device of claim 1, characterized in that the device further comprises:

division instruction input means for entering division instruction to divide the corresponding image components laid out on the layout paper into a plural number of groups, and dividing means for dividing the corresponding image components into a plural number of component groups according to the division instruction from the division instruction input means, said identifier layout means performing the process of laying out the identifiers at the position where at least a part of the respective identifiers overlaps with respective corresponding image components for each divided layout paper, and said output means performing the process of outputting the corresponding image components, corresponding text components, and corresponding linework components for each component group.

4. The prepress command sheet preparing device of claim 1, characterized in that, said identifier layout means retrieves the identifiers from the identifier output means with the identifiers associated with at least respective corresponding image components, lays out the identifiers at the position where at least a part of the respective identifiers overlaps with respective corresponding image components when such layout is possible, lays out the identifiers at locations apart from the corresponding image components when such layout at the position where at least a part of the respective identifiers overlaps with respective corresponding image components is impossible, and lays out relation lines connecting the corresponding image components to the respective identifiers, and said output means further outputting relation lines.

5. The prepress command sheet preparing device of claim 4, characterized in that the device further comprises:

division instruction input means for entering division instruction to divide the layout paper in consideration of locations for the corresponding image components, corresponding text components, and corresponding linework components determined by the component layout means, and dividing means for dividing the layout paper into a plural number of divided layout papers according to the division instruction from the division instruction input means, said identifier layout means performing the process of laying out the identifiers at the position where at least a part of the respective identifiers overlaps with respective corresponding image components for each divided layout paper, and said output means performing the process of outputting the corresponding image components, corresponding text components, and corresponding linework components for each divided layout paper.

6. The prepress command sheet preparing device of claim 4, characterized in that the device further comprises:

division instruction input means for entering division instruction to divide the corresponding image components laid out on the layout paper into a plural number of groups, and dividing means for dividing the corresponding image components into a plural number of component groups according to the division instruction from the division instruction input means, said identifier layout means performing the process of laying out the identifiers at the position where at least a part of the respective identifiers overlaps with respective corresponding image components for each component group, and said output means performing the process of outputting the corresponding image components, corresponding text components, and corresponding linework components for each component group.

7. The prepress command sheet preparing device of claim 1, characterized in that the device further comprises identifier location input means for displaying the corresponding image components with their locations determined by the component layout means and for specifying and entering the layout locations for the identifiers, said identifier layout means retrieves the identifiers from the identifier output means with the identifiers associated with at least respective corresponding image components, lays out the identifiers at the position where at least a part of the respective identifiers overlaps with respective corresponding image components when such layout is possible, lays out the identifiers at locations apart from the corresponding image components when the laid out locations are not at the position where at least a part of the respective identifiers overlaps with respective corresponding image components and lays out relation lines connecting the corresponding image components to the respective identifiers, and prompts an operator to enter the layout locations of the identifiers again from the identifier location input means when the identifiers cannot be laid out at the locations specified by the identifier location input means, and said output means further outputting relation lines.

8. The prepress command sheet preparing device of claim 7, characterized in that the device further comprises:

division instruction input means for entering division instruction to divide the layout paper in consideration of locations for the corresponding image components, corresponding text components, and corresponding linework components determined by the component layout means, and dividing means for dividing the layout paper into a plural number of divided layout papers according to the division instruction from the division instruction input means.

said identifier layout means performing the process of laying out the identifiers at the position where at least a part of the respective identifiers overlaps with respective corresponding image components for each divided layout paper, said identifier layout means performing the layout of said identifiers, layout of said relation lines, and the request for said repeated input for each divided sheet, and said output means performing the process of outputting the corresponding image components, corresponding text components, and corresponding linework components on each divided layout paper.

9. The prepress command sheet preparing device of claim 7, characterized in that the device further comprises:

division instruction input means for entering division instruction to divide the corresponding image components laid out on the layout paper into a plural number of groups, and dividing means for dividing the corresponding image components into a plural number of component groups according to the division instruction from the division instruction input means, said identifier location input means performing the display of said corresponding image components, and the specification and input of the layout locations of said identifiers for each component, said identifier layout means performing the layout of said identifiers, layout of said relation lines, and said repeated input request for each component group, and said output means performing the output of the corresponding image components, corresponding text components, corresponding linework components, identifiers, and relation lines for each component group.

10. A prepress command sheet preparing method comprising the steps of:

storing in advance electronic data for corresponding image components, corresponding text components, and corresponding linework components respectively corresponding to image components, text components, and linework components, storing in advance electronic data for a layout paper for the prepress command sheet, determining the locations for the corresponding image components, corresponding text components, and corresponding linework components to be laid out on the layout paper according to the electronic data, and outputting the corresponding image components, corresponding text components, and corresponding linework components on the layout paper according to the determined layout, characterized in that identifiers capable of being read either electrically, magnetically, or optically and associated with at least respective corresponding image components are laid out at a position where at least a part of the respective identifiers overlaps with respective corresponding image components, and outputted.

11. The prepress command sheet preparing method of claim 10, characterized in that identifiers capable of being read either electrically, magnetically, or optically and associated with at least respective corresponding image components are laid out at the position where at least a part of the respective identifiers overlaps with respective corresponding image components when such layout is possible and outputted, or laid out in locations apart from the corresponding image components when such layout at the position where at least a part of the respective identifiers overlaps with respective corresponding image components is impossible, and outputted, and relation lines connecting the corresponding image components and identifiers each other are laid out, and outputted.

12. The prepress command sheet preparing method of claim 10, characterized in that, the layout paper is divided into a plural number of divided layout papers in consideration of the locations of the laid out corresponding image components, corresponding text components, and corresponding linework components, and the divided prepress command sheets are outputted for the respective divided layout papers, and the identifiers capable of being read either electrically, magnetically, or optically and associated with at least respective corresponding image components are laid out at the position where at least a part of the respective identifiers overlaps with respective corresponding image components when such layout at the position where at least a part of the respective identifiers overlaps with respective corresponding image components is possible, and outputted, or laid out in locations apart from the corresponding image components when such layout is impossible, and outputted, and relation lines connecting the corresponding image components and identifiers each other are laid out, and outputted on the respective divided prepress command sheets.

13. The prepress command sheet preparing method of claim 10, characterized in that, the corresponding image components laid out on the layout paper are divided into a plural number of component groups and the divided prepress command sheets are outputted for the respective divided component groups, and the identifiers capable of being read either electrically, magnetically, or optically and associated with at least respective corresponding image components belonging to the component groups are laid out at the position where at least a part of the respective identifiers overlaps with respective corresponding image components when such layout is possible and outputted, or laid out in locations apart from the corresponding image components when such layout at the position where at least a part of the respective identifiers overlaps with respective corresponding image components is impossible, and outputted, and relation lines connecting the corresponding image components and identifiers each other are laid out, and outputted.

14. A prepress command sheet on which corresponding image components, corresponding text components, and corresponding linework components respectively corresponding to image components, text components, and linework components are laid out for instructing at least the layout of the image components, text components, and linework components for use in prepress processes, characterized in that identifiers capable of being read either electrically, magnetically, or optically are laid out at a position where at least a part of the respective identifiers overlaps with respective corresponding image components.

15. The prepress command sheet of claim 14, characterized in that the identifiers associated with the corresponding image components and capable of being read either electrically, magnetically, or optically, are laid out at the position where at least a part of the respective identifiers overlaps with respective corresponding image components if the layout in such position is possible, or the identifiers associated with the corresponding image components and capable of being read either electrically, magnetically, or optically are laid out apart from the corresponding image components if the layout in such position is impossible, and the relation lines connecting the corresponding image components and the identifiers each other are laid out.

* * * * *